US012699106B2

(12) United States Patent
Subramanian et al.

(10) Patent No.: US 12,699,106 B2
(45) Date of Patent: Aug. 4, 2026

(54) BENCHTOP INSTRUMENT AND CONSUMABLES FOR SAMPLE DEPOSITION AND STAINING

(71) Applicants: ASP HEALTH INC., Evanston, IL (US); NORTHWESTERN UNIVERSITY, Evanton, IL (US); PLANET INNOVATION, Box Hill (AU)

(72) Inventors: Hariharan Subramanian, Evanston, IL (US); John W. Hart, Evanston, IL (US); Tamara S. Swanson, Evanston, IL (US); Alexander L. Bluestone, Evanston, IL (US); Margaux Hayes, Box Hill (AU); Michael Henning, Box Hill (AU); Derek Gurban, Box Hill (AU); Nicholas Booker, Box Hill (AU); Nick Mouskos, Box Hill (AU); Chester Henderson, Box Hill (AU); Rebecca Bartel, Box Hill (AU); Matthew Turner, Box Hill (AU)

(73) Assignee: ASP HEALTH INC., Northbrook, IL (US)

( * ) Notice: Subject to any disclaimer, the term of this patent is extended or adjusted under 35 U.S.C. 154(b) by 403 days.

(21) Appl. No.: 18/285,085

(22) PCT Filed: Mar. 31, 2022

(86) PCT No.: PCT/US2022/022957
§ 371 (c)(1),
(2) Date: Sep. 29, 2023

(87) PCT Pub. No.: WO2022/212791
PCT Pub. Date: Oct. 6, 2022

(65) Prior Publication Data
US 2024/0183869 A1 Jun. 6, 2024

Related U.S. Application Data

(60) Provisional application No. 63/168,522, filed on Mar. 31, 2021.

(51) Int. Cl.
*B01L 3/00* (2006.01)
*B01D 15/08* (2006.01)
(Continued)

(52) U.S. Cl.
CPC ......... *G01N 35/00029* (2013.01); *G01N 1/30* (2013.01); *G01N 1/312* (2013.01);
(Continued)

(58) Field of Classification Search
CPC .... G01N 35/00029; G01N 1/30; G01N 1/312; G01N 2001/302; G01N 2001/317;
(Continued)

(56) References Cited

U.S. PATENT DOCUMENTS 7,652,772 B2  1/2010  Backman et al.
7,667,832 B2  2/2010  Backman et al.
(Continued)

FOREIGN PATENT DOCUMENTS

JP  2000505202 A  4/2000
JP  2014533823  12/2014
(Continued)

OTHER PUBLICATIONS

International Search Report and Written Opinion dated Jul. 12, 2022 for International Application No. PCT/US2022/022957, 11 pages.
(Continued)

*Primary Examiner* — Jennifer Wecker
*Assistant Examiner* — Oyeleye Alexander Alabi
(74) *Attorney, Agent, or Firm* — Perkins Coie LLP

(57) ABSTRACT
An apparatus for depositing and staining a cellular sample, includes a slide processing module comprising a specimen
(Continued)

input port (SIP) dock configured to receive a SIP consumable comprising the cellular sample, and position the SIP consumable such that a spray nozzle of the SIP consumable and an air nozzle of the slide processing module are aligned prior to a deposition operation, and a user interface configured receive an input from a user that configures the deposition operation and a staining operation, and an auxiliary systems module, coupled to the slide processing module, comprising a chassis including a removable storage container configured to hold a plurality of bottles comprising one or more of a reagent, a buffer solution, or an ethanol-based fixative, and an electronics subsystem configured to execute, based on the input from the user, a pre-programmed protocol for the deposition operation and the staining operation.

19 Claims, 45 Drawing Sheets

(51) Int. Cl.

| | |
|---|---|
| B01F 33/302 | (2022.01) |
| B01F 33/3033 | (2022.01) |
| B01J 8/00 | (2006.01) |
| B01J 8/02 | (2006.01) |
| B01J 20/285 | (2006.01) |
| B01J 20/287 | (2006.01) |
| B01J 20/32 | (2006.01) |
| B01L 7/00 | (2006.01) |
| B01L 9/00 | (2006.01) |
| B65G 47/80 | (2006.01) |
| B82Y 20/00 | (2011.01) |
| B82Y 30/00 | (2011.01) |
| B82Y 40/00 | (2011.01) |
| C08L 5/08 | (2006.01) |
| C12M 1/34 | (2006.01) |
| C12M 3/06 | (2006.01) |
| C12N 1/14 | (2026.01) |
| C12N 1/20 | (2026.01) |
| C12Q 1/02 | (2006.01) |
| C12Q 1/6806 | (2018.01) |
| C12Q 1/6844 | (2018.01) |
| C12Q 1/6848 | (2018.01) |
| C12Q 1/6851 | (2018.01) |
| C12Q 1/686 | (2018.01) |
| G01K 1/14 | (2021.01) |
| G01N 1/30 | (2006.01) |
| G01N 1/31 | (2006.01) |
| G01N 1/44 | (2006.01) |
| G01N 15/10 | (2024.01) |
| G01N 15/14 | (2024.01) |
| G01N 15/1433 | (2024.01) |
| G01N 21/01 | (2006.01) |
| G01N 21/03 | (2006.01) |
| G01N 21/05 | (2006.01) |
| G01N 21/29 | (2006.01) |
| G01N 21/33 | (2006.01) |
| G01N 21/35 | (2014.01) |
| G01N 21/65 | (2006.01) |
| G01N 21/75 | (2006.01) |
| G01N 21/77 | (2006.01) |
| G01N 27/07 | (2006.01) |
| G01N 27/28 | (2006.01) |
| G01N 27/416 | (2006.01) |
| G01N 30/02 | (2006.01) |
| G01N 30/60 | (2006.01) |
| G01N 30/72 | (2006.01) |
| G01N 31/10 | (2006.01) |
| G01N 31/12 | (2006.01) |
| G01N 33/543 | (2006.01) |
| G01N 33/557 | (2006.01) |
| G01N 33/564 | (2006.01) |
| G01N 33/574 | (2006.01) |
| G01N 33/575 | (2026.01) |
| G01N 33/57515 | (2026.01) |
| G01N 33/58 | (2006.01) |
| G01N 33/68 | (2006.01) |
| G01N 33/72 | (2006.01) |
| G01N 35/00 | (2006.01) |
| H05B 45/10 | (2020.01) |

(52) U.S. Cl.
CPC . *G01N 2001/302* (2013.01); *G01N 2001/317* (2013.01); *G01N 2035/00039* (2013.01); *G01N 2035/00089* (2013.01); *G01N 2035/00138* (2013.01)

(58) Field of Classification Search
CPC .......... G01N 2035/00039; G01N 2035/00089; G01N 2035/00138
See application file for complete search history.

(56) References Cited

U.S. PATENT DOCUMENTS

| | | | |
|---|---|---|---|
| 7,800,746 B2 | 9/2010 | Backman et al. | |
| 8,131,348 B2 | 3/2012 | Backman et al. | |
| 8,735,075 B2 | 5/2014 | Backman et al. | |
| 2006/0155178 A1 | 7/2006 | Backman et al. | |
| 2011/0129655 A1 | 6/2011 | Botelho et al. | |
| 2012/0021424 A1* | 1/2012 | Sandell | C12Q 1/686 435/6.12 |
| 2013/0065797 A1 | 3/2013 | Silbert et al. | |
| 2014/0273071 A1 | 9/2014 | Ostgaard et al. | |
| 2016/0250640 A1 | 9/2016 | Williams et al. | |
| 2016/0291045 A1 | 10/2016 | Czarnecki et al. | |
| 2018/0127833 A1 | 5/2018 | Backman et al. | |
| 2021/0325412 A1* | 10/2021 | Subramanian | G01N 1/2813 |
| 2022/0276268 A1 | 9/2022 | Mendoza et al. | |

FOREIGN PATENT DOCUMENTS

| | | |
|---|---|---|
| JP | 2015/086534 | 1/2017 |
| JP | 2017198635 A | 11/2017 |
| JP | 2018513984 | 5/2018 |
| WO | WO 2020/014323 | 1/2020 |

OTHER PUBLICATIONS

International Search Report and Written Opinion dated Sep. 26, 2019 for International Application No. PCT/US2019/041150.
Office Action dated Mar. 3, 2026 for Japanese Patent Application No. 2023-560426, 8 pages.

\* cited by examiner

305

Dry Side
Electronics and
pneumatic sub
assembly

Fluid Side
Liquid system
and bottles.

2103

2001A

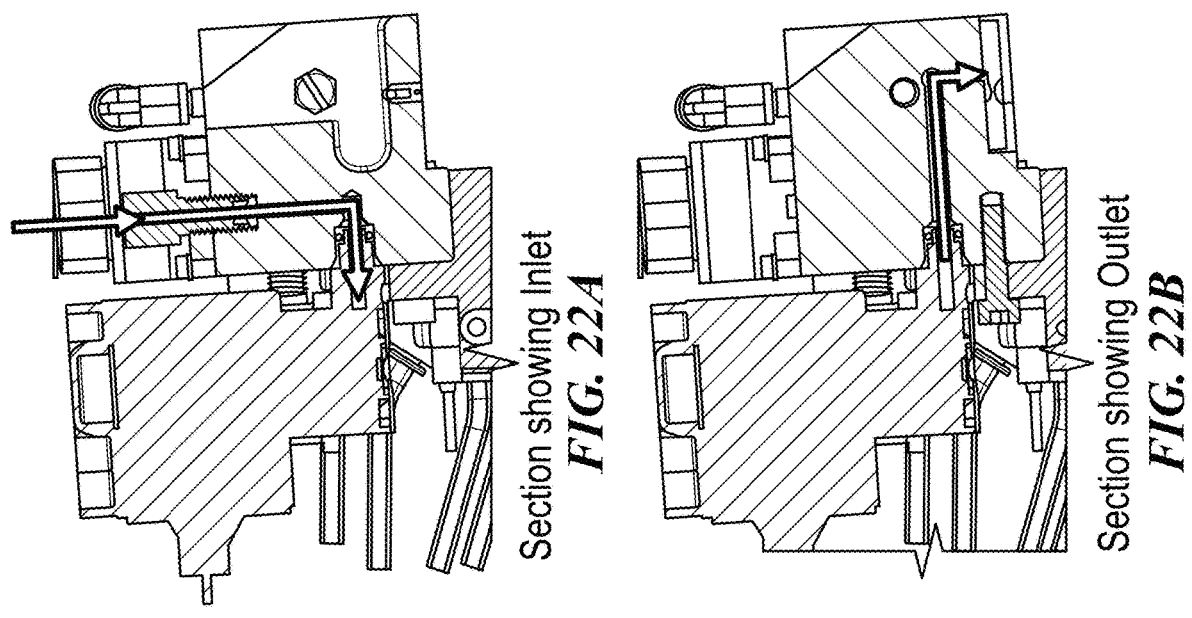
Section showing Inlet
*FIG. 22A*
Section showing Outlet
*FIG. 22B*
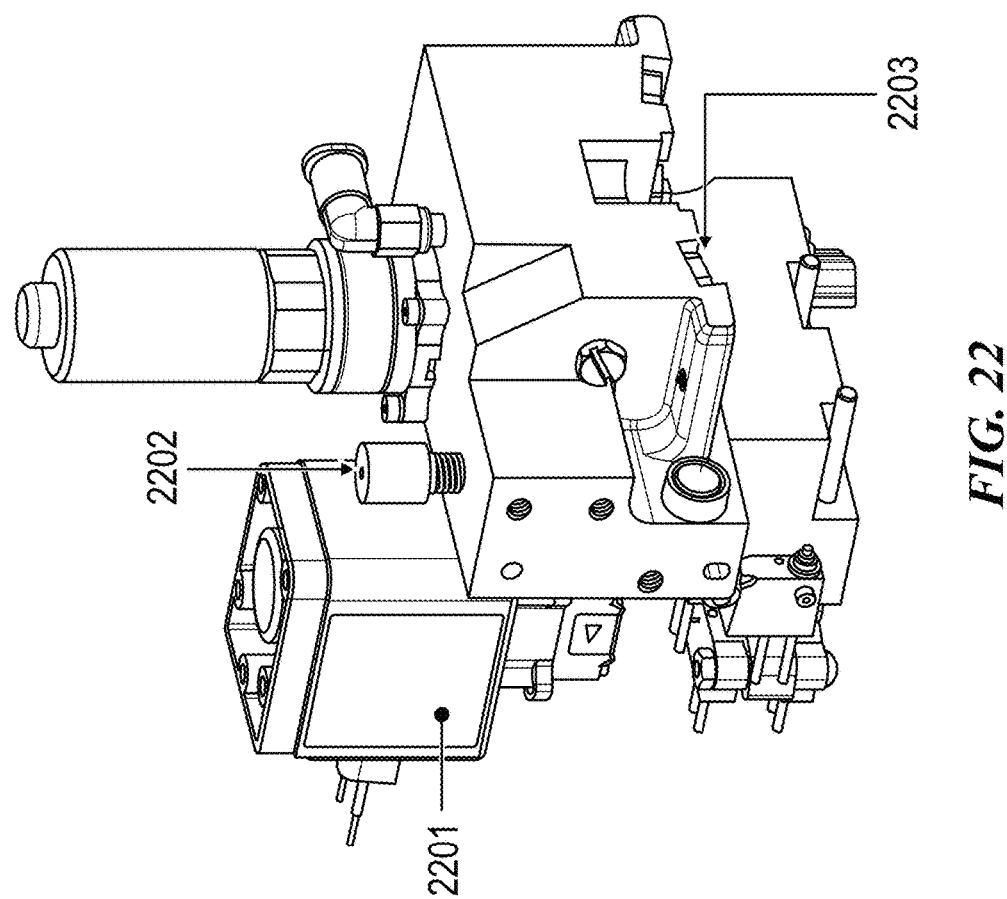
*FIG. 22*

RHS Insert

2405

2404

2403

LHS Insert

2402

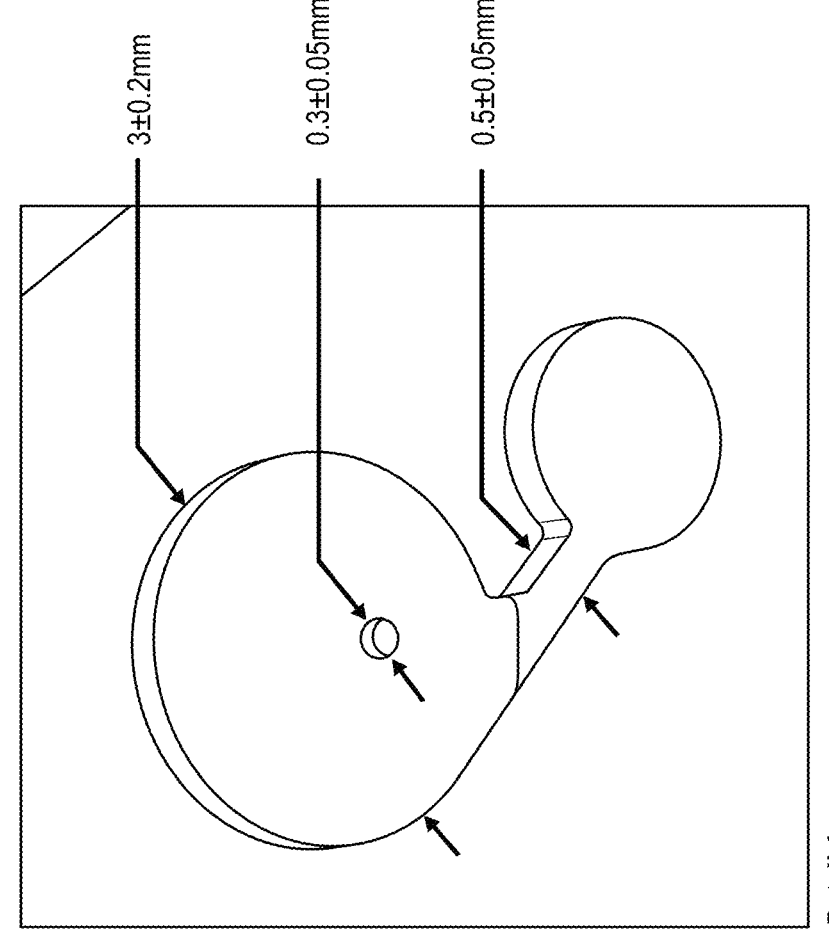
3±0.2mm
0.3±0.05mm
0.5±0.05mm
Detail A
Aerosolisation swirl feature
*FIG. 24B*
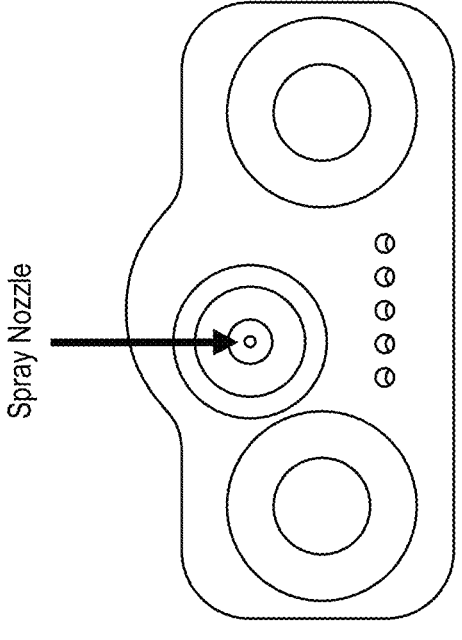
Spray Nozzle
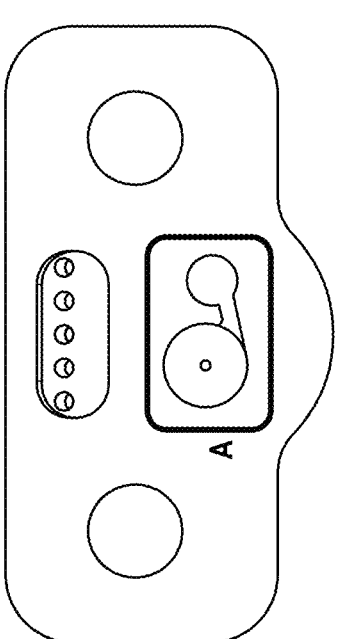
A Section showing Inlet Section showing Outlet

2502

Plugged hole enables machining from a single part

2501

BENCHTOP INSTRUMENT AND CONSUMABLES FOR SAMPLE DEPOSITION AND STAINING

CROSS-REFERENCE TO RELATED APPLICATION(S)

This application is a 35 USC § 371 National Stage application of International Application No PCT/US2022/022957, entitled "BENCHTOP INSTRUMENT AND CONSUMABLES FOR SAMPLE DEPOSITION AND STAINING," filed on Mar. 31, 2022, which claims priority to U.S. Provisional Patent Application No. 63/168,522, filed Mar. 31, 2021, the entire contents of which are incorporated herein by reference.

TECHNICAL FIELD

This document generally relates to laboratory procedures, and more specifically, to sample deposition and staining for laboratory cytology procedures.

BACKGROUND

Cytology techniques have developed to be minimally invasive and have revolutionized the practice of medicine. The ability to quickly obtain high quality samples with little discomfort has generally made such procedures more acceptable. More recently, sample collection techniques are adopting the use of consumable components that are designed to improve laboratory practices whilst ultimately delivering better patient care. Using consumable components reduces cross-contamination and improves reliability.

SUMMARY

Embodiments of the disclosed technology provide a mobile dedicated system for rapid on-site evaluation of biological tissue samples collected in a cytopathology laboratory (e.g., using fine-needle aspiration), which enables healthcare providers to perform these services in a consistent and timely manner, which results in positive patient outcomes. Some embodiments advantageously enable multiple cytology slides to be prepared in substantially the same manner.

In an example, preparing two slides in a consistent manner allows a user to repeat an analysis or a test to improve the reliability of the result, or use one of the slides as a control slide, or process the two slides at different times after undergoing the same process or different processes, or processing one of the slides using conventional histological staining and the other using a molecular staining process, or analyzing one slide on-site and sending the second one to the laboratory for a detailed cytological analysis of the specimen.

In an example embodiment, an apparatus for depositing and staining a cellular sample includes a slide processing module, positioned at an upper front position of the apparatus, including a specimen input port (SIP) dock configured to receive a SIP consumable comprising the cellular sample, and position the SIP consumable such that a spray nozzle of the SIP consumable and an air nozzle of the slide processing module are aligned prior to a deposition operation, and a user interface configured receive an input from a user that configures the deposition operation and a staining operation, a clamping module, positioned at a lower front of the apparatus, including a handle configured to be pushed downward to raise a slide bed along a linear rail such that at least one slide on the slide bed is covered by a hood consumable that securely seals against the slide bed, and a solenoid latch configured to lock the slide bed until the deposition operation is complete, and an auxiliary systems module, positioned at a rear of the apparatus, including a chassis including a removable storage container configured to hold a plurality of reagent bottles, a buffer solution bottle, and an ethanol-based fixative bottle, and an electronics subsystem configured to execute, based on the input from the user, a pre-programmed protocol for the deposition and staining operations.

In another example embodiment, an apparatus for dispensing a fluidic sample, including an inlet port configured to receive a sample material, a moat surrounding the inlet port configured to receive any overflow sample material, and a first sample nozzle and a second sample nozzle fluidically coupled to the inlet port to expel the sample material, wherein a tubular junction fluidically couples the inlet port to a first tubular fluid path that terminates in the first sample nozzle and to a second tubular fluid path that terminates in the second sample nozzle, wherein a cross-sectional area of the tubular junction is less than an average cross-sectional area of the first tubular fluid path and the second tubular fluid path, and wherein the cross-sectional area of the tubular junction is selected to draw the sample material from the inlet port into the tubular junction via capillary action.

In yet another example embodiment, an apparatus for loading a fluidic sample, including a specimen input port (SIP) stand configured to hold a SIP consumable, a jar, positioned adjacent to the SIP stand, configured to capture overflow fluidic sample material when loading the fluidic sample into the SIP consumable, and an arm rest, positioned in proximity to the SIP stand, configured to facilitate the loading of the fluidic sample.

In yet another example embodiment, an apparatus for improving deposition of a sample material on a target in a sample analysis system, the apparatus including a body comprising a top panel, a front panel, a left panel, a right panel and a back panel, wherein the top panel comprises a first opening configured to receive the sample material, a lower panel, positioned adjacent to the back panel, that is parallel to the top panel and perpendicular to the back panel, wherein the lower panel comprises a second opening to receive a stain or dye subsequent to the deposition of the sample material on the target, and a bottom rim that supports the body and the lower panel, wherein the bottom rim is configured to adhere to the target prior to the deposition, wherein a distance between the bottom rim and the top panel is configured to accommodate targets with varying thicknesses.

In yet another example embodiment, a method for depositing and staining a cellular sample is provided that uses one or more apparatuses described above.

The above and other aspects and their implementations are described in greater detail in the drawings, the descriptions, and the claims.

BRIEF DESCRIPTION OF THE DRAWINGS

FIG. 22 shows an example of an ethanol fixative system.

FIGS. 24A and 24B show examples of an ethanol spray insert.

DETAILED DESCRIPTION

Figure 1A:
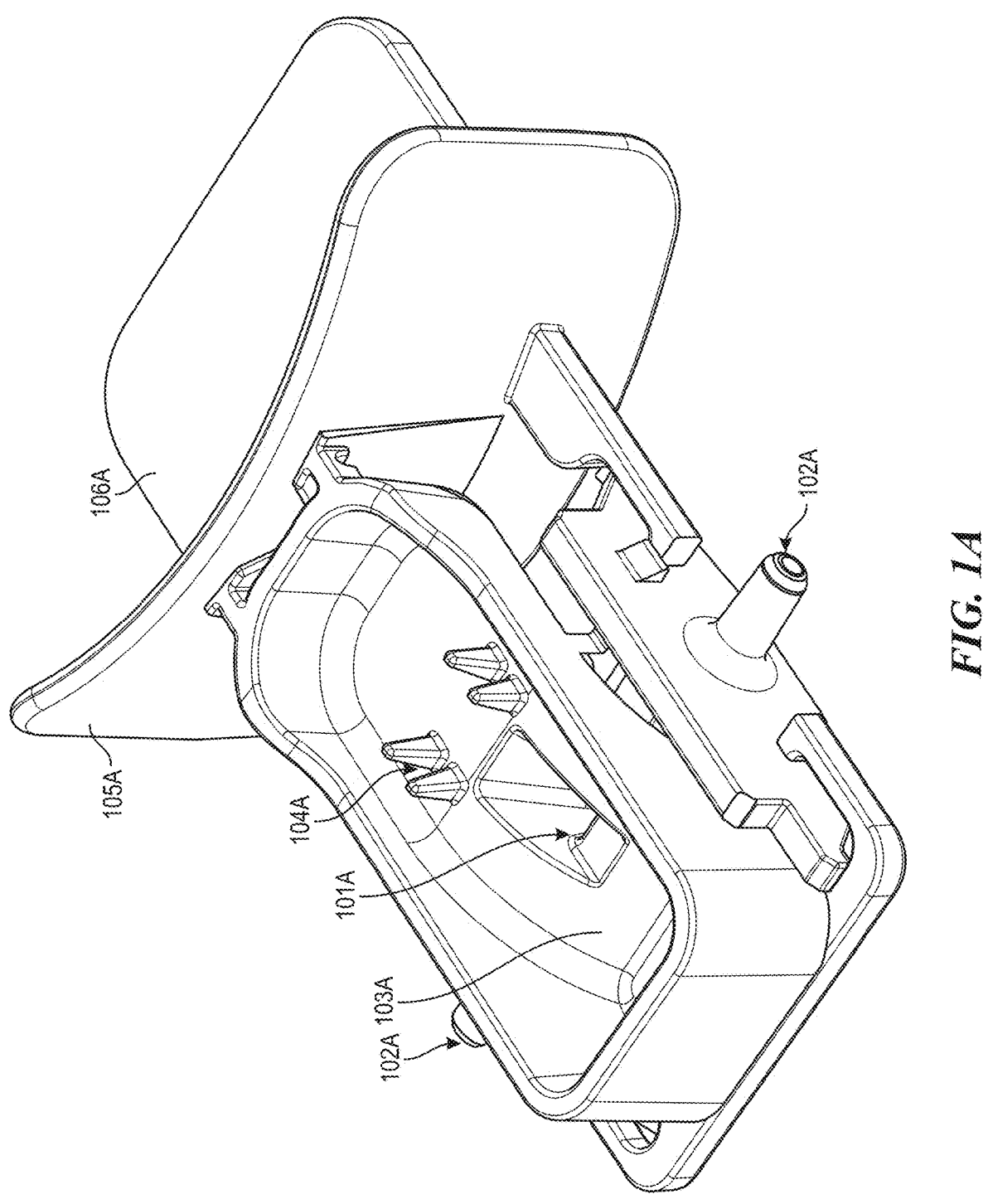
FIGS. 1A and 1B show different views and features of an example specimen inlet port (SIP) consumable.

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only.

Biological tissue samples are collected from patients for microscopic and molecular diagnostic analysis for clinical, diagnostic and research applications. These samples are collected in a variety of laboratory, medical clinic and other health-care or medical research settings. For example, cells/ tissue can be collected from a patient using a collection device, such as a brush, swab or cutting tool for biopsies. However, there remains a need to improve laboratory practices, e.g., by reducing cross-contamination, whilst ultimately delivering better patient care.

The subsequent histological or cytological analysis of these cell samples depends greatly on the quality of prepared specimens. Inadequate preparation of specimens can result in inaccurate data that causes an error in interpretation of results and misdiagnosis. In addition, complicated, non-automated systems lead to backlogs, delayed diagnoses, unintended types of artifacts that are due to the complexity of procedures, and intolerable run-to-run variability. There remains a need to develop a simplified and reliable system for quick, accurate results using low-cost systems to reduce and/or eliminate these unintended artifacts and provide high-quality results.

Embodiments of the disclosed technology describe a benchtop instrument and consumables for sample deposition and staining that address the aforementioned issues. In some embodiments, consumable components for preparing the collected cell samples, evenly dispersing the samples onto specimen slides, and preventing unintended dispersion and cross-contamination of the aerosolized sample are described in Sections 1-3, and Section 4 describes a benchtop instrument that is a self-contained instrument that is configured to perform sample spray deposition and substrate staining (using the aforementioned consumables), as well as on-board waste management, in order to prepare and stain a substrate for pathological assessment.

1 Example Specimen Inlet Port (SIP) Consumable

In some embodiments, the specimen inlet port (SIP) consumable is made up of three injection-molded polycarbonate parts: a body and two nozzles. The SIP consumable has an inlet into which the user can deposit the sample directly from the needle or a mixture of sample and buffer from a pipette or custom vial. The two spray nozzles of the SIP consumable allow the sample to exit the consumable for deposition onto two slides (e.g., cytology slides). The SIP consumable advantageously enables the samples to be deposited on the two slides in a substantially similar manner. For example, the samples can be cellular material, and are deposited on the slides (or substrates) as monolayers with no overlapping cells.

Figure 1B:
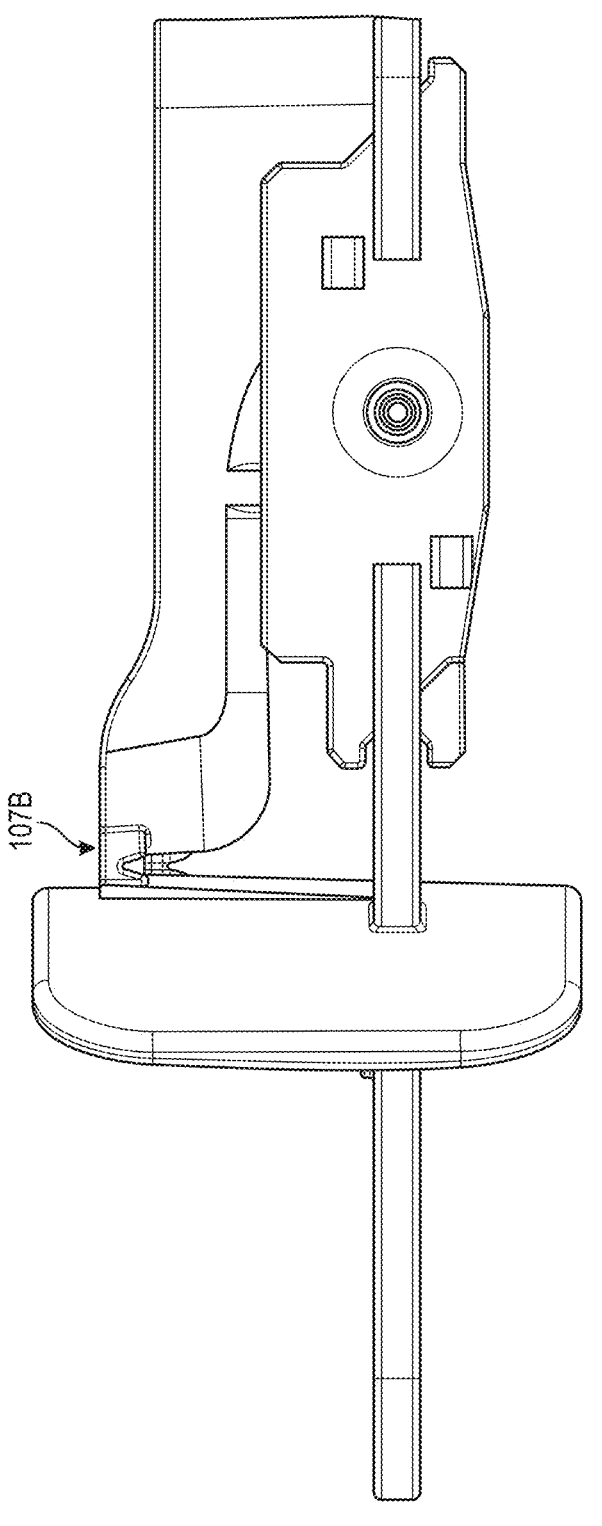

FIGS. 1A and 1B show different views and features of an example SIP consumable. As shown in FIG. 1A, the SIP consumable includes a sample well (101A), a spray nozzle (102A), a moat (103A), sorting spikes (104A), a thumb guard (105A), and a grip tab (106A). The snap feature (107B) is shown in FIG. 1B.

1.1 Sample Well

Figure 1C:
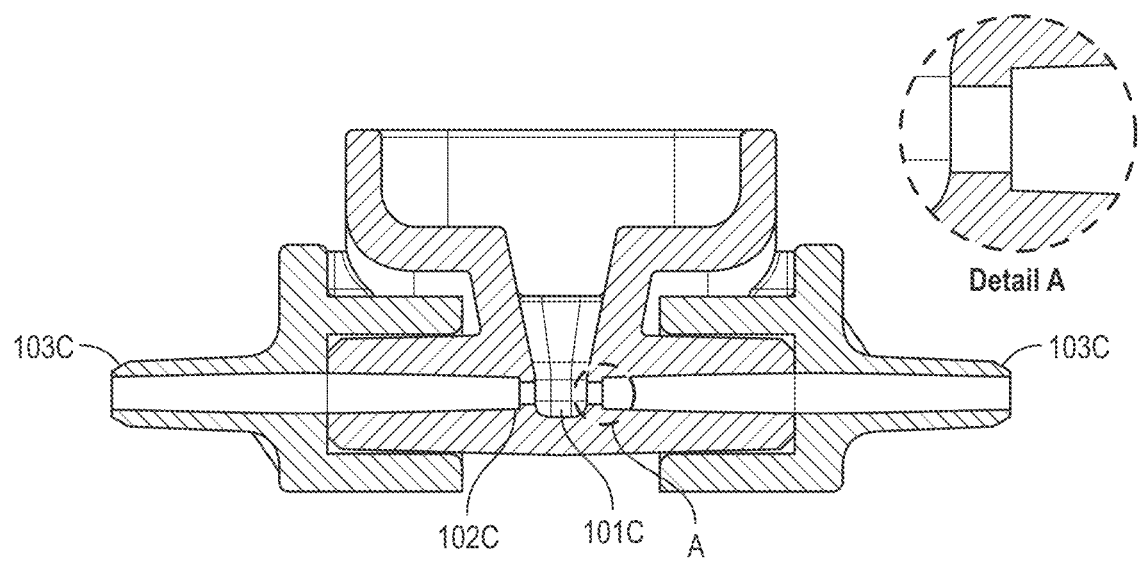
FIG. 1C shows a cross-section of a sample well of the SIP consumable.
Figure 1C:
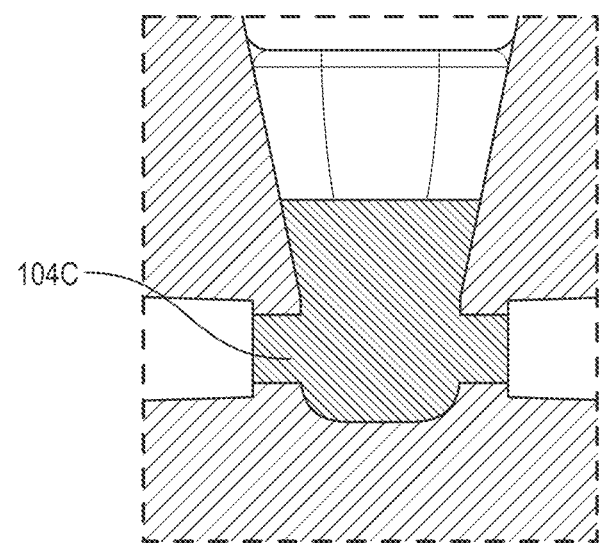

FIG. 1C shows a cross-section of the sample well of the example SIP consumable illustrated in FIGS. 1A and 1B. The sample well (101C) is designed to retain the sample centrally so that it will split evenly when twin bursts of air over the nozzle tips (103C) create a venturi effect. It achieves this by exploiting the tendency of liquids to travel to the smallest spaces. The design of the sample well (101C) ensures an even distribution of sample within the well because an uneven distribution of sample within the well can result in uneven deposition onto the slides. A pair of capillary nozzles invite fluid from the main well body but a "capillary stop" (102C) at the outer ends prevents the fluid from traveling any further (104C).

The detail in the upper right portion of FIG. 1C shows an example of the capillary stop. In an example, the capillary nozzles were designed to be 0.7 mm and the capillary stop is an increase in the diameter to 0.9 mm. These specific values were optimized through testing and found to be critical to the performance of the SIP consumable, as consequently, to the sample deposition operation.

In some embodiments, the size of the sample well (101A) is selected so as to enable a monolayer of sizes to be deposited onto the slides (or substrates). In addition, the size was optimized through testing to enable a standardization to be achieved with regard to the amount of sample required for sample deposition and staining methods in cytopathology procedures. In an example, the sample well of the SIP consumable is designed to hold 20-30 μL of fluid.

1.2 Spray Nozzle

Figure 1D:
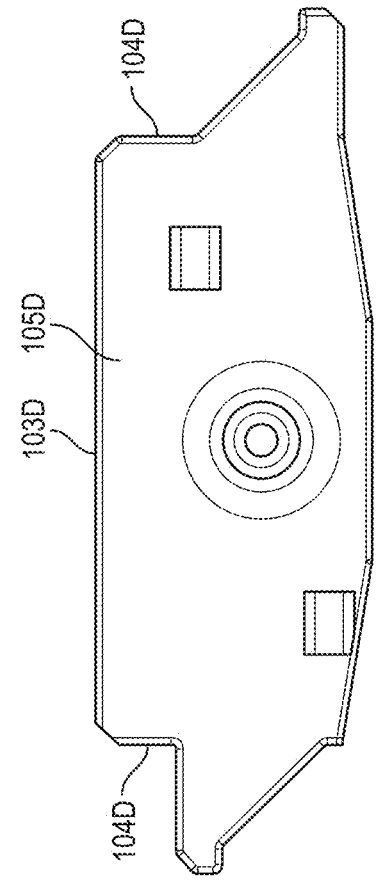
FIG. 1D shows the spray nozzle of the SIP consumable.
Figure 1D:
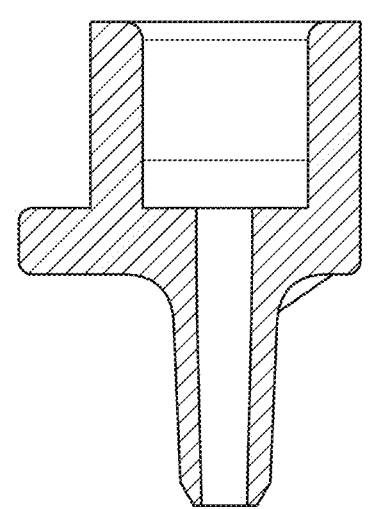
Figure 1D:
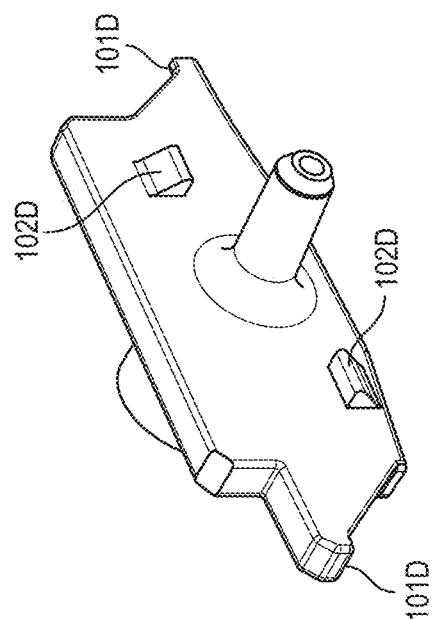

The spray nozzle of the SIP consumable is shown, in different views, in FIG. 1D. In some embodiments, and as shown in FIG. 1D, the spray nozzle features datum surfaces (103D, 104D, 105D) to locate the nozzle tip accurately in relation to the air nozzle, clips (102D) to retain the part on the SIP body when assembled, and hard stops (101D) to prevent over-rotation during assembly.

In some embodiments, the spray nozzle shown in FIG. 1D is designed such that the same part can be used on both sides of the SIP consumable.

In some embodiments, the internal channels of the spray nozzle are tapered to accommodate tooling. The tapered nozzle tip advantageously minimizes turbulence from the air pulse in the immediate vicinity of the spray nozzle. It allows a simple open-shut tool for manufacture, and was found during testing to produce an even distribution of cells on the slide when compared with other designs.

1.3 Moat

Referring back to FIG. 1A, the sample well (101A) of the SIP consumable is surrounded by a larger cavity, the moat (103A). In some embodiments, the moat serves the following purposes:

Catching any overflow should more sample than the sample well can accommodate be dispensed from the needle by the user;

Catching any splatter during dispensation from the needle; and

Serving as a mixing vessel that allows the user to use a pipette to premix the sample with buffer (e.g., to reduce the viscosity of the sample) before depositing it in the well.

1.4 Sorting Spikes

The SIP consumable includes sorting spikes (104A) located above the sample well (101A) that can be used to catch blood clots or debris in the sample prior to its deposition in the sample well. The presence of any type of debris in the sample well typically results in an uneven distribution of cells on the slides, and thus the built-in sorting spikes advantageously enable an independent pre-processing step to remove debris (possibly using other components in a traditional procedure) to be avoided. The sorting spikes may be different in number and arranged differently from the example shown in FIG. 1A. For example, there may be between two and six spikes affixed to the SIP consumable in either a linear, circular, or polygonal configuration to allow blood clots and debris to be excluded from the sample that is deposited in the sample well, thereby prevent clogging in the spray nozzles.

1.5 Thumb Guard

The thumb guard (105A) provides a barrier between a user's thumb and a needle should the user choose to hold the SIP while dispensing into it. Furthermore, it works with the benchtop instrument's cassette (see § 4.2) to create a torturous path to prevent leakage of aerosolized sample from the front of the benchtop instrument.

1.6 Grip Tab

The grip tab (106A) is used to hold the SIP consumable to insert into, and remove from, the benchtop instrument. Furthermore, the grip tab allows a label with patient and procedure information to be affixed thereupon.

1.7 Snap Feature

Figure 2:
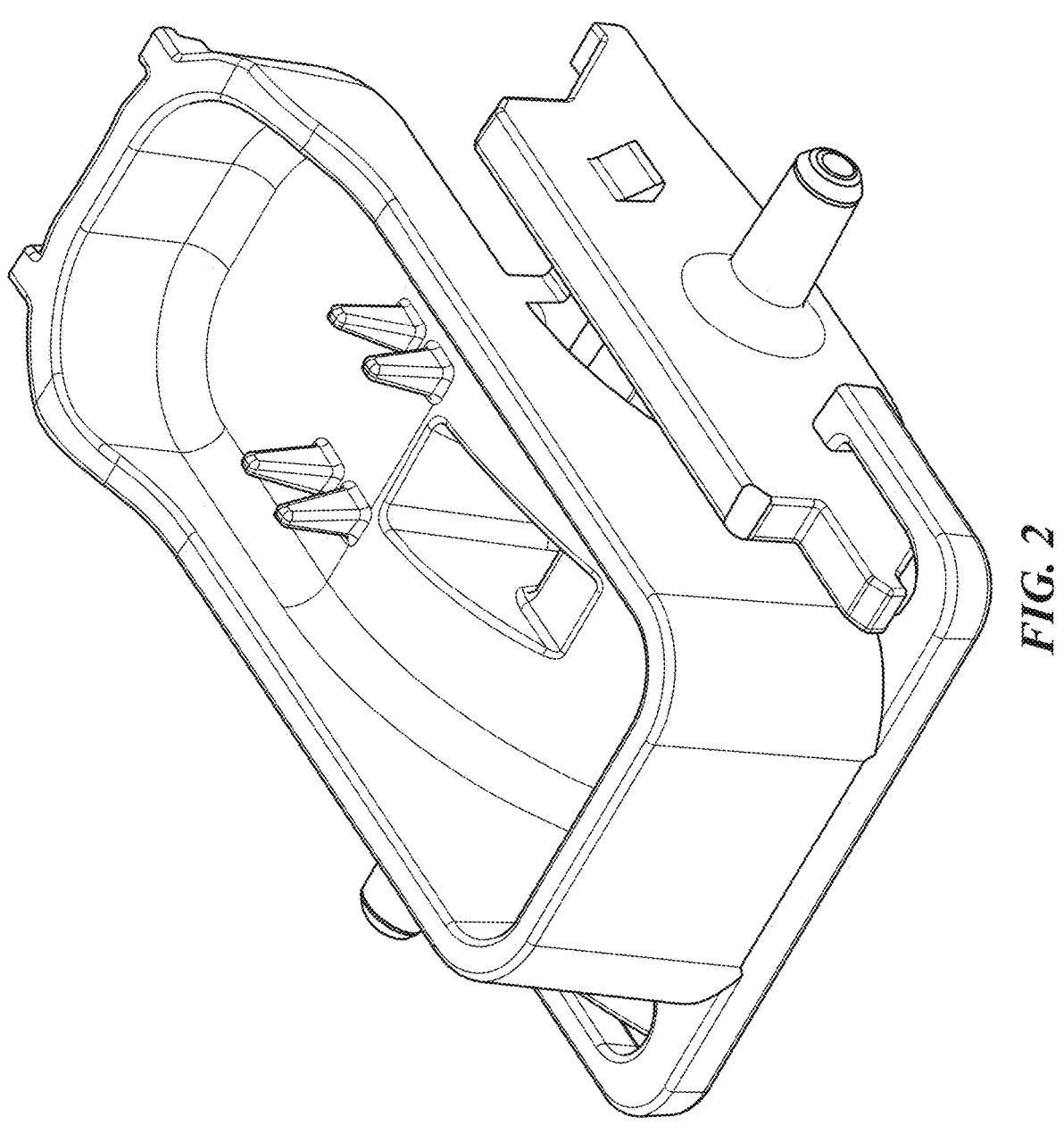
FIG. 2 shows another view of the SIP consumable.

The snap feature (107A), shown in FIG. 1B, allows the grip tab (106A) to be removed from the body of the SIP consumable. This reduces the size of the contaminated portion of the component and allows it to be deposited in a specimen container (e.g., a CytoLyt jar) for preservation of any remaining sample, which can then be transported to a laboratory. FIG. 2 shows the remaining portion of the body of the SIP consumable after the grip tab has been snapped off using the snap feature.

2 Example SIP Stand

Figure 3A:
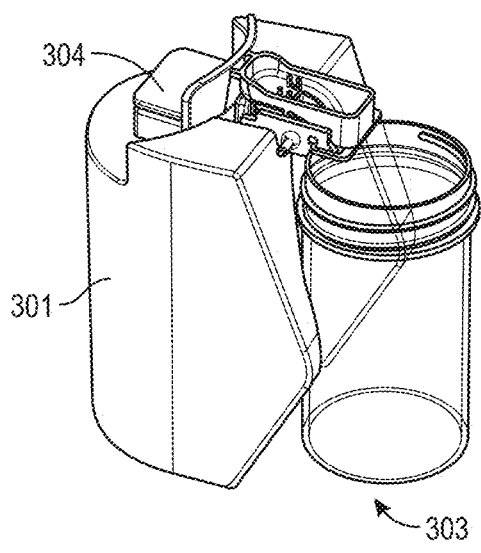
FIGS. 3A-3C show different views of an example SIP stand.
Figure 3B:
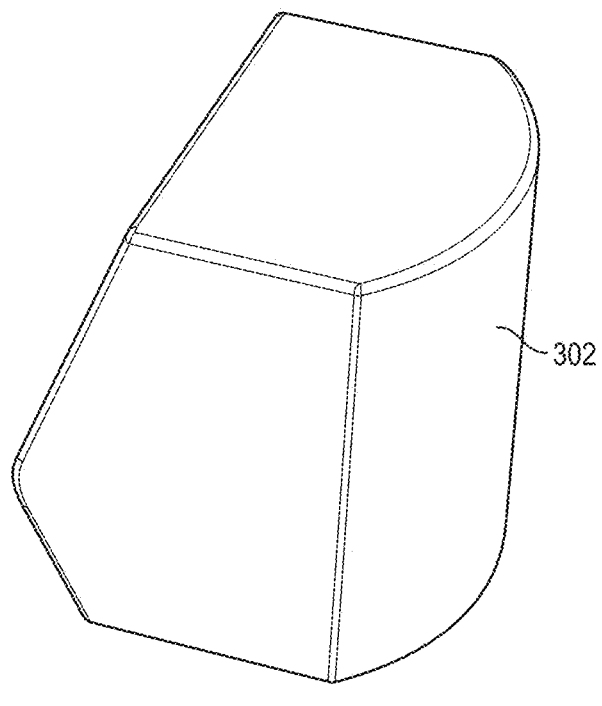
Figure 3C:
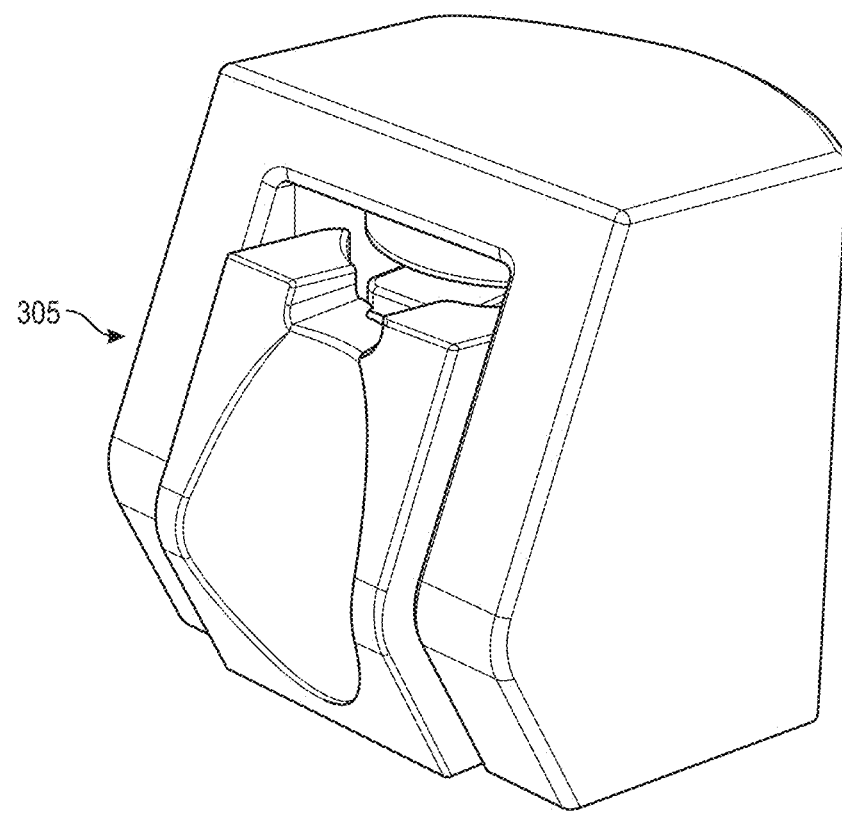

In some embodiments, a SIP stand (301), shown in FIGS. 3A and 3B, holds the SIP consumable (304) for loading of a sample into the sample well. Its position over a specimen container (303) enables any overflow to be caught and also allows the easy transfer of any excess biological material from the needle into the specimen container. By holding the SIP consumable steady, it makes it easier for the user to deposit the sample in the correct place and reduces the chance of a needle prick. The separate arm rest (302) allows the operator(s) to find a configuration which works best for them. The two parts of the SIP stand (the SIP stand 301 and the arm rest 302) may include magnets, which hold the two parts together in its storage configuration (305), as shown in FIG. 3C.

3 Example Hood Consumable

Figures 4A, 4B:
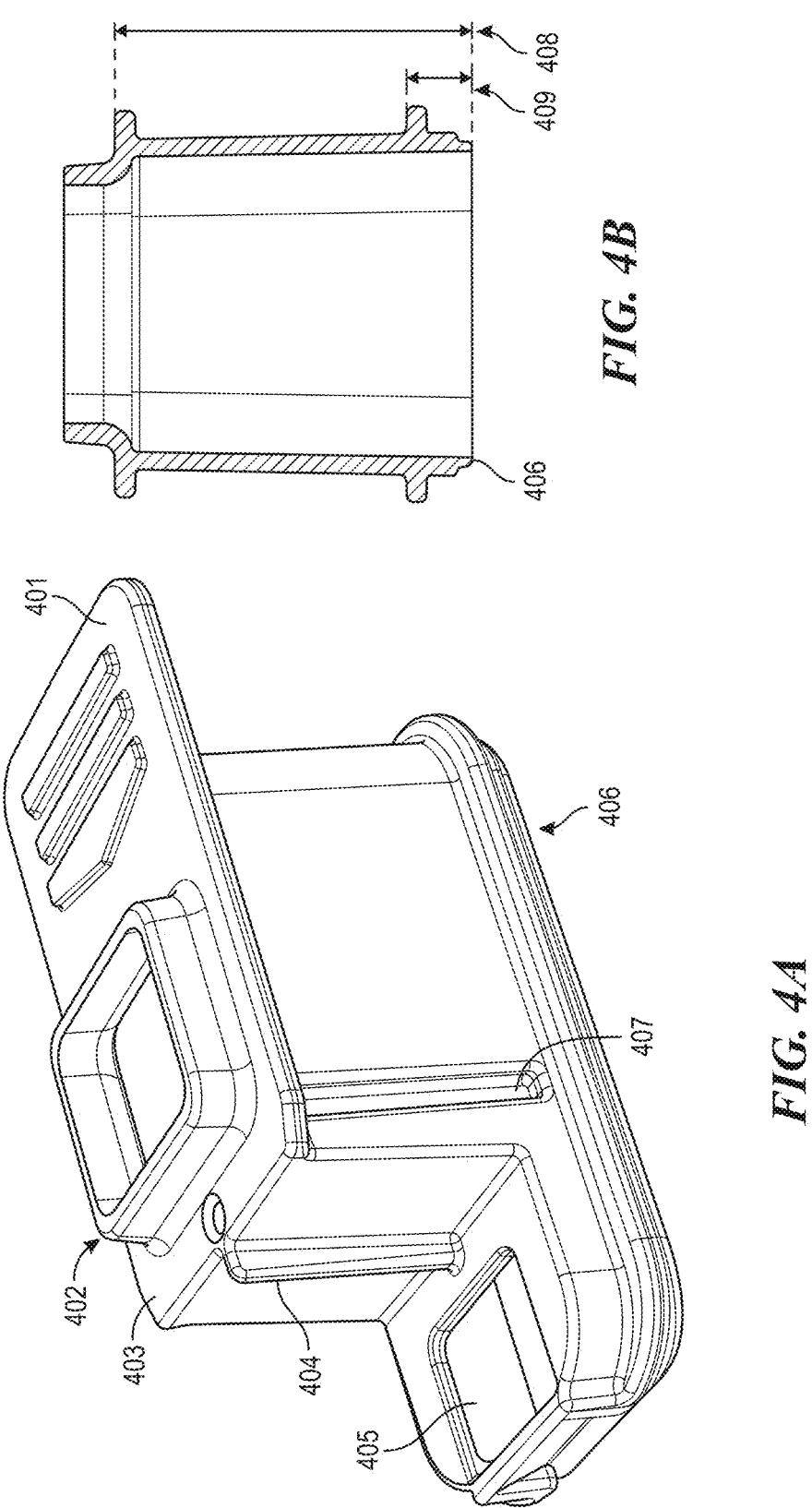
FIGS. 4A and 4B show different views and features of an example hood consumable.

The hood consumable, an example of which is shown in FIGS. 4A and 4B, contain the aerosolized sample and provide a barrier to hold reagents on the slide during a staining protocol. The described benchtop instrument embodiments are configured to use two hood consumables when a "deposit and stain" protocol is being performed, and one hood consumable when a "stain only" protocol is used.

As shown in FIGS. 4A and 4B, the hood consumable includes a hood grip tab (401), a collar (402), a clamping surface (403), an insertion hardstop (404), a reagent port (405), a seal (406), and a detent slot (407), and is characterized by a clamp height (408) and a drain port height (409).

3.1 Hood Consumable Grip Tab

The hood grip tab (401) is for holding the hood to insert it into, and remove it from, the benchtop instrument.

3.2 Collar

In some embodiments, the collar (402) serves the following purposes:

Shielding parts of the benchtop instrument in the immediate vicinity of the spray and the air nozzles from being contaminated by the sample; and Creating a torturous path to prevent leakage of aerosolized sample from around the top of the hood.

The size of the collar is optimized through testing to ensure that it is not too small to adversely affect the air spray and not too large such that positioning the hood in the benchtop instrument becomes difficult.

3.3 Clamping Surface

An evenly-distributed downward force applied to the clamping surface (403) by the benchtop instrument's cassette (see § 4.2) is transferred through the body of the hood and presses the seal (406) face firmly against the slides.

3.4 Insertion Hardstop

The insertion hardstop (404) locates the hood in the longitudinal direction to ensure the reagent port (405) is aligned with the benchtop instrument's reagent nozzles and drain port.

3.5 Reagent Port

The reagent port (405) engages with the benchtop instrument's reagent nozzles and drain port to enable reagents and washes to be added to, and removed from, the right-hand slide for staining.

3.6 Seal

The seal (406) is a thin, flat face which, when clamped against the slide by the benchtop instrument, prevents leakage of aerosolized sample from either slide, as well as reagents and washes from the left-hand slide and aerosolized ethanol from the right-hand slide.

3.7 Detent Slot

The detent slot (407) engages with a ball detent on the benchtop instrument to provide tactile feedback to the user that the hood has been inserted to the correct position. In some embodiments, only the left-hand detent slot is used on both the left-hand and right-hand hoods. In other embodiments, both detent slots are used to ensure that the hood has been positioned correctly.

3.8 Clamp Height

The clamp height (408) is a critical design dimension. As the slide beds are sprung—in order to accommodate a range of slide thicknesses while achieving a constant clamping force—the height of the top face of the slide is set by clamp height.

3.9 Drain Port Height

The drain height (409) is a critical design dimension. The efficacy of the drain port is dependent on its distance from the slide. In an example, the drain port is the same needle that adds the reagent through the reagent port (405). If the distance between the drain port and the slide is too large, excess reagent will not be removed completely, which may not yield the optimal slide sample.

4 Example Benchtop Instrument

Figure 5:
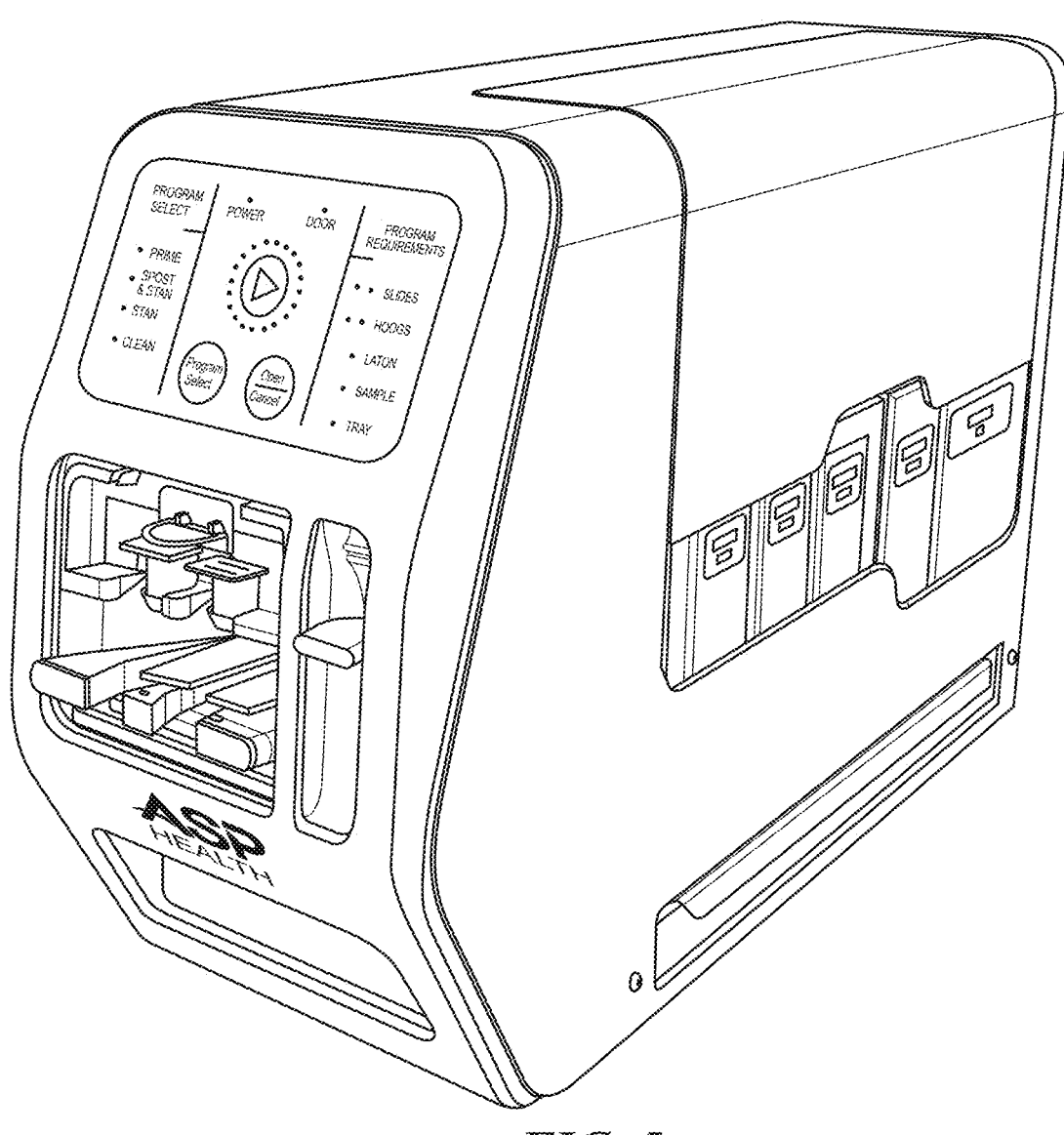
FIG. 5 shows an external view of an example benchtop instrument.
Figure 6:
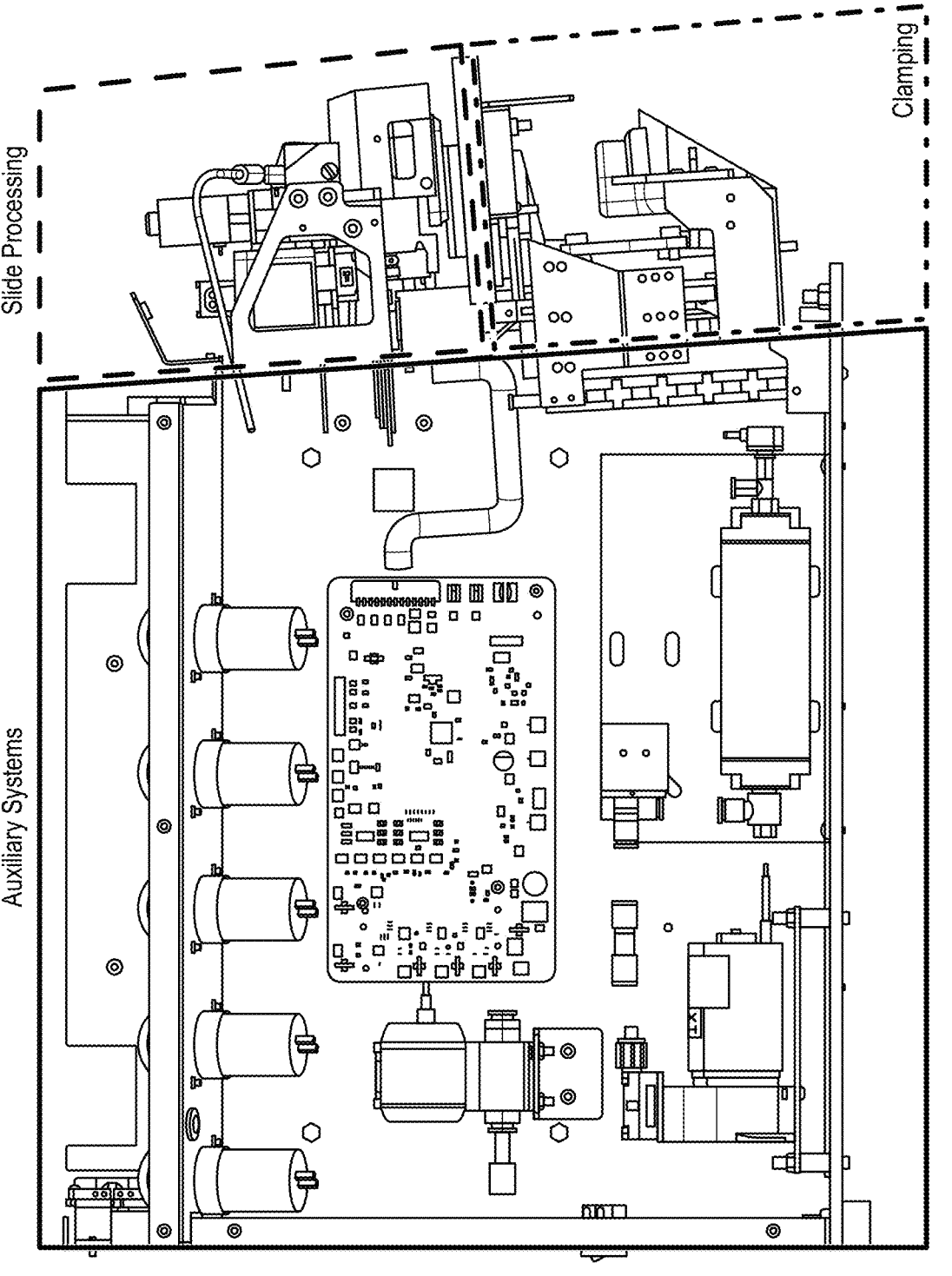
FIG. 6 shows a side open-view of the benchtop instrument.

FIG. 5 shows an external view of an example benchtop instrument, and FIG. 6 shows a side open-view of the benchtop instrument. As shown in FIG. 6, the benchtop instrument includes the slide processing and clamping modules at the front of the instrument, and an auxiliary systems module at the rear that makes up the main body of the device. The slide processing module receives consumables (hoods and slides) and the SIP consumable from the user and also contains the user interface. The auxiliary systems module contains the electronics, the pneumatics system, and reagent pumps and bottles.

4.1 Auxiliary System

Figures 7A, 7B:
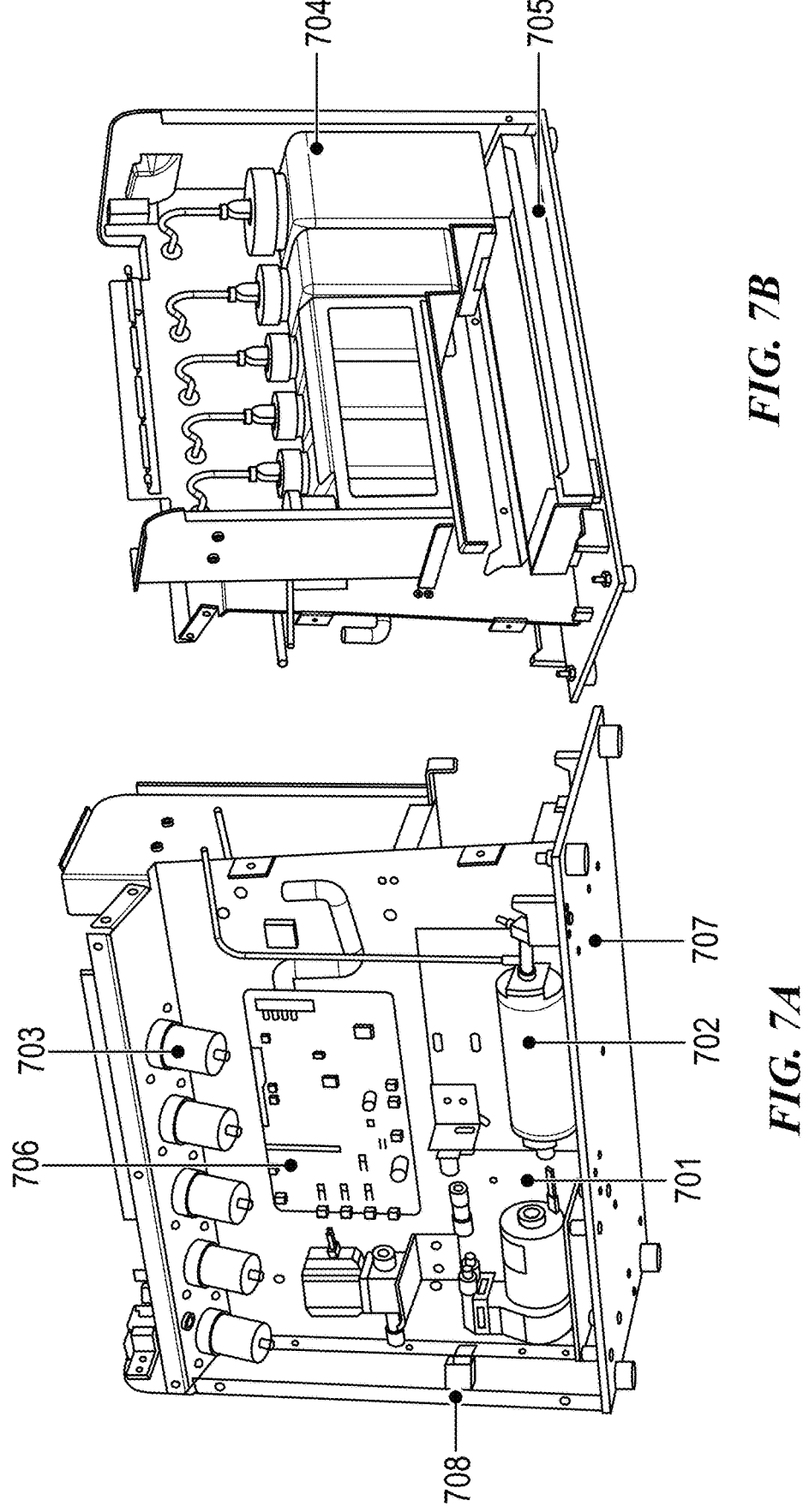
FIGS. 7A and 7B show open-views of both sides of an example auxiliary system of the benchtop instrument.

The auxiliary system, shown in FIGS. 7A and 7B, includes the chassis (701), the pneumatic system (702), the peristaltic pumps (703), bottles (704), a drip tray (705), the electronics (706), and a power inlet (707).

4.1.1 Chassis

Figure 8:
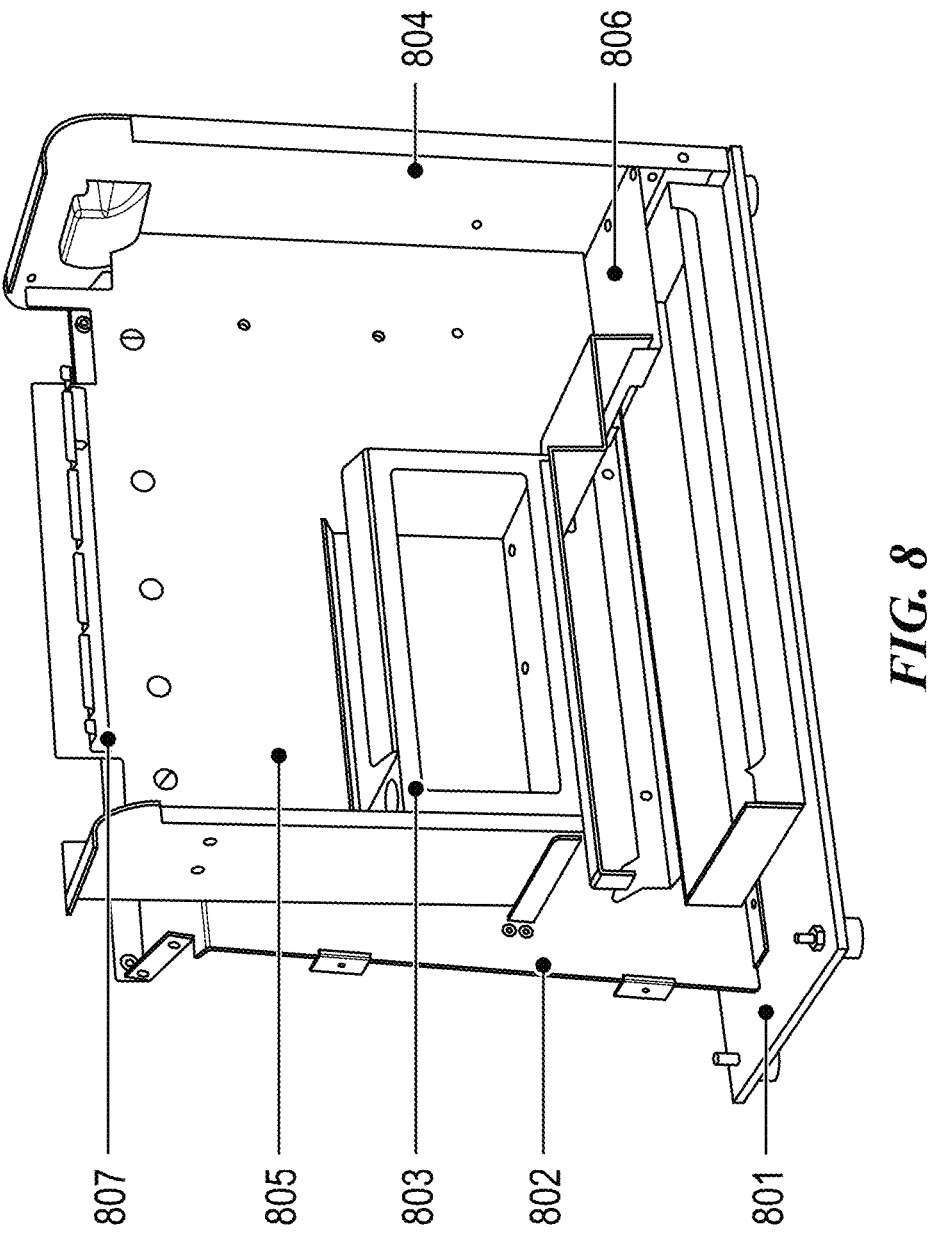
FIG. 8 shows an example of a chassis of the auxiliary system.
Figure 9:
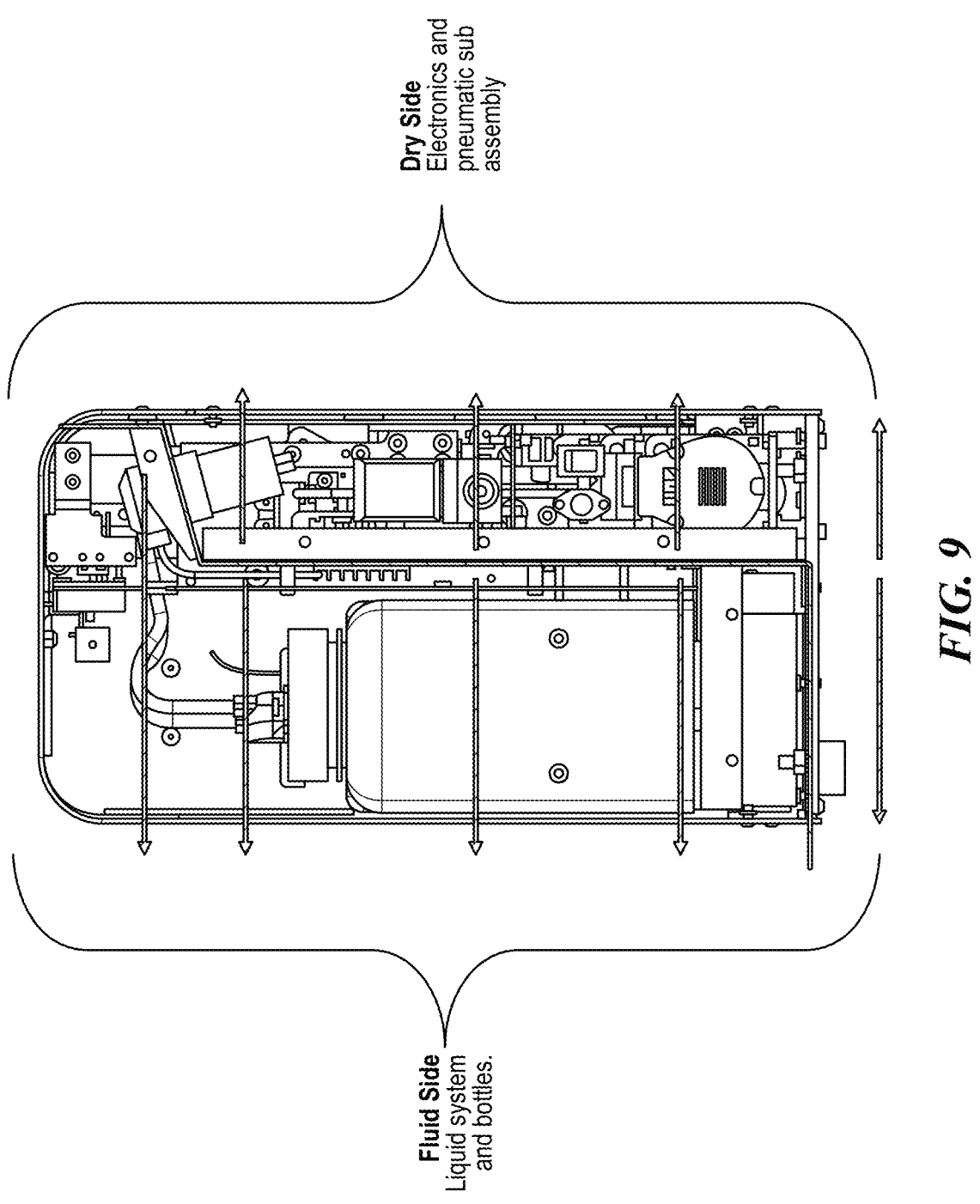
FIG. 9 shows an example of a chassis spine that separates the "fluid" side of the benchtop instrument from its "dry" side.
Figures 10A, 10B:
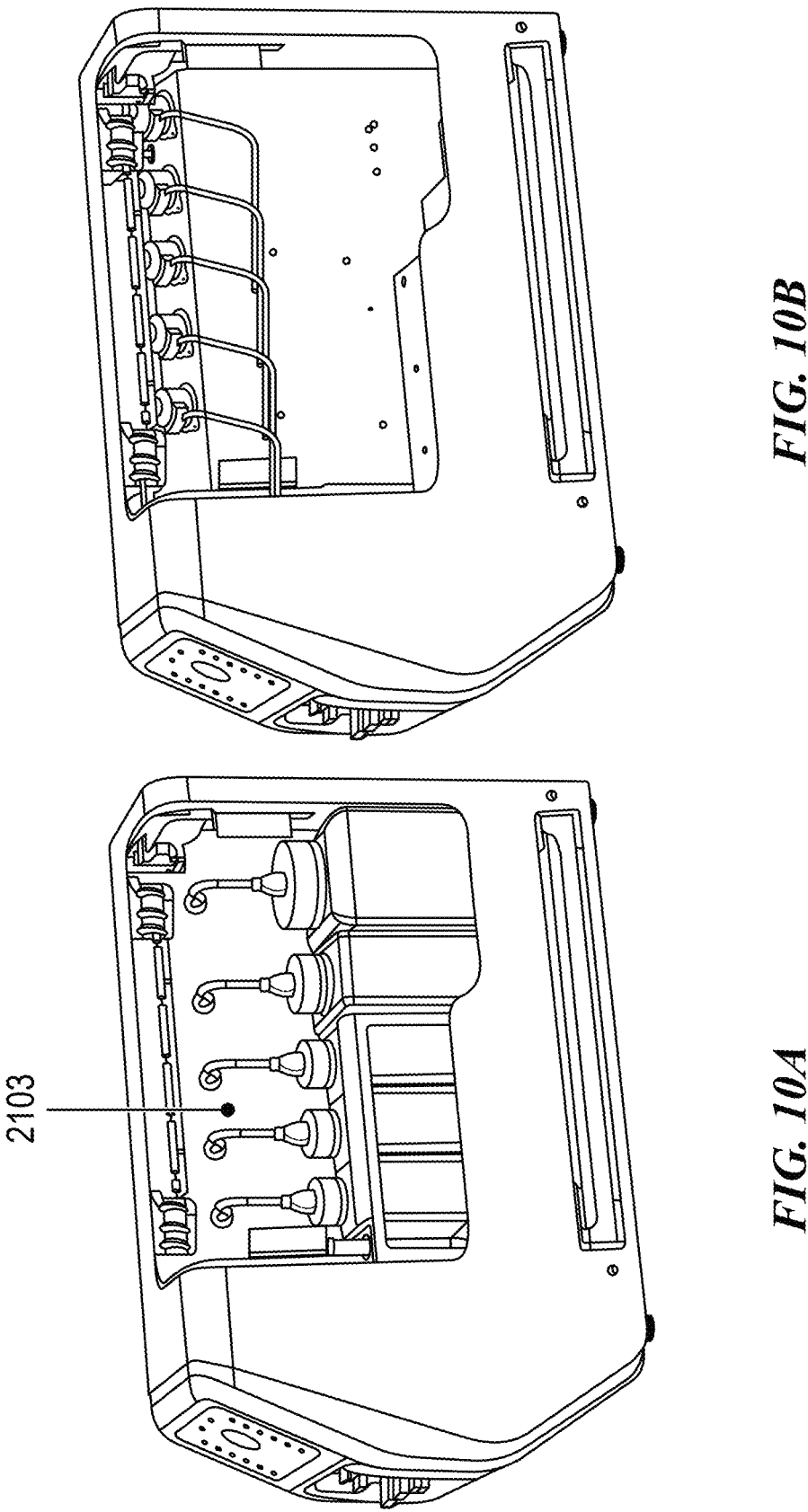
FIGS. 10A and 10B show an example of a false wall, which provides a neat appearance to the bottle cavity, in the benchtop instrument.

The chassis (701) provides the structural framework of the benchtop instrument, and is shown in FIG. 8. As shown therein, the chassis includes the following components:

Base plate (801), which is machined from a 6 mm aluminum plate and provides rigidity to the chassis;

Chassis spine (802), which separates the reagent bottles, tubing and pumps from the electronics and the pneumatic system, and provides mounting points for various components of the system. As shown in FIG. 9, the chassis spine separates the fluid side (liquid system and bottles) from the dry side (electronics and pneumatic sub-assembly);

Milk crate (803), which is a removable holder for the reagents, buffers and/or fixatives. In an example, the milk crate is designed to hold 250 ml bottles for three reagents used in the staining protocol as well as two 15 ml vials of buffer and ethanol fixative for the left-hand side;

Back plate (804), which is machined from 1.6 mm steel;

False wall (805), which provides a barrier between the reagent bottles and their pumps and tubing. FIGS. 10A and 10B show an example of the false wall (1001), which covers the majority of the tubing, thereby imparting a neat appearance to the bottle cavity and allowing it to be easily wiped;

Bottle shelf (806), which is staggered such that the tops of the variously-sized bottles are level, and is configured to direct any leakage to the drip tray beneath; and Tube holder (807), which provides hooks to hold the bottle connectors when they are detached. In some embodiments, the position of the tube holder prevents the door from being closed when it is in use, which serves as a reminder to the user to reconnect the bottles.

4.1.2 Pneumatic System

Figure 11A:
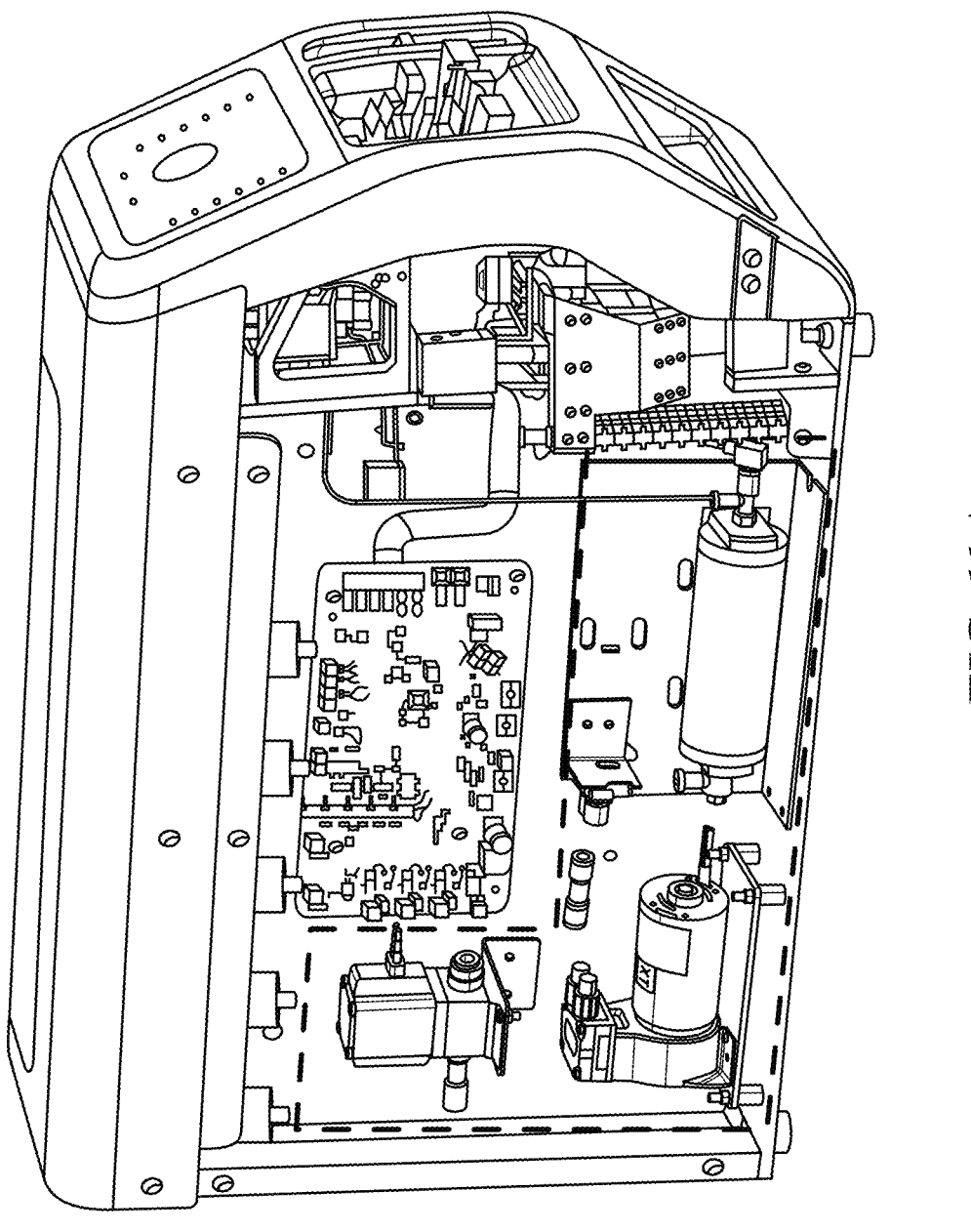
FIGS. 11A-11C show examples of the pneumatic system used in the benchtop instrument for spray deposition.
Figure 11B:
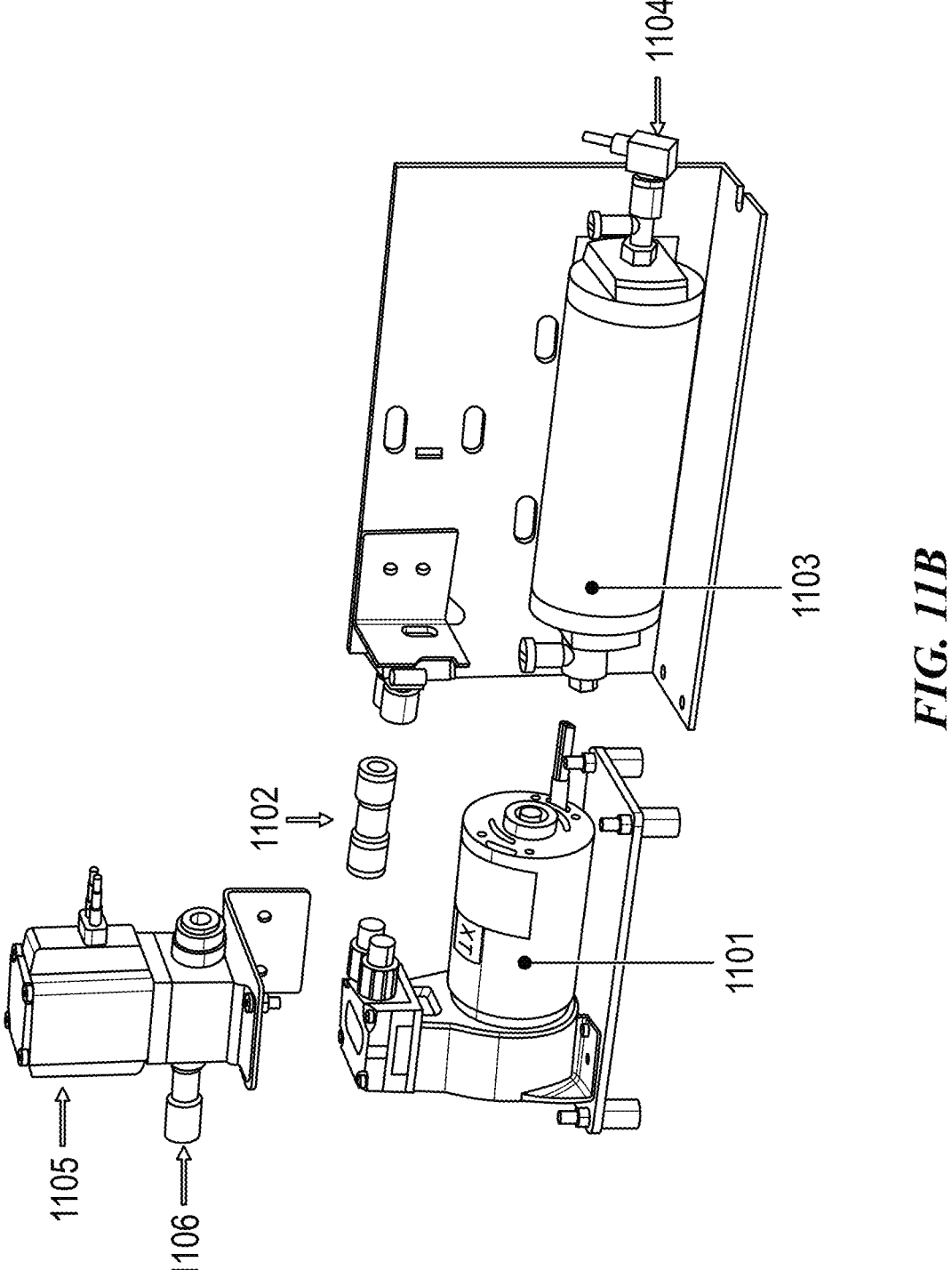
Figure 11C:
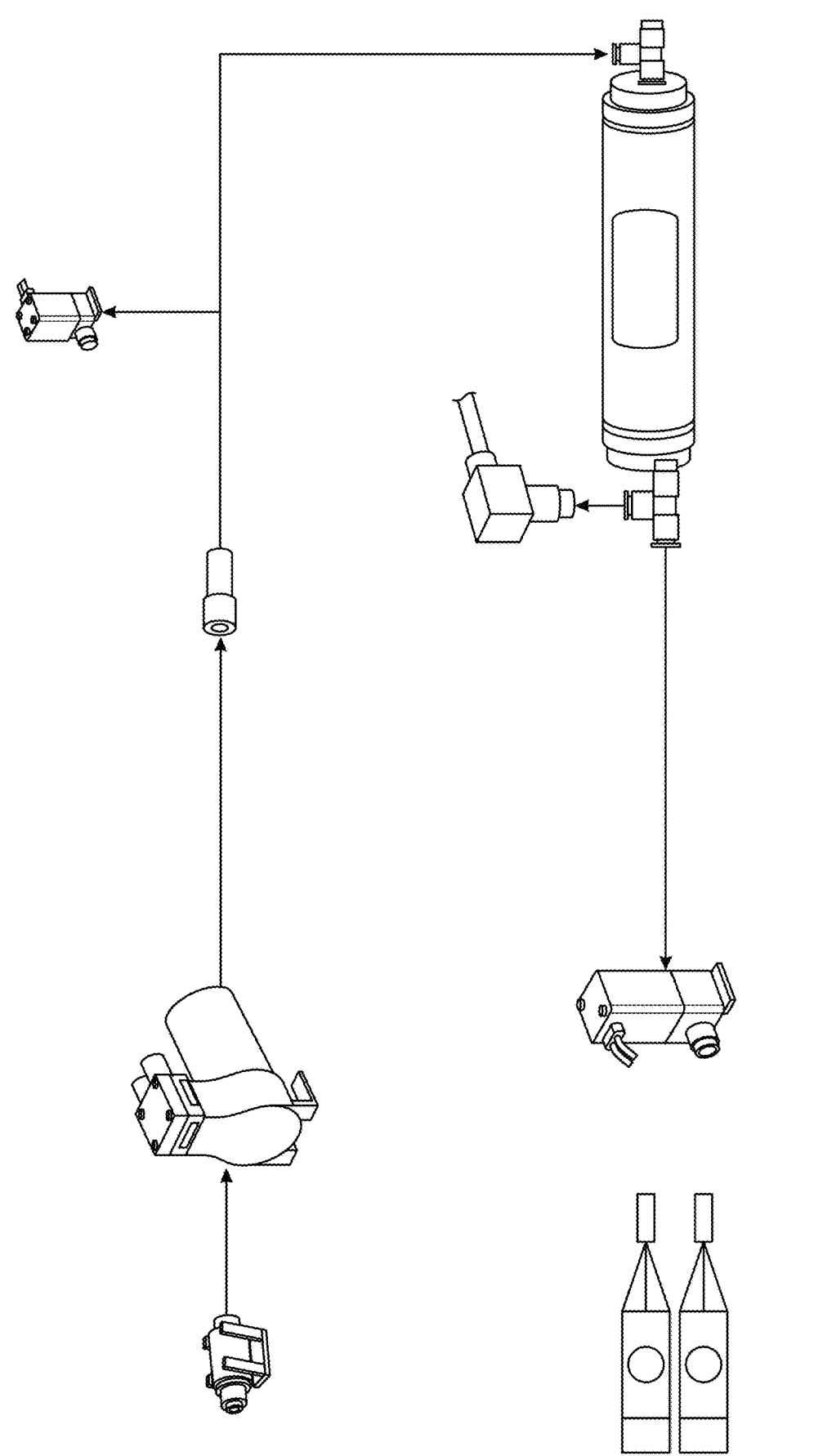

The pneumatic system (702), shown in FIGS. 11A-11C, is used in the benchtop instrument for spray deposition. FIG. 11A shows the configuration and position of an example pneumatic system in benchtop instrument. In some embodiments, the pneumatic system is only pressurized immediately prior to a spray deposition and vented immediately after. In an example, all fittings and tubing are rated to 1 MPa (145.0 psi) and the air pump can achieve a maximum pressure of 0.55 MPa (79.8 psi). Furthermore, all tubing and fittings upstream of the accumulator are sized at 6 mm to match the air pump outlets, and all downstream are sixed at 4 mm.

FIG. 11B shows a rendering of the components of the pneumatic system and FIG. 11C shows the real components used therein. As shown in FIG. 11B, the pneumatic system includes:

Air pump (1101), which is a brushless air pump with a maximum pressure of 550 kPa (79.8 psi) and a flow rate (at atm): 2.7 L/min;

Check valve (1102), which prevents air from flowing from the accumulator back towards the pump. In some embodiments, the check valve has tubing with an outer diameter of 6 mm and a maximum pressure of 1 MPa (145.0 psi);

Accumulator (1103), which is a stainless steel tank that contains a rubber bladder filled with compressed gas. In some embodiments, the accumulator is 6 cubic inches and ⅛ NPT ports and SMC fittings (e.g., 1×6 mm OD tube, 1×4 mm OD tube). The volume of the accumulator was optimized to provide a consistent pressure during the air pulse while minimizing the footprint;

Pressure sensor (1104), which measures from 0 to 1 MPa (145.0 psi) with a 0-5 V analogue output and 4 mm OD tube connection interface;

Normally open valve (1105), which ensures that the accumulator will vent when the system is unpowered, preventing maintenance on, and transport of, a pressurized system; and Silencer (1106) (or pneumatic muffler), which reduces noise levels and the unwanted discharge of contaminants from the pneumatics.

4.1.3 Peristaltic Pumps

The peristaltic pumps (703) deliver the reagents and water for the staining protocol to the right-hand side of the benchtop instrument and remove the waste. In some embodiments, five peristaltic pumps are used to deliver the reagents and water for the Romanowsky staining protocol, and to remove the waste. In some embodiments, the peristaltic pumps are driven by brushed DC motors, controlled by software, and configured to operate in either direction.

4.1.4 Bottles

The bottles are used to house the reagents, fixatives, water, etc. In some embodiments, the bottle capacities are configured based on an expected processing of slides in a day in a cytopathology department.

In an example, it is assumed that 120 pairs of slides on the benchtop instrument, and the bottle capacities are specified to require the water and waste bottles to be changed once in the middle of the day and the reagents (methanol, ethanol fixative and the stains) and buffer to last an entire day. In this example, the bottle volumes used are:

Methanol, Stain 1 and Stain 2: 250 ml each;

Water, 500 ml;

Waste, 1000 ml;

Buffer (e.g., PBS), 15 ml; and

Fixative (e.g., CytoFix), 15 ml.

In some embodiments, the 250 ml, 500 ml and 1000 ml bottles are HDPE for compatibility with the reagents and use no-drip fittings to prevent spillage.

In some embodiments, the buffer and ethanol fixative are contained in 15 ml conical polypropylene tubes.

4.1.5 Drip Tray

Figure 12:
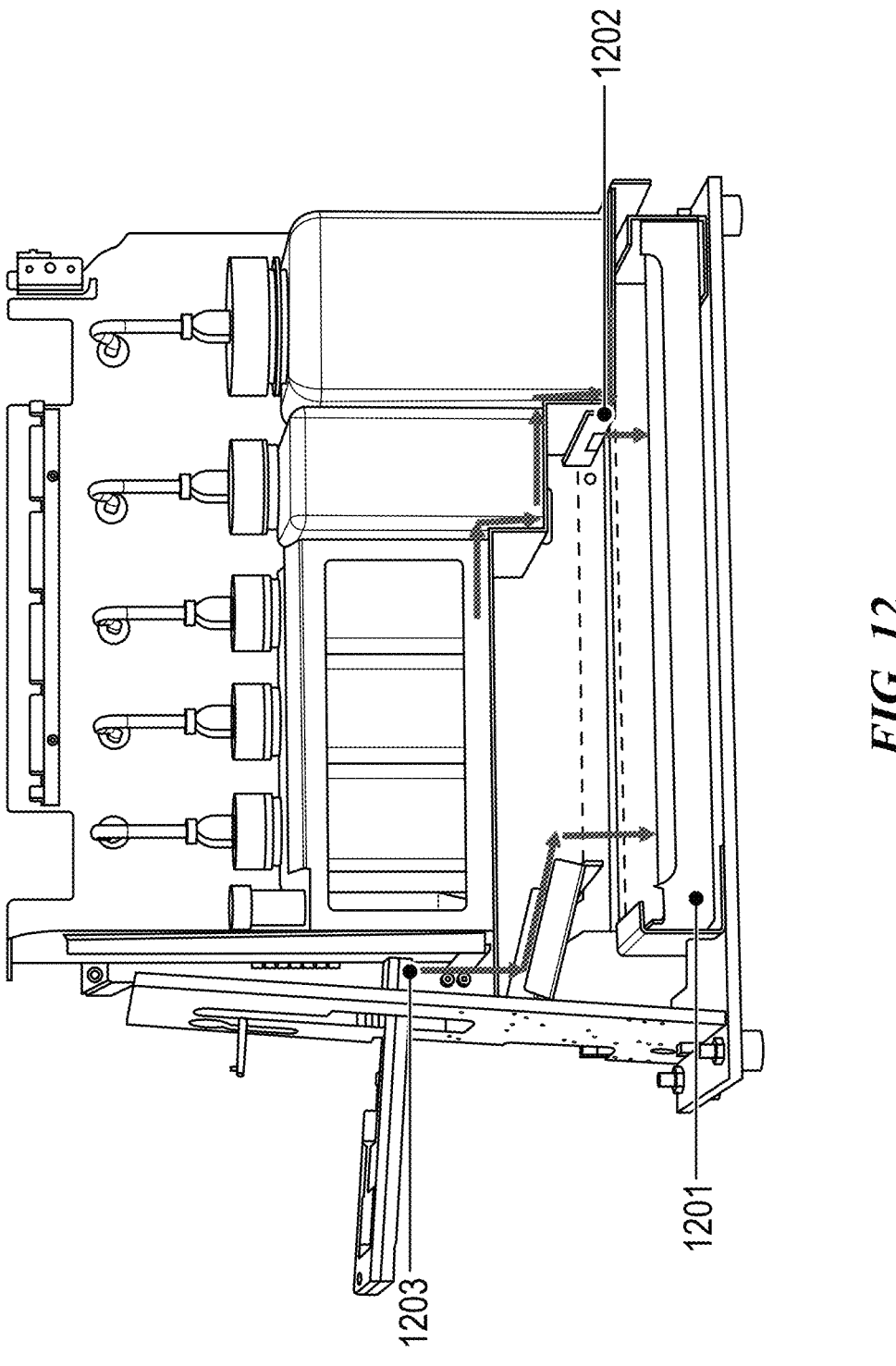
FIG. 12 shows an example of the drip tray in the benchtop instrument.

The drip tray (705) is shown in FIG. 12. As shown therein, the drip tray directs liquids from the bottle shelf (1202) and slide processing overflow port (1203) to the drip tray (1201) which can be removed by the user and emptied as required. In an example, the drip tray is fabricated from 1.6 mm stainless steel.

4.1.6 Electronics

In some embodiments, the electronics (706) run on a 24V DC power supply, and include (i) a first printed broad circuit assembly (PCBA) for the user interface (see § 4.8), including its capacitive touch pads and light-emitting diodes (LEDs) and (ii) a second PCBA containing all the other circuitry required for the software to control the pumps, the valves, the heater, and receive inputs from the system's sensors.

4.1.7 Power Inlet

In some embodiments, the benchtop instrument is powered by a 24V DC power supply. In some embodiments, the benchtop instrument may be configured with a hard power switch next to the power inlet (707) on the back, which is connected to a power LED on the user interface at the front of the benchtop instrument.

4.2 Slide Processing

Figure 13B:
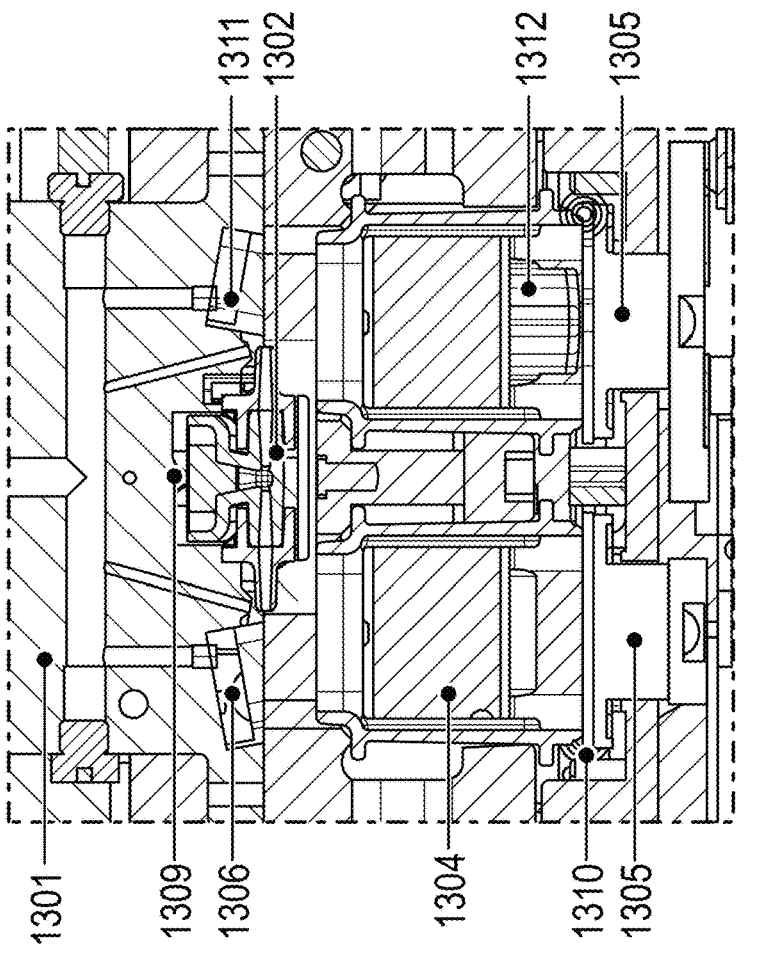
FIGS. 13A and 13B show an example of a slide processing mechanism, which is further detailed in FIGS. 14-31.
Figure 13B:
Figure 13A:
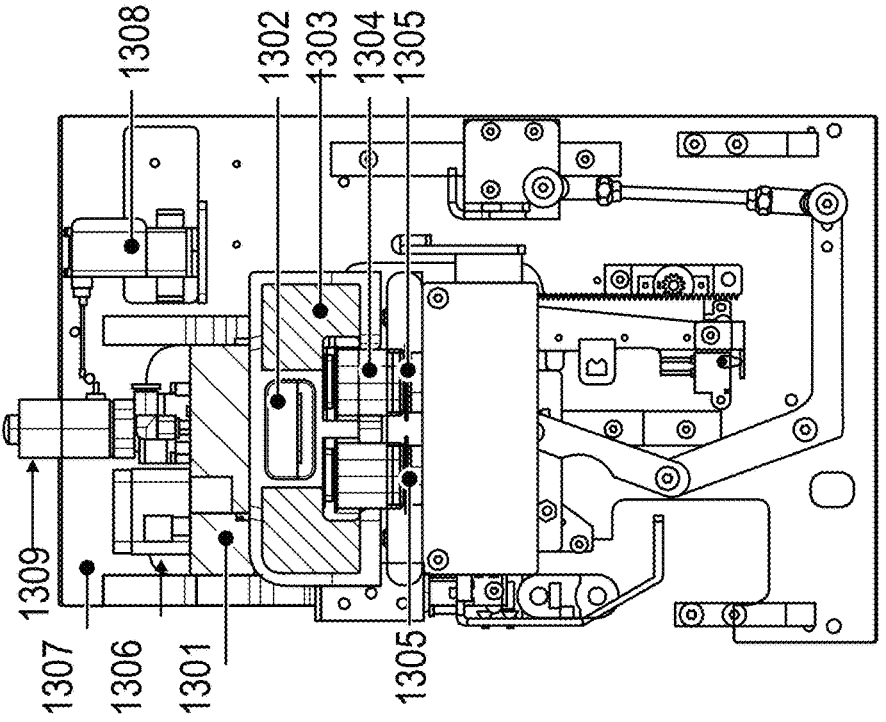

FIGS. 13A and 13B show an example of the slide processing mechanism of the benchtop instrument. As shown therein, the slide processing mechanism includes a SIP consumable dock (1301), the SIP consumable (1302), a cassette (1303), the hood consumable (1304), slide beds (1305), an ethanol fixative system (1306), a bulkhead (1307), an air spray valve (1308), a buffer system (1309), a slide (1310), an air curtain (1311), and a reagent manifold assembly (1312).

4.2.1 SIP Dock

Figures 14A, 14B, 14C, 14D:
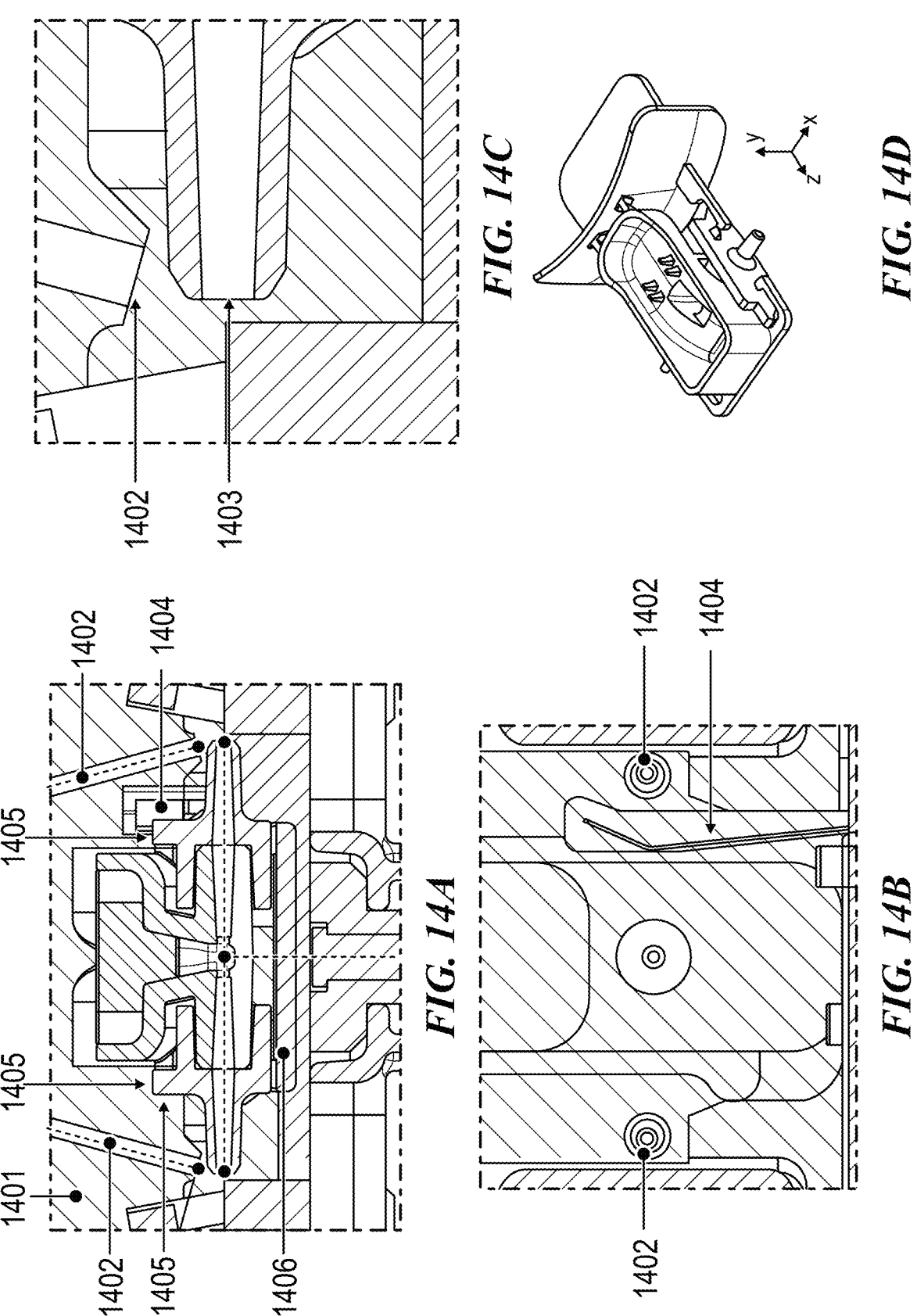
FIGS. 14A-14C show an example of a SIP dock.

The SIP dock, shown in FIGS. 14A-14C (in addition to an orientation detail), locates (or situates) the SIP in the benchtop instrument so that the air nozzles (1402) and spray nozzles (1403) are aligned. Alignment between the air and spray nozzles is important because it affects the strength of the venturi effect on each spray nozzle and, consequently, determines the overall volume of sample sprayed and the evenness of the distribution of the sample (e.g., achieving a monolayer of cells) between the two slides. As shown therein, the SIP dock includes SIP manifold (1401), air nozzles (1402), SIP nozzles (1403), SIP side spring (1404), SIP datums (1405), and SIP bed (1406).

Figure 15:
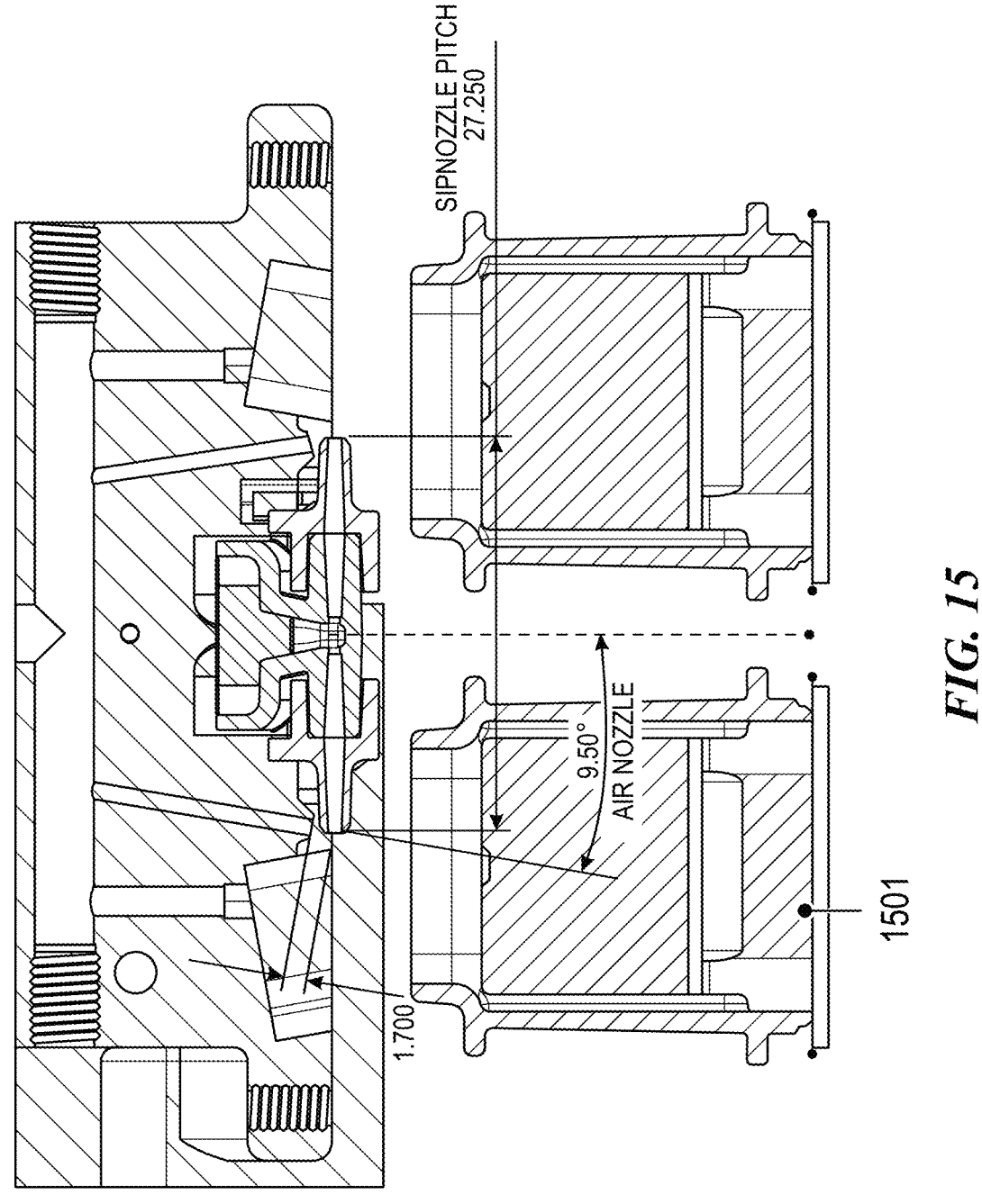
FIG. 15 shows an example of the geometry of the air nozzle.

Air nozzles (1402) are shown in FIG. 15. As seen therein, the air nozzle tips are located 1.7 mm from the center of the SIP nozzle tips and at an angle of 9.5° to the vertical. While a line drawn to follow this trajectory would land outside the center of the slide (1501), testing has shown that the spray 'curves' around the tip of the spray nozzle resulting in a centered spray from this geometry.

Figure 16A:
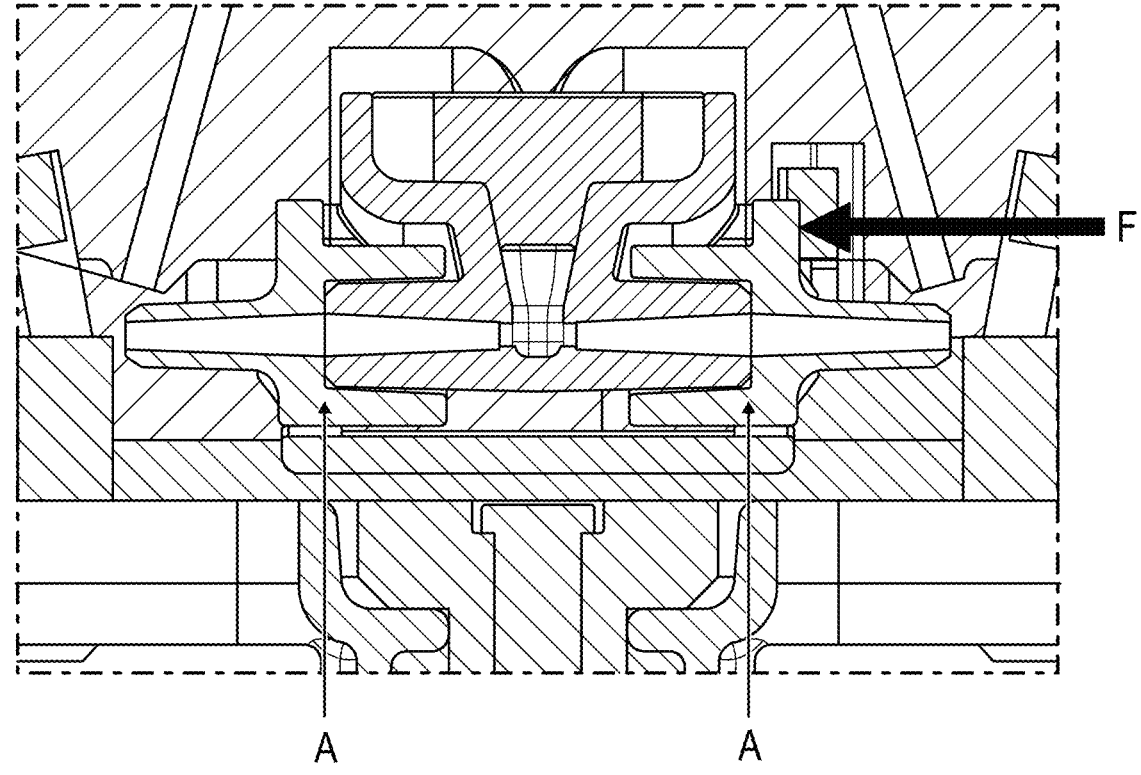
FIG. 16A shows an example operation of the SIP side spring.

SIP side spring (1404), shown in FIG. 16A, provides a force (denoted "F" in FIG. 16A) to (i) clamp the SIP nozzles against the SIP body to minimize leakage at points 'A' in FIG. 16A, and (ii) press the left-hand SIP side datum against its hardstop to accurately locate the SIP nozzle tips under the air nozzles.

Figure 16C:
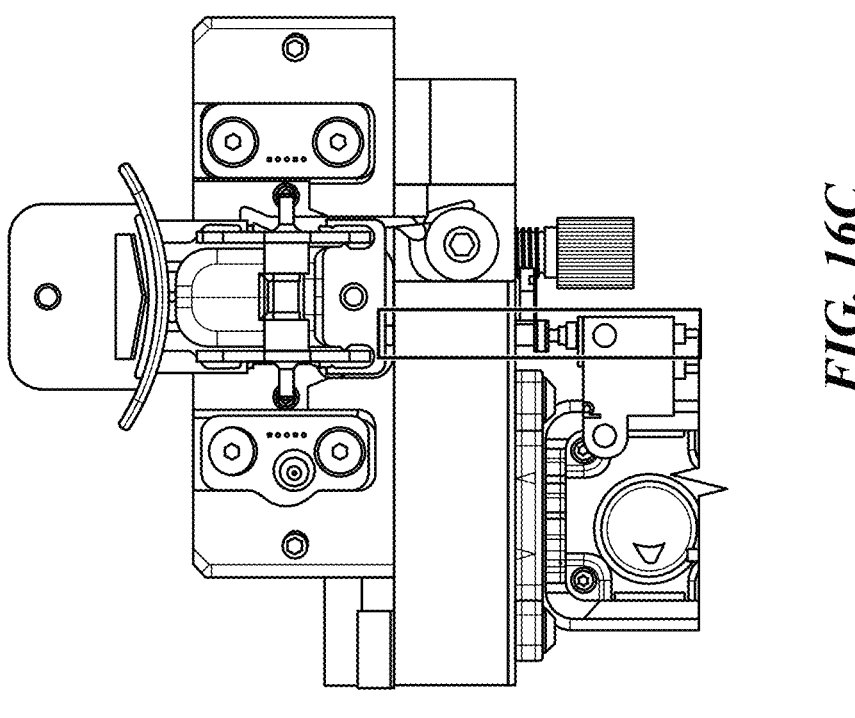
FIGS. 16B and 16C show an example operation of the SIP switch.
Figure 16B:
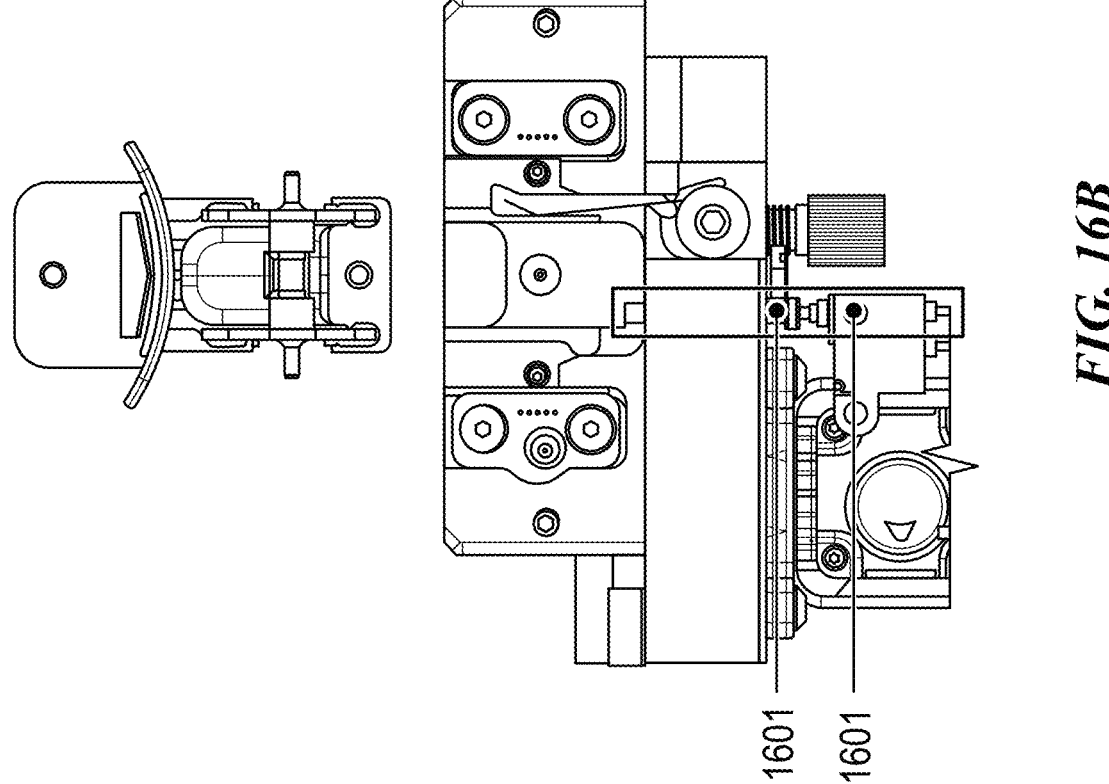

Operation of SIP switch is shown in FIGS. 16B and 16C. As shown therein, the insertion of the SIP moves the switch rod (1601) to activate the SIP switch (1602). This switch allows the software to determine whether a SIP is present and provide feedback to the user if required.

Figure 17:
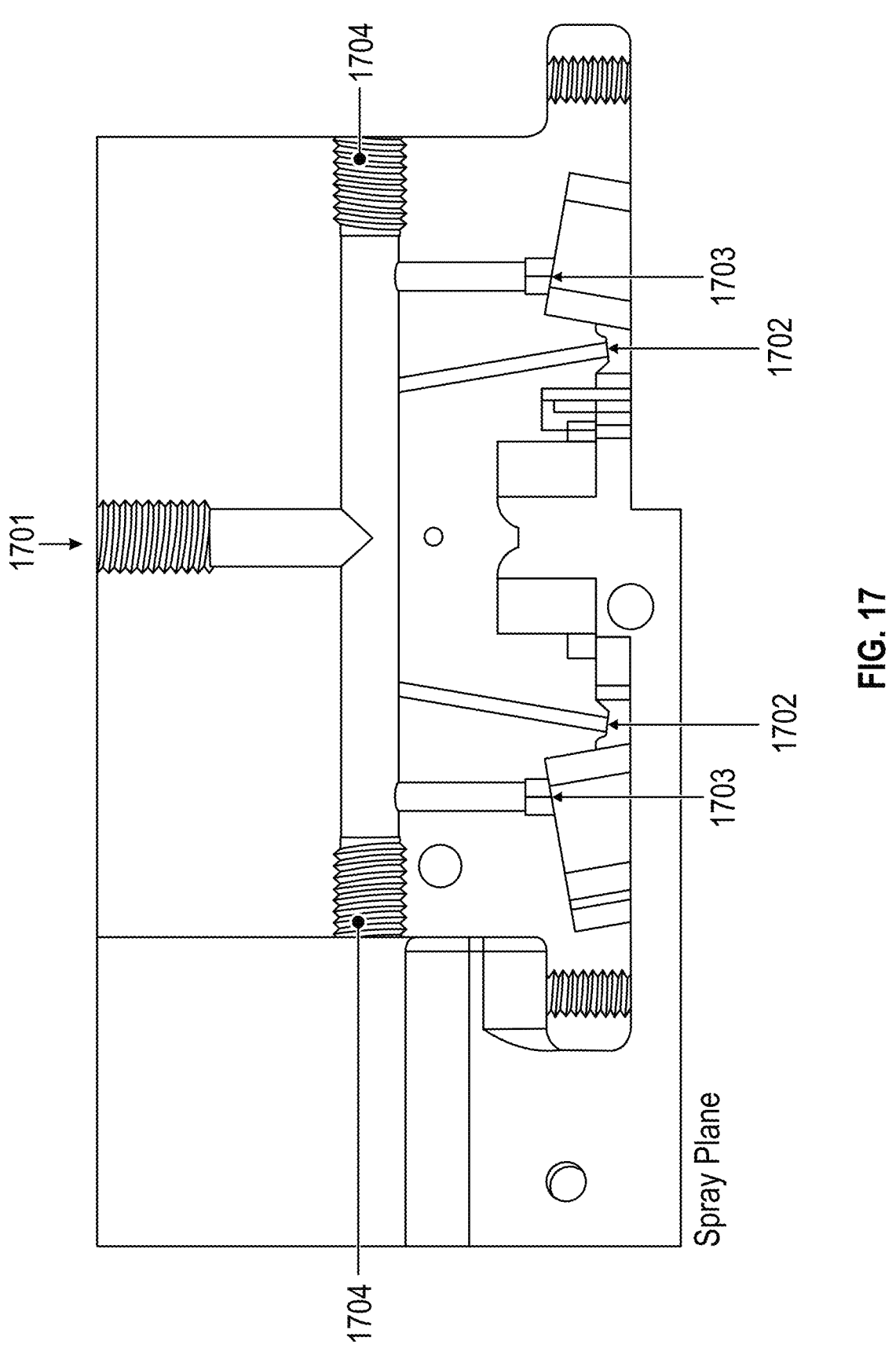
FIG. 17 shows an example of the SIP manifold.
Figures 18A, 18B, 18C, 18D, 18E:
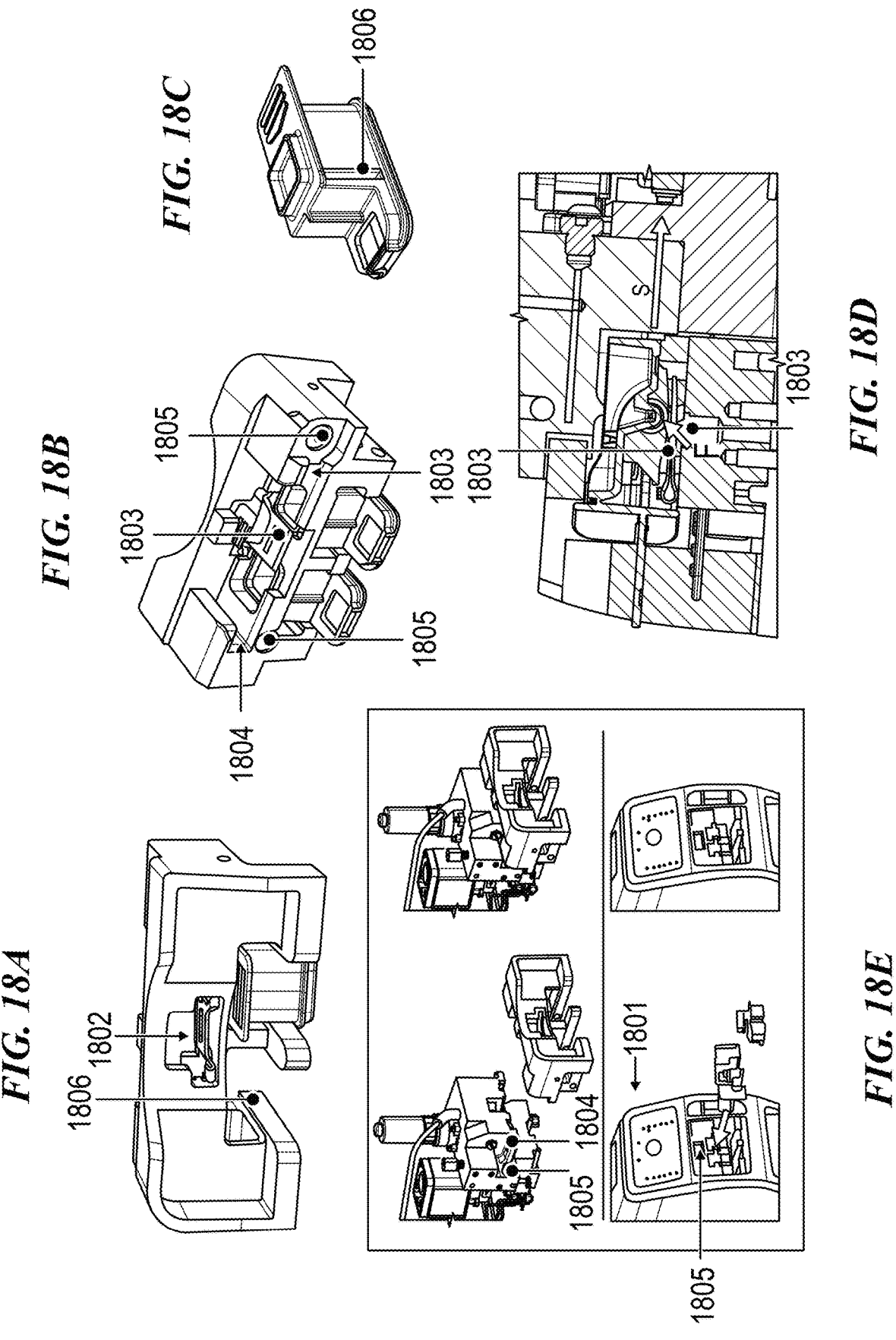
FIGS. 18A-18D show an example of a removable cassette.

SIP manifold (1401), shown in FIG. 17, performs a number of functions. As well as locating the SIP accurately in relation to the air nozzles using the datum features and spring described above, it directs the supply of air from the spray valve (1701) to the primary air nozzles (1702) and the air curtain cavities (1703). Plugs are used at either end of the air supply t-section (1704) to enable the air path to be split while still being machined out of a single piece of material.

4.2.2 Cassette

The removable cassette (1303), which is shown in FIGS. 18A-18D, allows access to critical parts of the instrument for cleaning (1801). It also contains a number of features to locate the SIP and hood consumables in the instrument.

In some embodiments, the cassette is replaced with the priming tray (not shown) which catches excess liquids when the priming protocol is run. As shown in FIGS. 18A-18D, the cassette includes the following components:

SIP port (1802), which is the hole into which the SIP is inserted is smaller than the thumb guard and, consequently, the SIP cannot be inserted backwards or upside down. The contaminated portions of the SIP (moat and well area) do not come into contact with the cassette or SIP Manifold during insertion or operation. When a SIP is inserted, the curved face surrounding the port combines with the SIP thumb guard to create a torturous path to prevent aerosolized sample from escaping, SIP bed (1803) serves two functions: (i) providing a tactile click to indicate that to the user that they have inserted the SIP sufficiently, and (ii) providing a force on the underside of the SIP nozzles to firmly push its front and top locating features into their reciprocal surfaces on the SIP manifold;

Cassette rails (1804), which allow the cassette to be pushed into the instrument by the user and hold it in place during operation;

Cassette magnets (1805), which locate and hold the cassette firmly in place in the instrument; and Hood ball detent (1806), which prevents the hood from being removed once the SIP consumable has been inserted into the SIP port.

4.2.3 Slide Beds

The benchtop instrument has two slide beds to hold the two slides for 'deposit and stain' processing, or a single slide (on the right) for a 'stain only' protocol. The beds locate the slides accurately under the spray and reagent nozzles, provide an upward spring force to ensure sealing of the hood consumables on the top face of the slides and the right hand bed has a heater to reduce the drying time of that slide.

In some embodiments, the slides are inserted by hand and easily located.

Figures 19A, 19B:
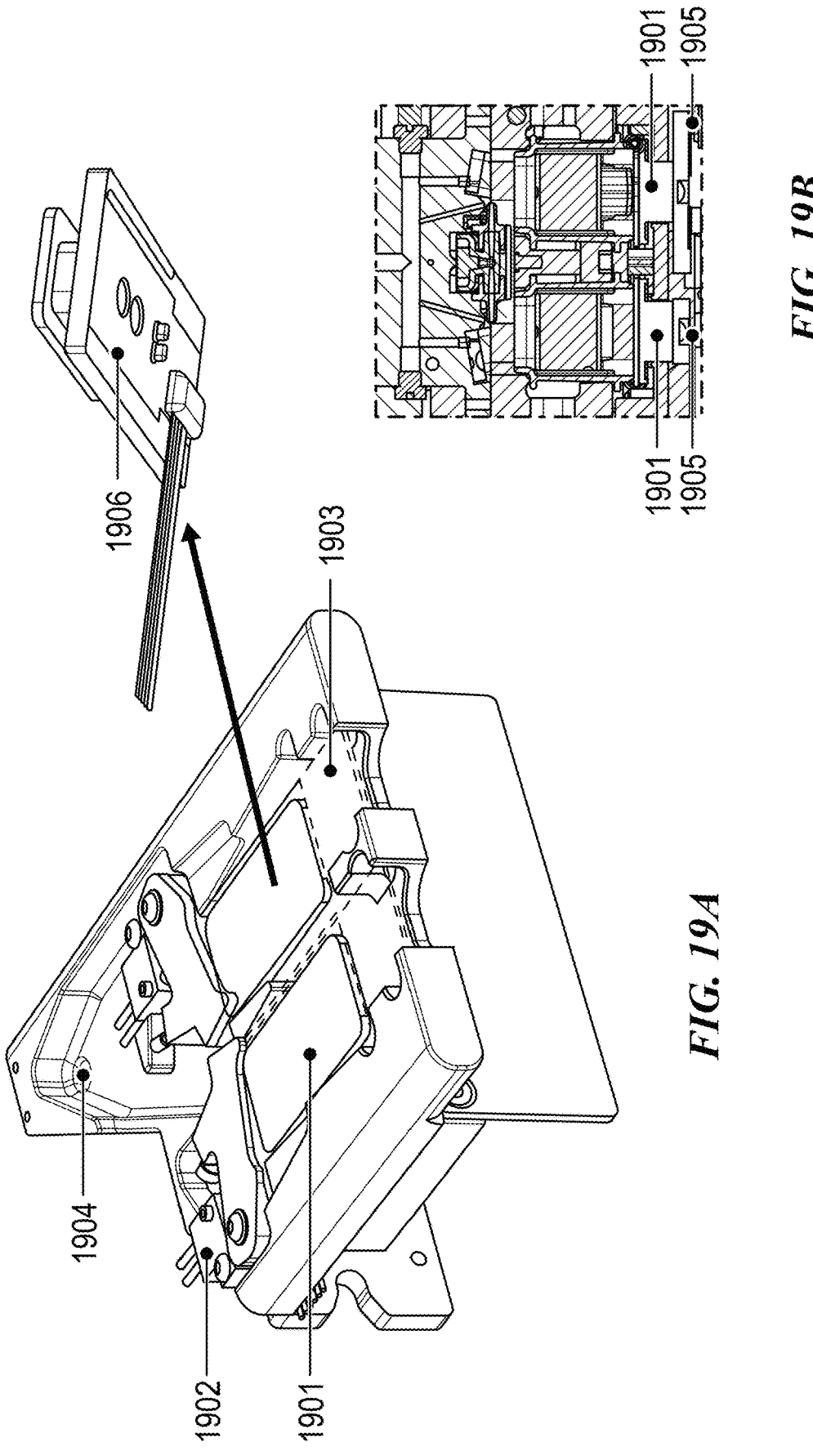
FIGS. 19A and 19B show an example of the slide beds.
Figure 20A:
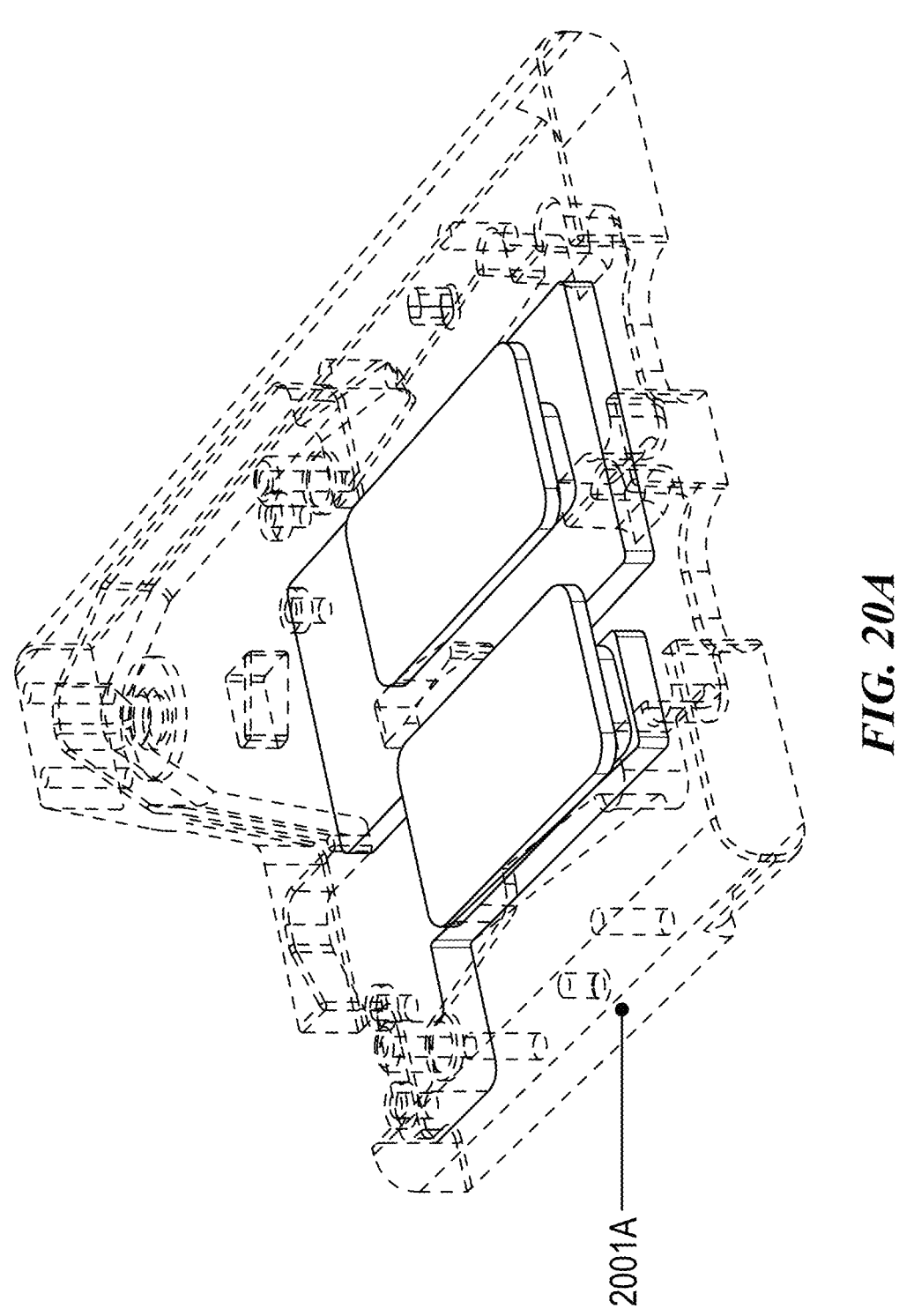
FIG. 20A shows an example of a slide bed.

After the sample is split and sprayed evenly onto the two slides, the right-hand one is dried, fixed, stained and rinsed, while the left-hand one is wet-fixed. The slide beds, shown in FIGS. 19A and 19B, include the following components:

Slide beds (1901), which are made of machined aluminum, are shown in FIG. 20A. Each slide bed is made of two parts to allow them to be held captive by the housing plate (2001A).

Slide switches (1902) provide an electronic interlock for the air spray valve and reagent pumps to prevent the escape of aerosolized sample and reagent spillages which the absence of slides will cause. The switches also send a signal to the software enabling it to perform checks and provide feedback to the user.

Figure 20B:
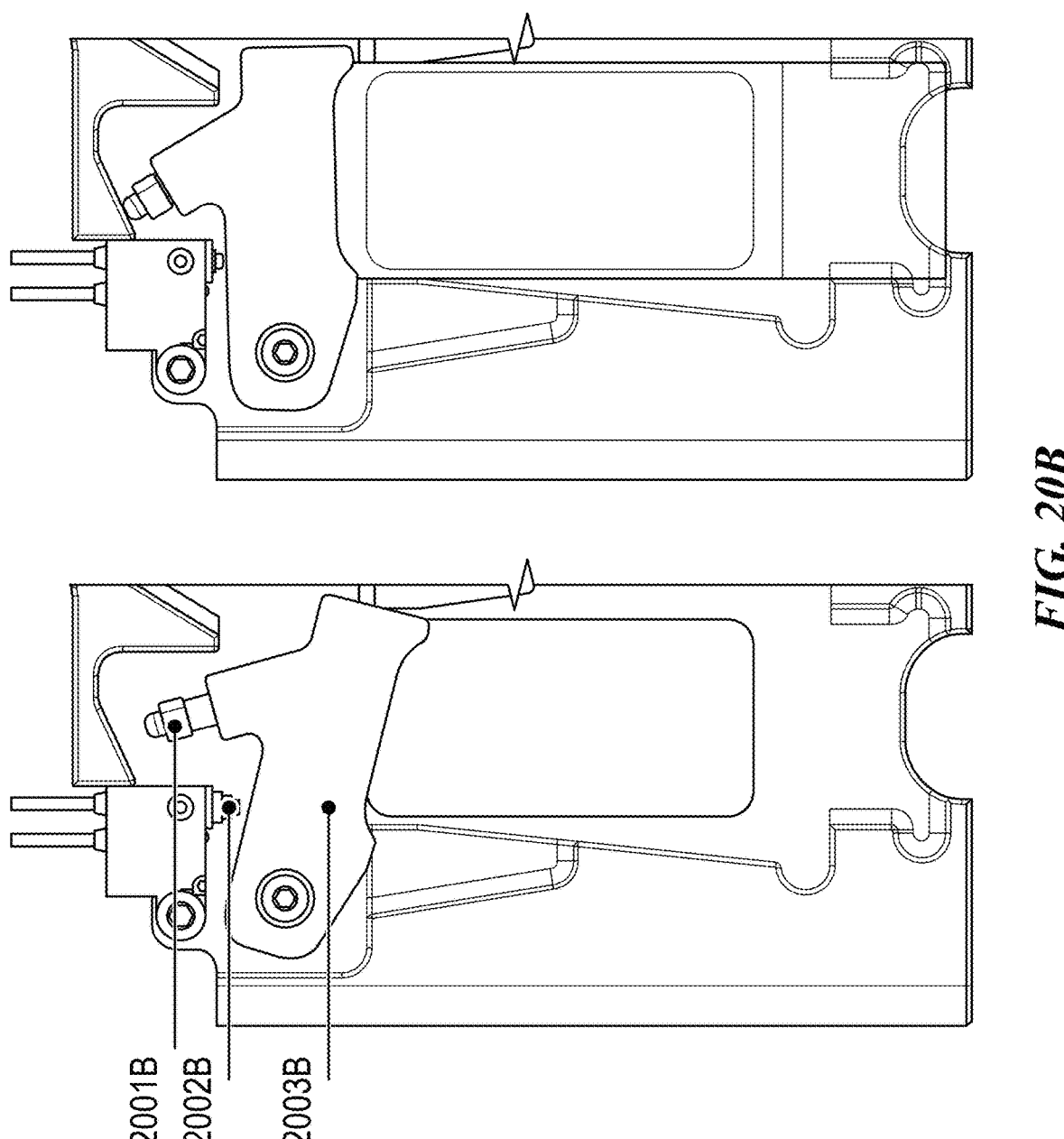
FIG. 20B shows an example of slide switches.

As shown in FIG. 20B, the slide switches (2002B) are actuated by levers (2003B) which contain spring plungers (2001B). The plungers increase the range of movement over which the slide switches will be activated allowing a range of slide lengths to be detected. The geometry of the levers reduces the chance of slides being inserted incorrectly, limiting the likelihood of breakage during clamping.

Slides (1903) meet the ISO 8037/1-1986 specification:

$$\text{Length}: 76^0_{-1}\text{mm}$$

$$\text{Width}: 26^0_{-1}\text{mm}$$

$$\text{Thickness}: 1.1^{+0.1}_{-0.2}\text{mm}$$

Overflow drain (1904) guides fluids to the spill tray underneath the reagent bottles in the event of a leak in the slide processing area.

Figure 21:
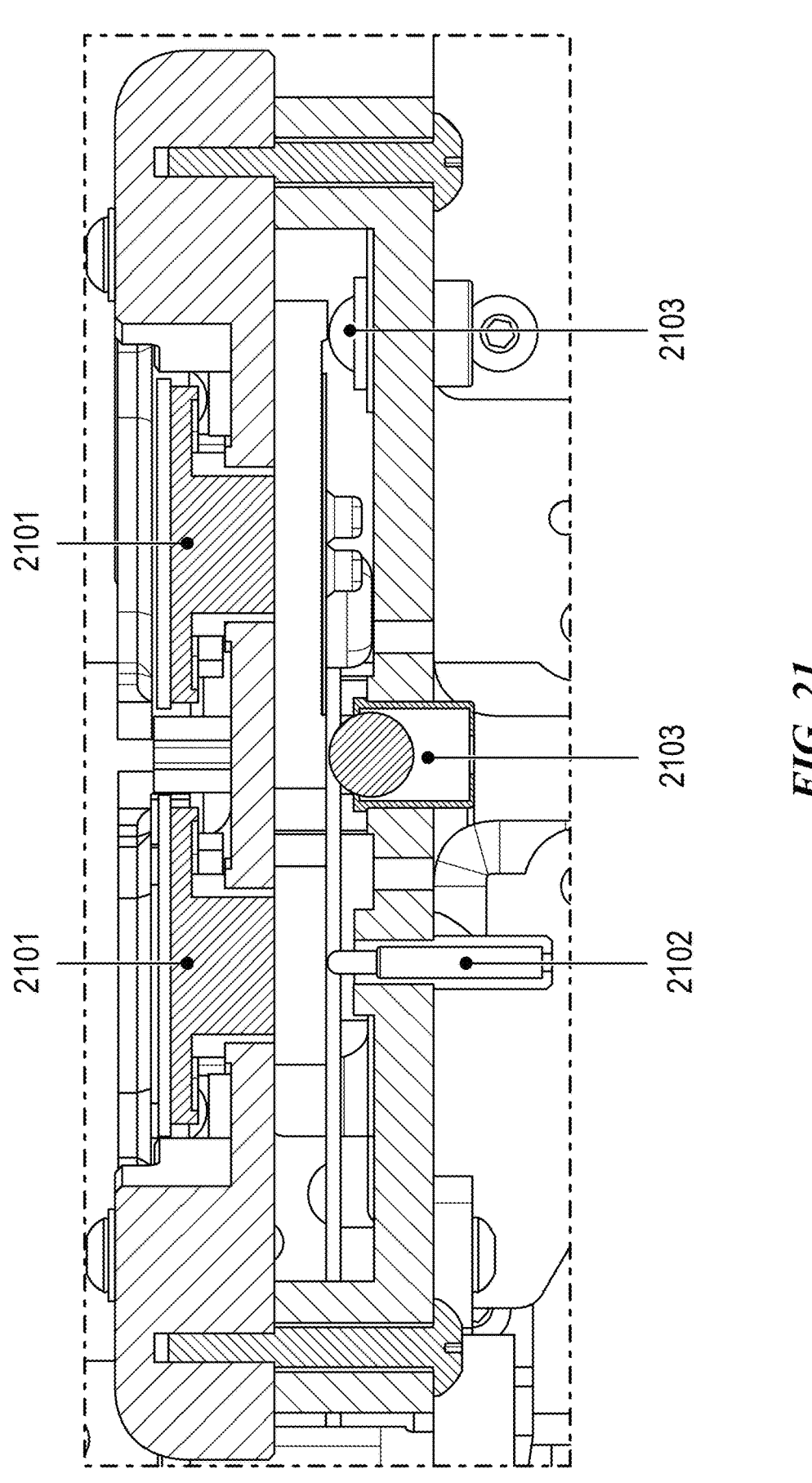
FIG. 21 shows an example of a slide spring bed.

Slide bed springs (1905) are shown in FIG. 21. As shown therein, two springs (2102, 2103) under each slide bed (2101) fulfill two functions: (i) providing an even clamping force between the hood consumable seal and the slide face to prevent the escape of aerosolized sample and reagents, and (ii) allowing the instrument to accommodate a range of slide thicknesses.

In some embodiments, the left-hand slide bed has a lighter spring force as it only needs to seal against aerosolized sample. This is provided by two spring plungers located centrally, front and back. The right-hand slide bed requires a stronger force to seal against the reagents pumped onto the slide during staining and has two ball detents located diagonally opposite each other. Their position is restricted by the heater matt, also located on the underside of the slide bed.

Heater (1906) is adjacent to the right-hand slide bed, which is heated to dry the slide before fixing and staining. The heater is a custom heater mat assembly which contains: (i) 20 W (@24 VDC) heater mat, (ii) twin thermistors to provide feedback to the temperature control system, and (iii) potted wiring. The assembly is fixed to the bottom part of the slide bed with epoxy.

4.2.4 Ethanol Fixative System

Figure 23:
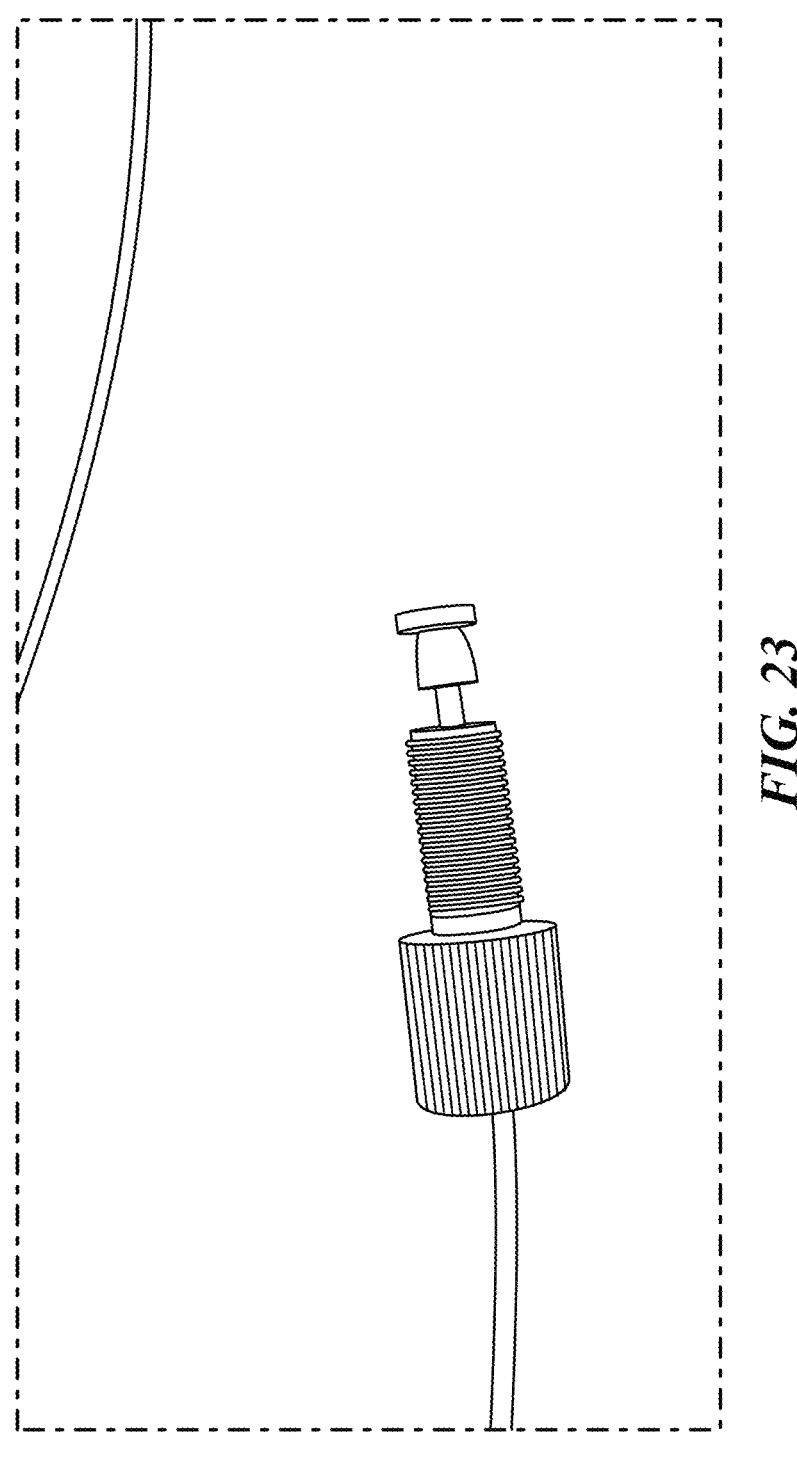
FIG. 23 shows an example of an inlet fitting.

In some embodiments, and as shown in FIG. 22, fixative spray system is comprised of a 15 ml reservoir of an ethanol-based fixative (e.g., CytoFix), a high-frequency dosing pump (2201) and a custom brass insert with aerosolizing features (2203) which is attached to the SIP Manifold and supplied by paths within it (shown on right-hand side figures). The ethanol fixative system includes an ethanol pump (2201), an inlet fitting (2202, and shown in FIG. 23), and an ethanol spray insert (2203).

Ethanol spray insert (2203) contains a brass fitting containing features to aerosolize the small (~400 µL) volume of ethanol supplied through the SIP manifold. In some embodiments, it is located against the ethanol supply hole on the SIP manifold by the countersunk screw holes.

Figure 24A:
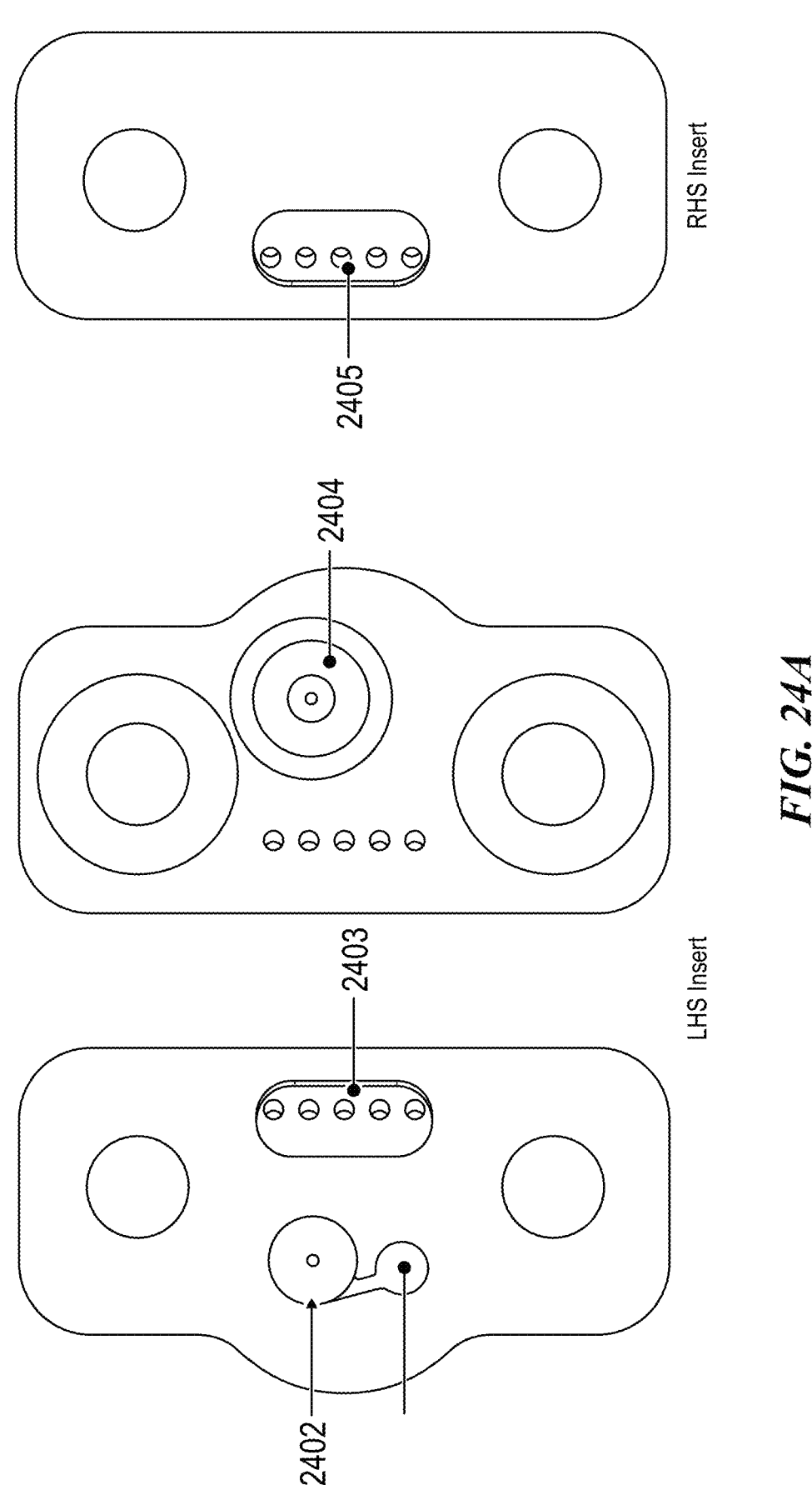

As shown in FIGS. 24A and 24B, ethanol flows in at (2401), passes along the 0.5 mm wide passage to the swirl feature (2402) and out through the 0.3 mm nozzle. The cutout feature (2404) allows the nozzle length to be kept short (0.24 mm) with clearance around the exit to allow the spray to fan outwards.

4.2.5 Bulkhead

In some embodiments, the bulkhead (1307) is machined from a 6 mm aluminum plate for strength and rigidity. In an example, it is fixed by its mounting brackets to the baseplate at a 4° angle to the vertical to facilitate draining of reagents and water to the scavenger port on the right-hand side.

4.2.6 Air Spray Valve

In some embodiments, the air spray valve (1308) is closed until it receives 24V DC signal from the software-controlled electronics. The benchtop instrument is designed to accommodate spray bursts of 30 to 100 ms in length.

4.2.7 Buffer System

Figures 25, 25A, 25B:
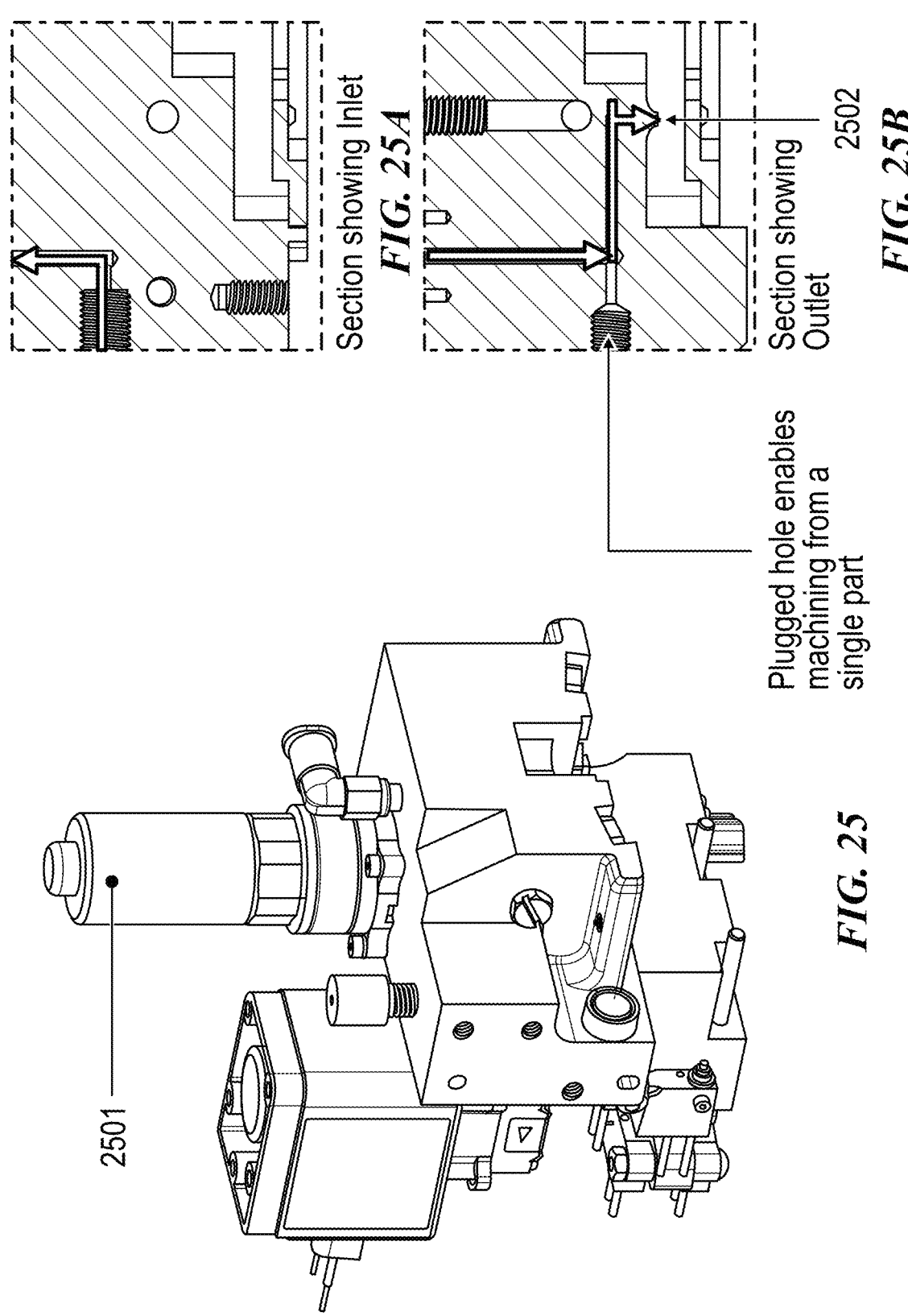
FIG. 25 shows an example of a buffer system.

In some embodiments, and as shown in FIG. 25, the buffer system is comprised of a 15 ml reservoir of PBS buffer, a micro-dosing pump (2501) and the buffer nozzle (2502). Holes in the SIP manifold supply the pump with buffer and move the liquid from its outlet to the nozzle. The pump-to-nozzle fluid path uses a plug to enable machining out of a single piece. The buffer system includes:

Buffer pump (2501), which deposits, via the buffer nozzle, 10 µL of sample into the SIP well prior to the spraying of sample onto the slides. In an example, buffer pump is calibrated to 10 µL during manufacture.

Figure 26:
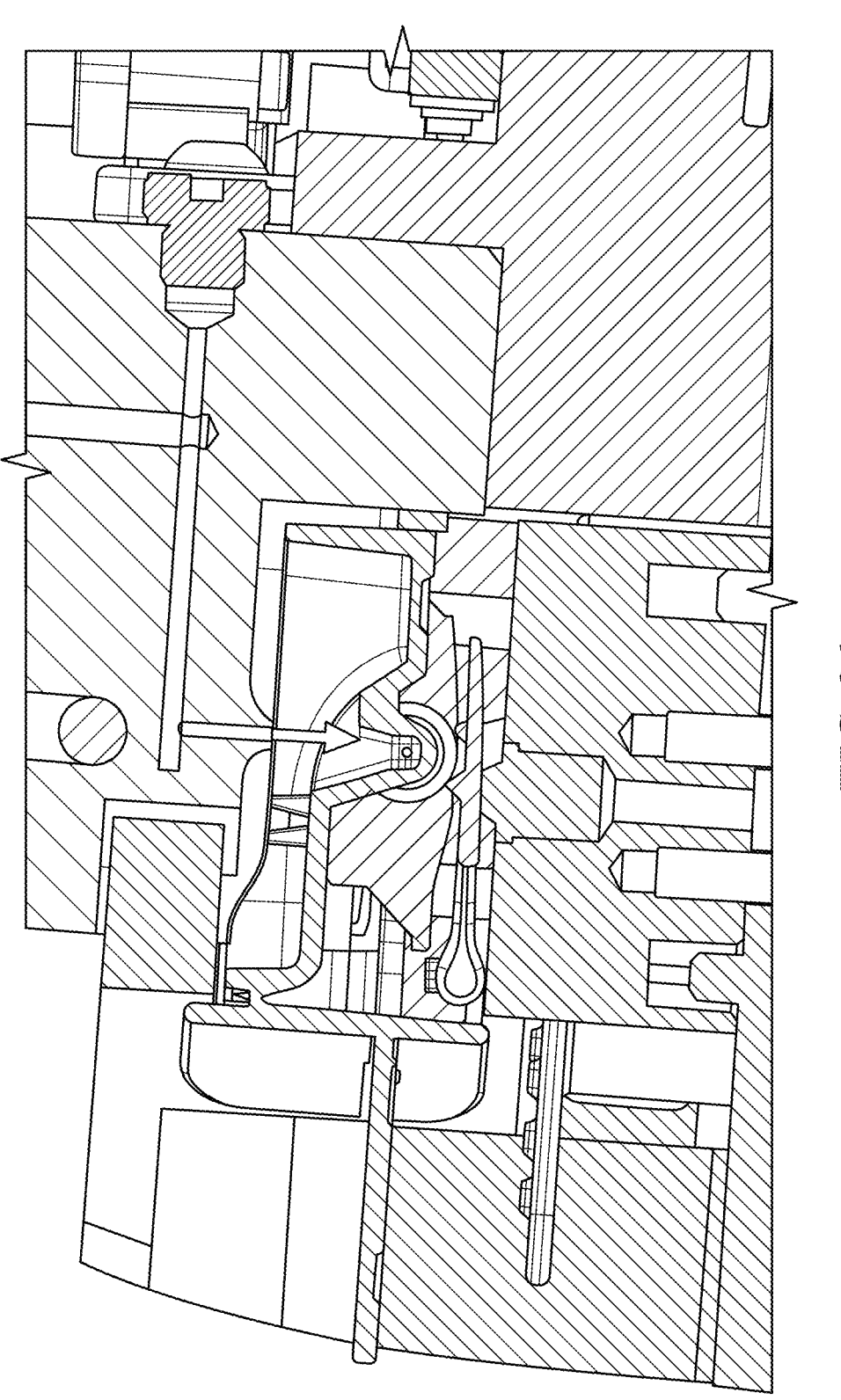
FIG. 26 shows an example of a buffer nozzle located above the SIP well.

Buffer nozzle (2502) is located above the sample will in FIG. 26.

4.2.8 Air Curtain

Figures 27A, 27B:
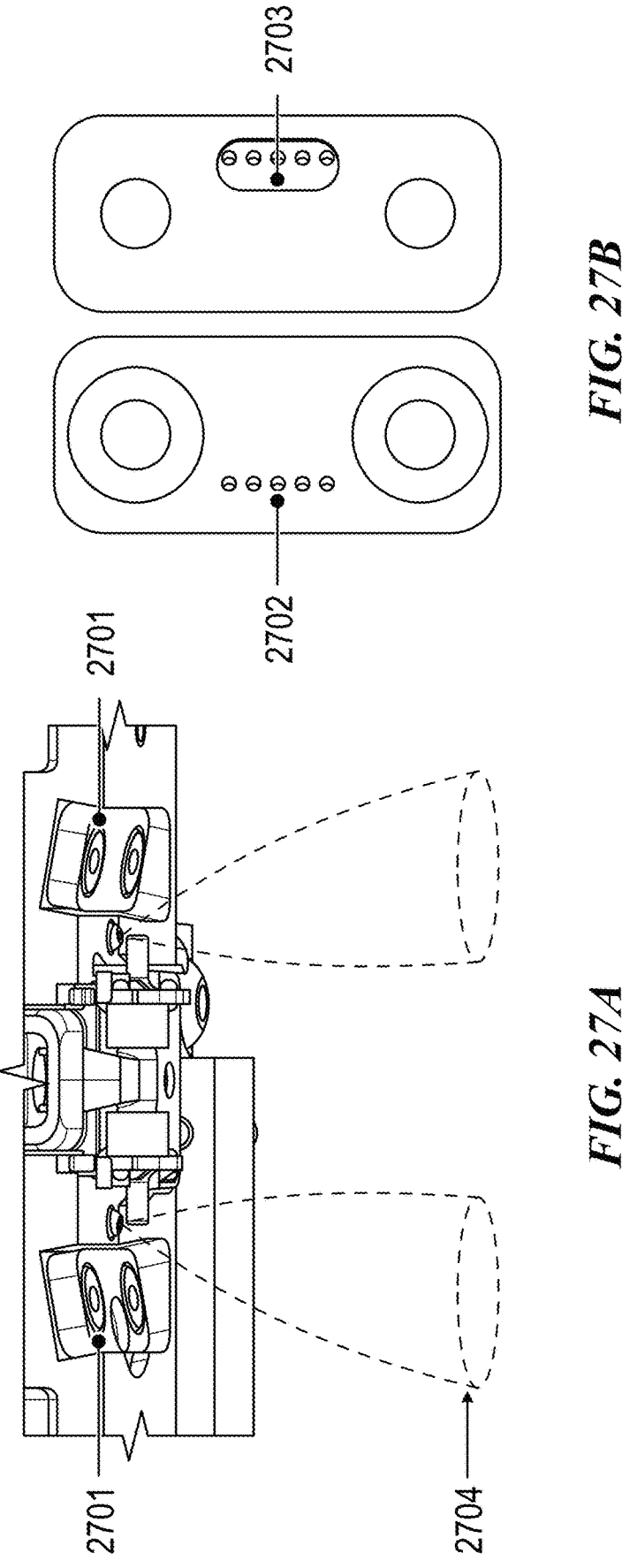
FIGS. 27A and 27B show an example operation of an air curtain.

In some embodiments, and as shown in FIGS. 27A and 27B, the brass inserts on the outer sides of the air nozzles (2701) create a 'curtain' of air (1311) which prevents the sample spray (2704) landing on the hood consumable collars, increasing the yield of sample on the slides. In an example, each insert contains 5×0.6 mm diameter holes 2.2 mm long (2702). The diameter of these was set to achieve a nominal SIP vacuum of 7 kPa with a supply pressure of 35 psi. The air curtain holes are fed from a chamber on the sealing side of the insert (2703) and coincident face on the SIP manifold.

4.2.9 Reagent Manifold Assembly

Figures 28A, 28B:
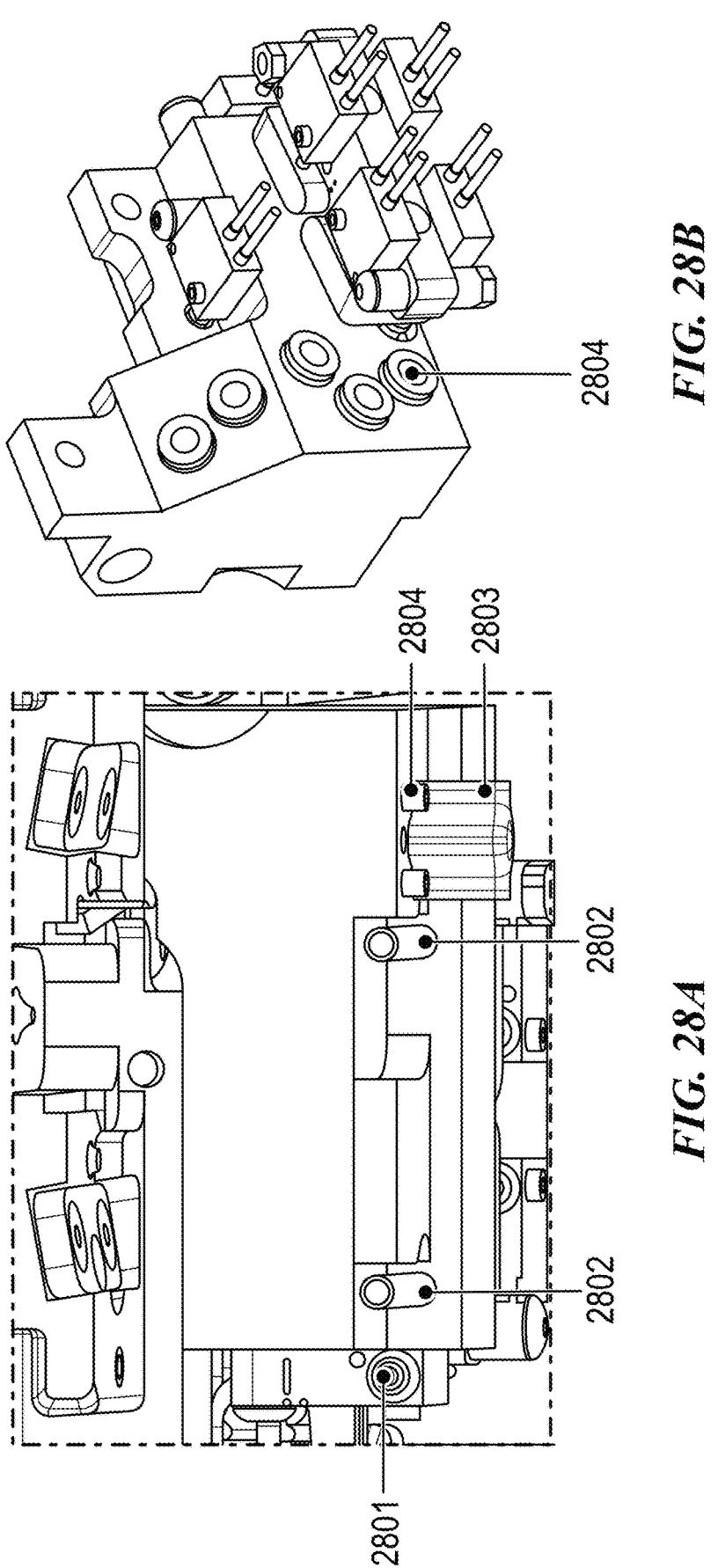
FIGS. 28A and 28B show an example of a reagent manifold assembly.

In some embodiments, and as shown in FIGS. 28A and 28B, the reagent manifold assembly (1312) contains the reagent manifold itself—which supplies reagents to, and drains them from, the right-hand slide—as well the priming tray switch, hood switch rods and switches and the SIP switch.

Priming tray switch (2801), which informs the software whether the priming tray is in place to avoid the priming protocol running in its absence.

Figures 29A, 29B:
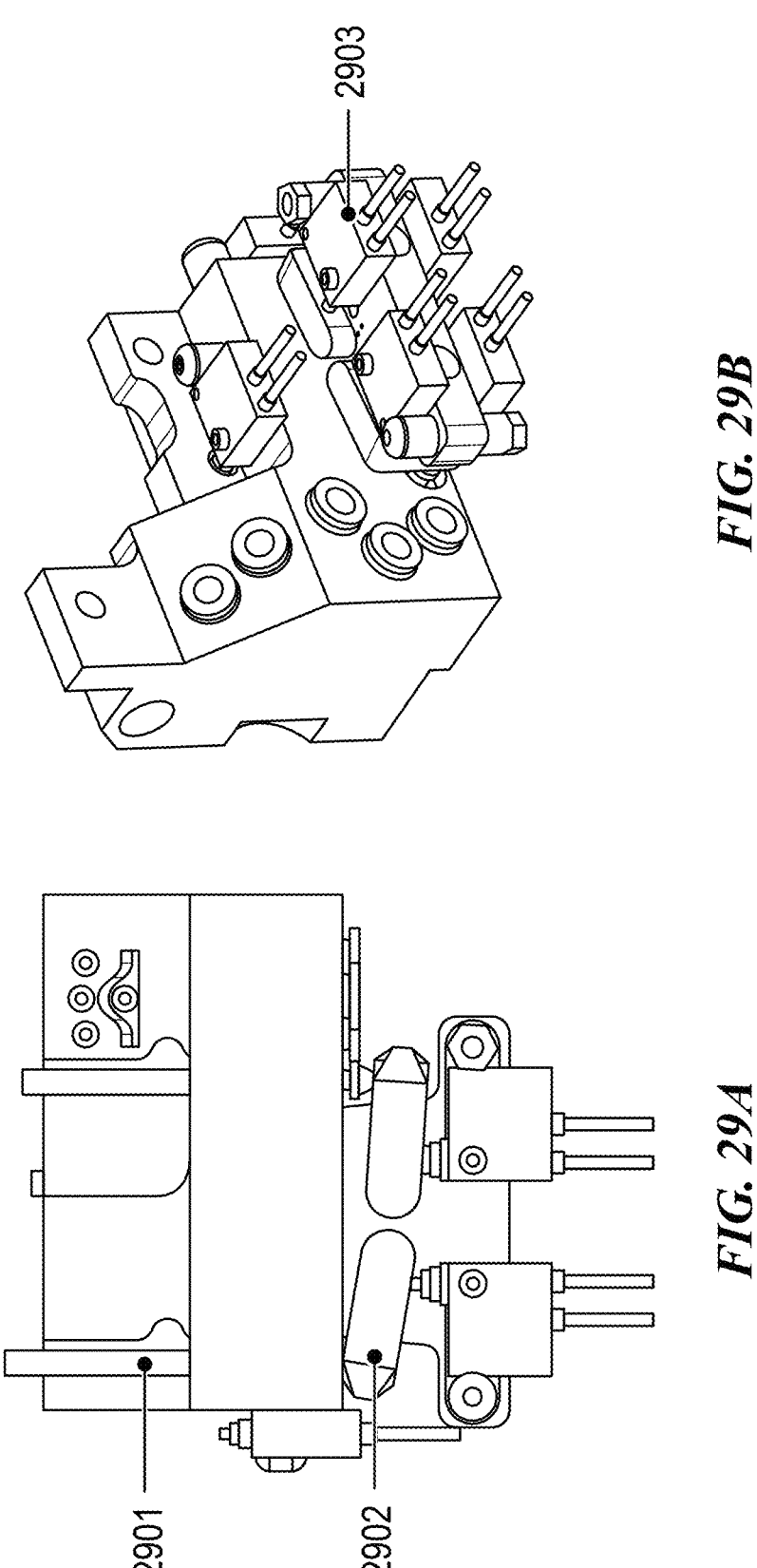
FIGS. 29A and 29B show an example of hood switches.

Hood switches (2802), shown in FIGS. 29A and 29B, include one rod per hood (2901), which engages the switches when the hood is inserted into the instrument, a hood switch actuator (2902), which depresses the pair of microswitches for a given hood, and two microswitches for redundancy (2903), which provide an electronic interlock for the air spray valve and reagent pumps to prevent the escape of aerosolized sample and reagent spillages which the absence of hoods will cause. The switches also send a signal to the software enabling it to perform checks and provide feedback to the user.

Figures 30A, 30B, 30C:
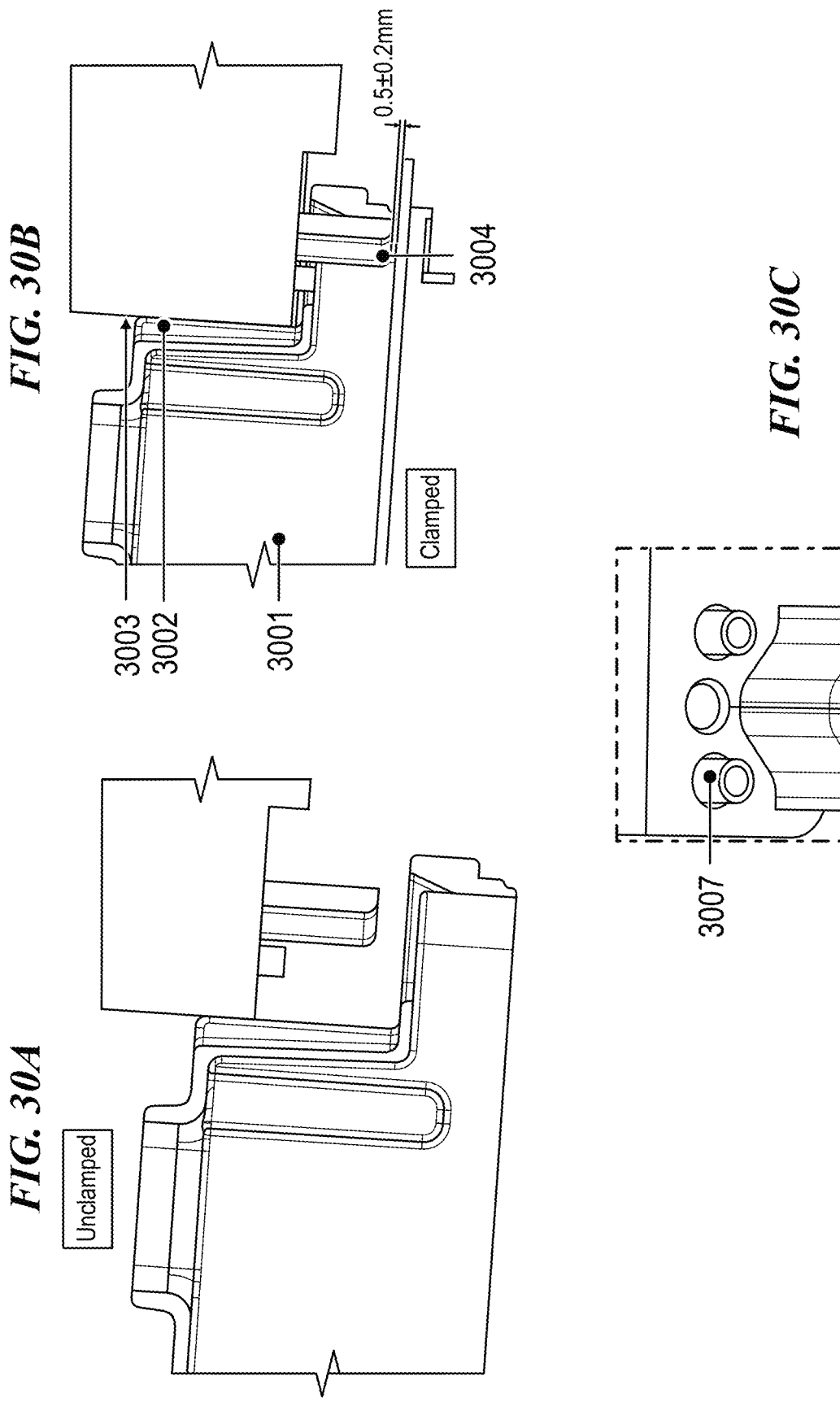
FIGS. 30A-30C show an example of a scavenger port.

Scavenger port (2803), shown in FIGS. 30A-30C, drains reagents and water from the right-hand slide. The bulkhead, and consequently the slides, are on a 4° angle to the horizontal which means that fluids run towards the scavenger port.

The hood consumable (3001) is inserted when the instrument is in the unclamped state and comes to a stop (assisted by the detent feature) with its locating feature (3002) against the hard stop face of the reagent manifold (3003).

When the instrument is clamped by the user the scavenger feature (3004) and reagent nozzles (3007) fit into the hole on the hood. The circular face of the scavenger port (3005) is located 0.5 mm above the surface of the slide. As this gap is emptied of liquid by the drain peristaltic pump via the drain hole (3006), adjacent liquid flows in, due to the capillary effect, to take its place. This flat surface is circular so that it drains evenly from all sides, maximizing the liquid removed from the slide.

Figures 31A, 31B:
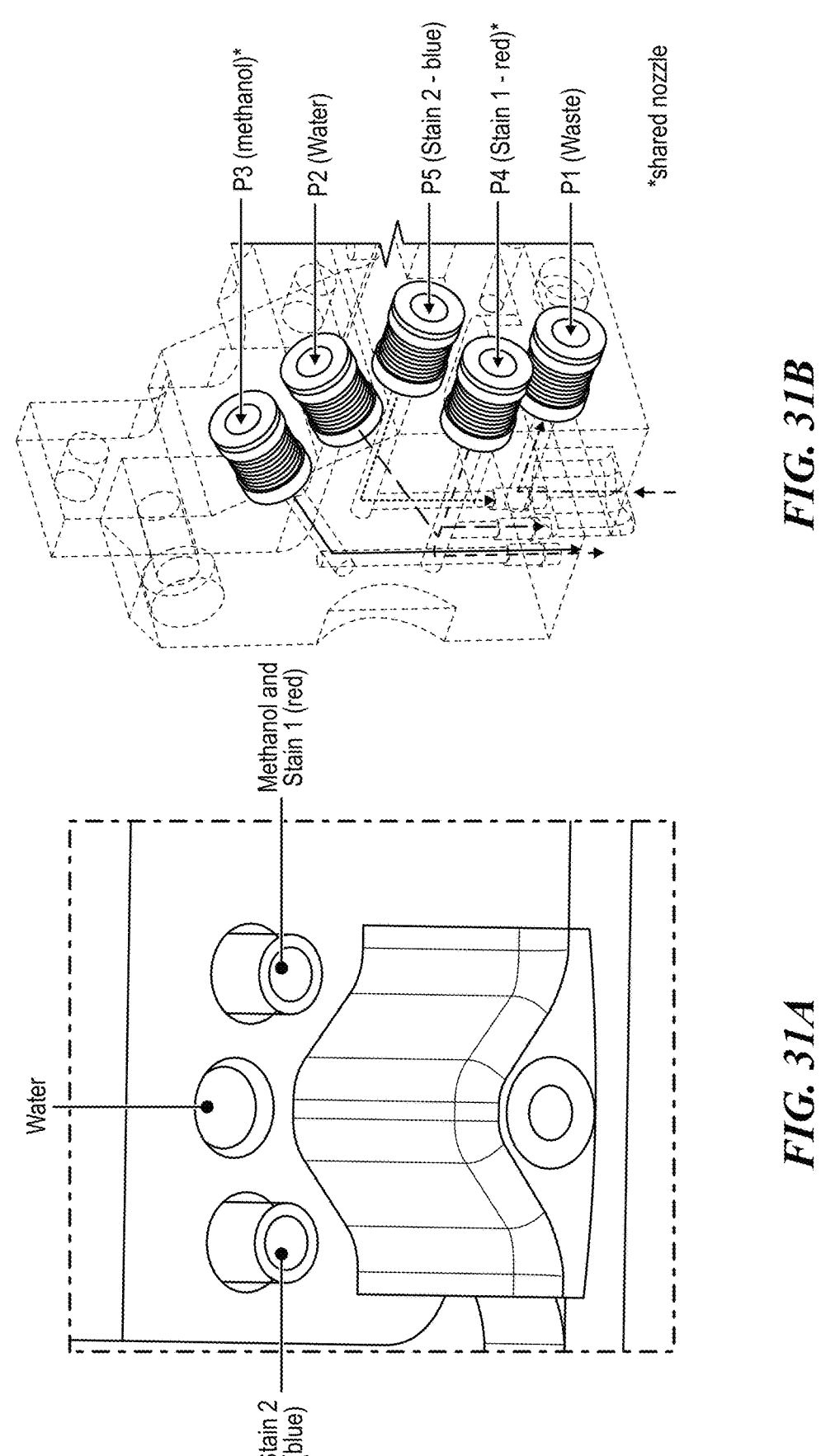
FIGS. 31A and 31B show an example of reagent paths.

Reagent paths (2804) are shown in FIGS. 31A and 31B. Reagents enter the manifold via tubing from the peristaltic pumps. The methanol and red stain paths within the manifold are shared due to limited space and their being the most compatible combination of the 4 liquids. Methanol and the two stains exit the manifold via nozzles, whereas the water exit port is designed to run water down the scavenger feature during dispensation to remove any splashes of stain and increase the final cleanliness of the slide.

4.3 Clamping

Figure 32B:
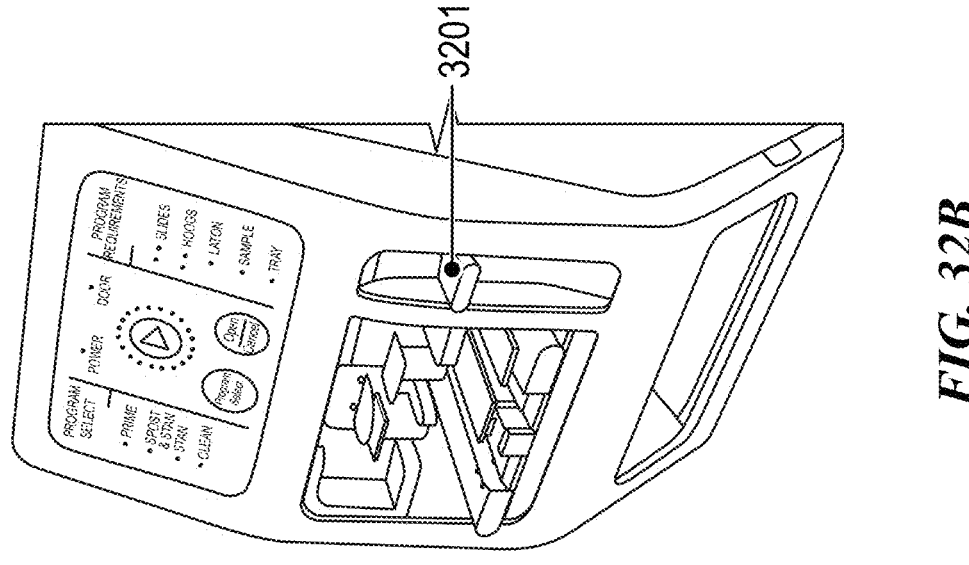
FIG. 32B shows an example handle of the clamping mechanism.
Figure 32A:
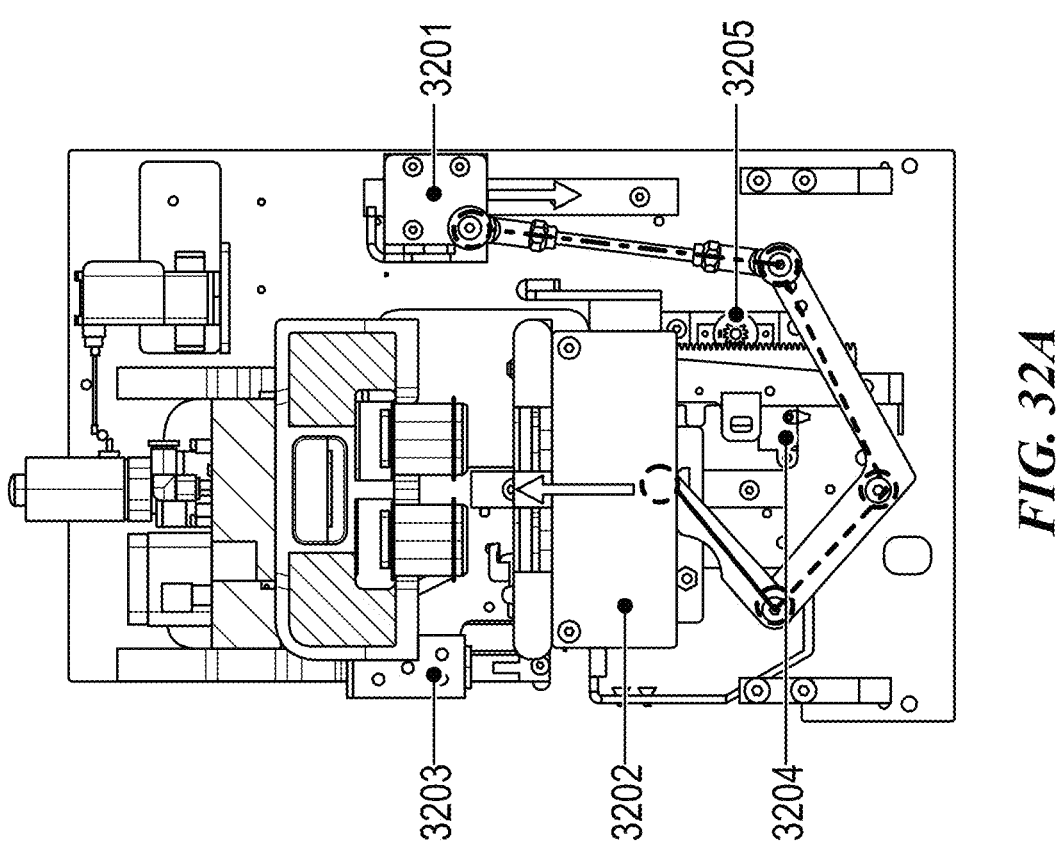
FIG. 32A shows an example of a clamping mechanism.

FIG. 32A shows the components of an example clamping mechanism used in the benchtop instrument, which includes a handle (3201), a slide bed (3202), a solenoid latch (3203), a clamping interlock with two microswitches (3204), and a damper (3205). The operation of the clamping mechanism is described first, and then the particulars of certain components are discussed.

In some embodiments, the handle (3201) connected at the slide bed (3202) is pushed downwards by the user moving, via the solenoid latch (3203) linkages, the slide bed (3202) upwards along its linear rail. As the slides rise they push the hoods up against the underside of the cassette which, as they reach their clamping surfaces in turn compress the slide bed springs and seal against the slides. The solenoid latch (3203) fasten locks the mechanism in place until the solenoid is activated by the software-controlled electronics at which time the slide bed lowers gently—slowed by the rotary damper engaging with the vertical rack teeth.

The two microswitches of the clamping interlock (3204) are activated when the mechanism is in the clamped position. These provide an electronic interlock for the air spray valve and reagent pumps to prevent the escape of aerosolized sample and reagent spillages which running the instrument unclamped will cause. The switches also send a signal to the software enabling it to perform checks and provide feedback to the user. Two switches are used for redundancy.

4.3.1 Handle

An example of the handle (3201) is shown in FIG. 32B on the face of the benchtop instrument. It may be made from anodized aluminum and can be configured to operate vertically on a linear rail.

4.3.2 Solenoid Latch

Figure 33:
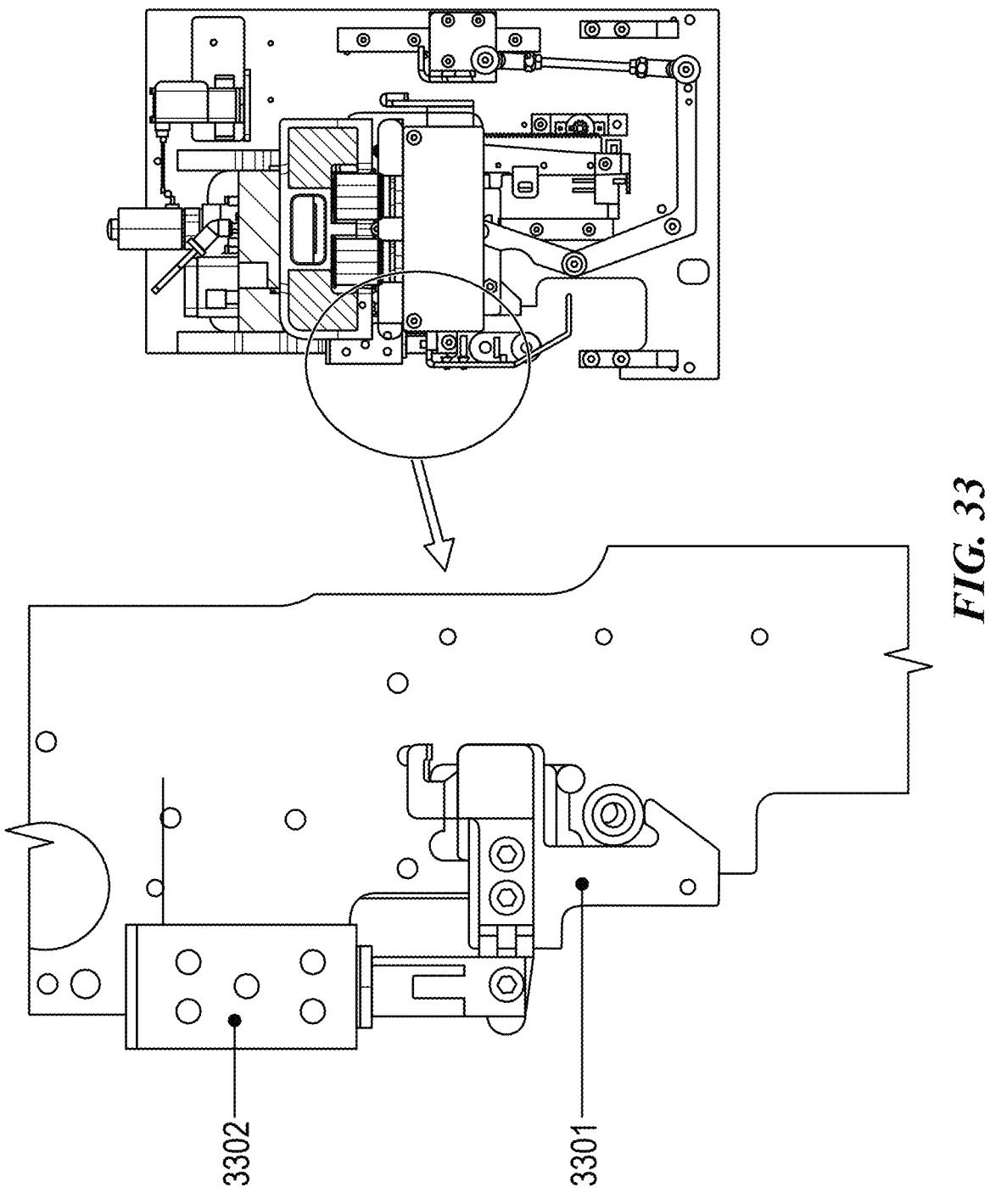
FIG. 33 shows an example solenoid latch of the clamping mechanism.
Figure 34C:
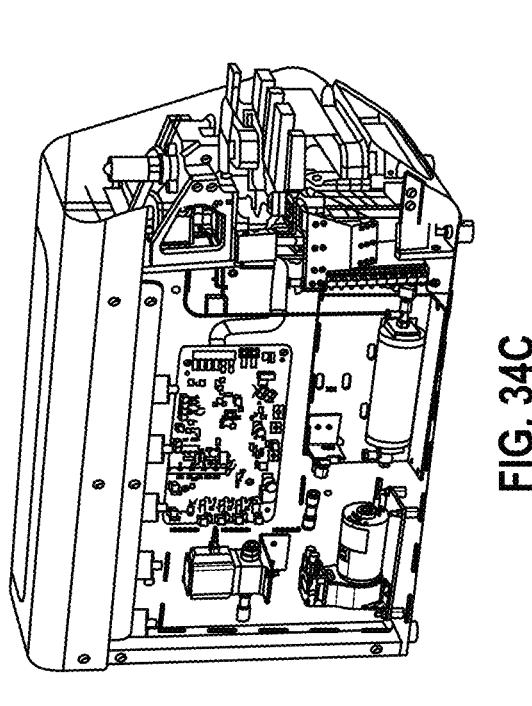
FIG. 34 shows examples of covers and doors of the benchtop instrument.
Figure 34D:
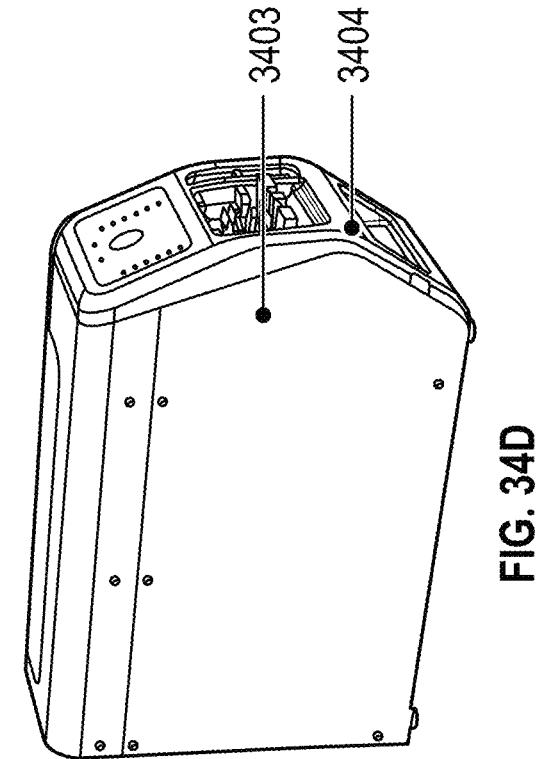
Figure 34A:
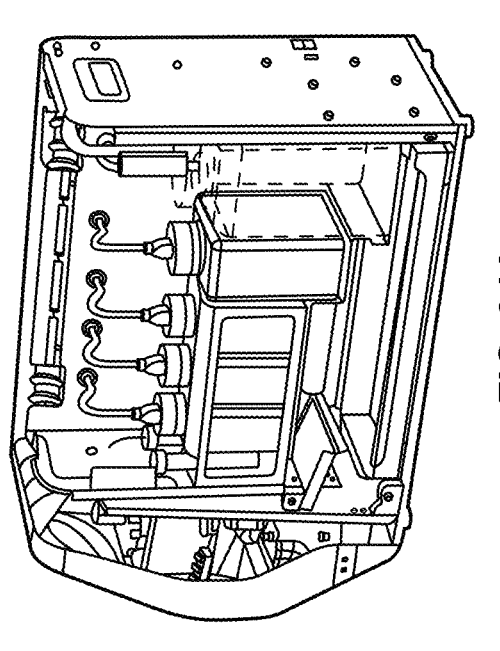
Figure 34B:
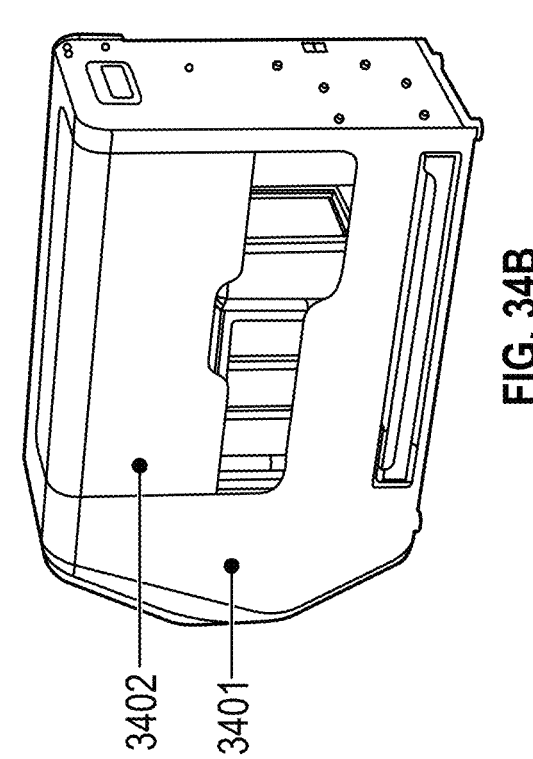

In some embodiments, the solenoid latch (3203), which is detailed in FIG. 33, holds the clamping assembly closed until the solenoid (3302) is activated by the software. The height of the latch (3301) is calibrated during the manufacturing process to fix the clamping force of the hood consumables against the slides.

4.3.3 Damper

In some embodiments, the damper (3205) slows the opening, under gravity, of the clamping mechanism when the latch releases it.

4.3.4 Clamping Interlock

In some embodiments, the clamping interlock (3204) includes two microswitches (for redundancy) to ensure spray and stain valve and pumps will not operate unless the clamping mechanism is engaged to prevent spillage of reagents and escape of aerosolized sample.

4.4 Covers

FIG. 34 shows examples of covers for the benchtop instrument. As shown therein, the portions that cover the inner components and circuitry include a side-panel (3401) and a door (3402) on one side of the benchtop instrument, another side-panel (3403) on the other side of the benchtop instrument, and a front cover (3404).

In some embodiments, the front cover is made from vacuum-cast plastic, and the side covers and doors are fabricated using sheet metal (e.g., 1.6 mm steel stock). In other embodiments, the different combinations of plastic and sheet metal may be used to design the covers and doors for the benchtop instrument.

4.5 Door

The benchtop instrument includes a door that enables operators and/or technicians to access the internal components and circuitry of the instrument. In some embodiments, and as shown in FIG. 35A, friction hinges (3501) can be used to ensure that the door can be opened to any position with no risk of falling closed.

Figures 35A, 35B:
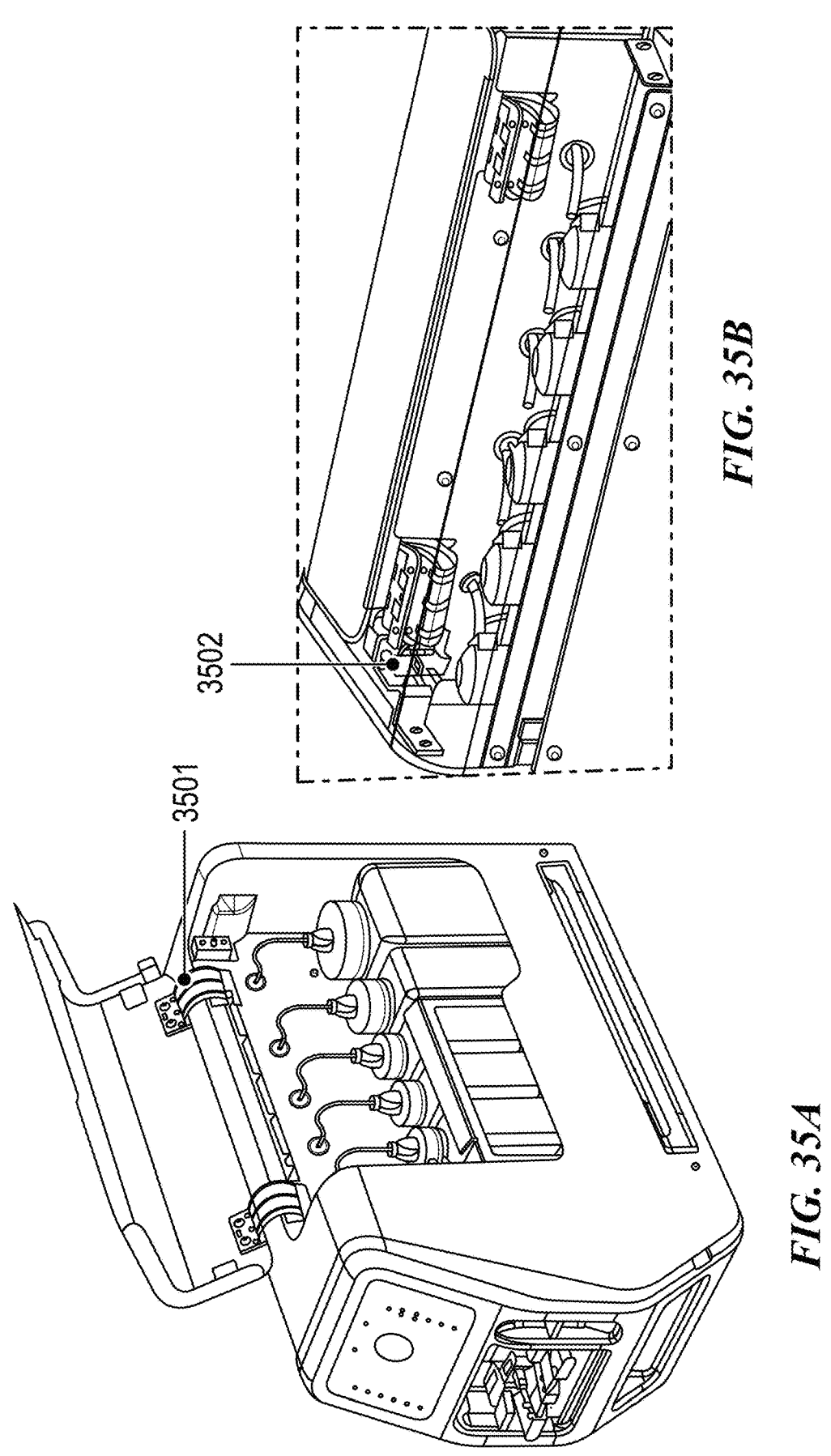
FIGS. 35A and 35B show an example of a door providing access to the inner components and circuitry of the benchtop instrument.

In some embodiments, and as shown in FIG. 35B, dual microswitches (3502) are activated when the door is in the closed position. These provide an electronic interlock for the reagent pumps to ensure that the reagent tubing can only fail under pressure with the door closed, protecting the user and operating environment from reagents. The switches also send a signal to the software enabling it to perform checks and provide feedback to the user. Two switches are used for redundancy.

4.6 Handles

Figure 36B:
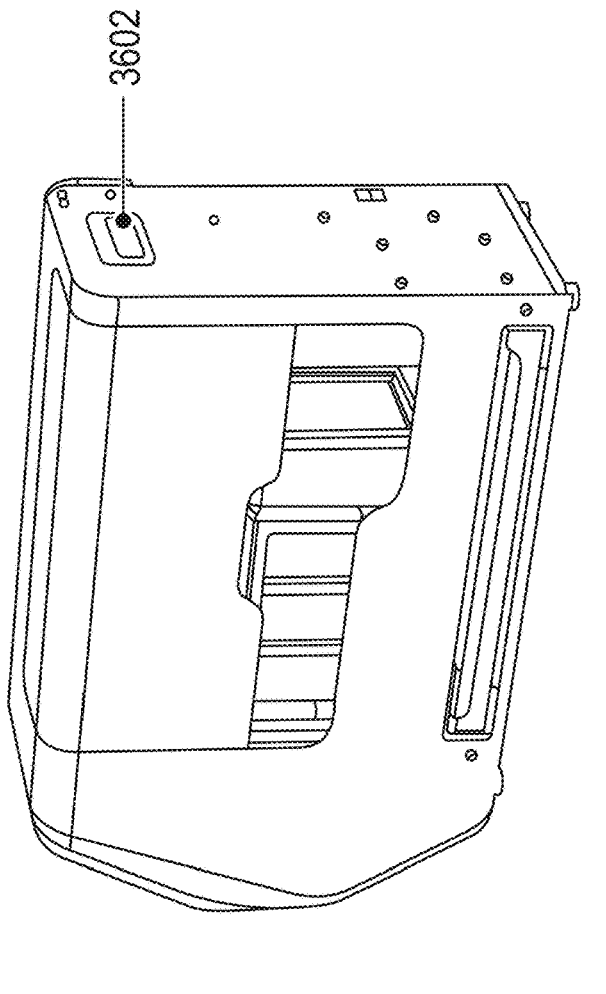
FIGS. 36A and 36B show examples of the front and read handles for the benchtop instrument.
Figure 36A:
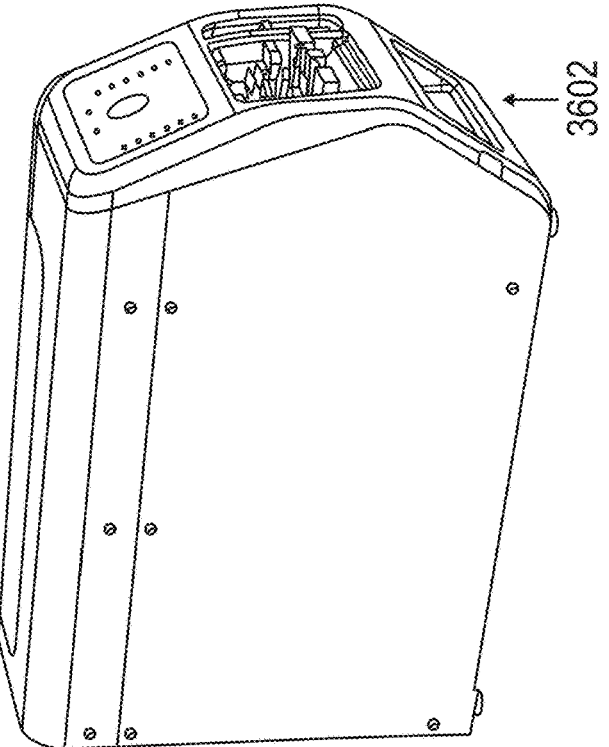

The benchtop instrument includes a front handle and a rear handle. In some embodiments, and as shown in FIGS. 36A and 36B, the rear handle (3601) is set high in the backplate to maximize stability when lifting the benchtop instrument and the front handle (3602) is incorporated into the front fascia. In an example, the rear handle may be an original equipment manufacturer (OEM) part and the front handle may be a custom-designed part. In other examples, both the front and rear handles may be OEM parts or both may be custom designed.

4.7 Feet

In some embodiments, the benchtop instrument has four non-slip feet that are chemically compatible with the reagents being used.

4.8 User Interface

In some embodiments, the user interface is incorporated into the front fascia, and includes four capacitive touch buttons and a number of status LEDs.

5 Example Embodiments of the Disclosed Technology

The described embodiments provide a mobile, dedicated system to perform rapid on-site evaluation of biological samples. The advantages include, inter alia, fine needle aspiration (FNA) biopsy adequacy, the ability to triage the specimen, shorten the length of the procedure, help guide and direct the biopsy in real time, and overall assist in managing the patient's procedure with the performing clinician at the point of care. In particular, the problem being solved by the disclosed technology is the inability to consistently produce a monolayer of cells on a substrate in a timely manner at the point of care.

Embodiments of the disclosed technology provide, in some aspects, the following technical solutions:

1. An apparatus for depositing and staining a cellular sample, comprising:
   a slide processing module, positioned at an upper front position of the apparatus, comprising:
      a specimen input port (SIP) dock (e.g., see § 4.2.1) configured to receive a SIP consumable (e.g., see § 1) comprising the cellular sample, and position the SIP consumable such that a spray nozzle of the SIP consumable and an air nozzle of the slide processing module are aligned prior to a deposition operation, and
      a user interface (e.g., see § 4.8) configured receive an input from a user that configures the deposition operation and a staining operation,
   a clamping module (e.g., see § 4.3), positioned at a lower front of the apparatus, comprising:
      a handle (e.g., see § 4.3.1) configured to be pushed downward to raise a slide bed along a linear rail such that at least one slide on the slide bed is covered by a hood consumable that securely seals against the slide bed, and a solenoid latch (e.g., see § 4.3.2) configured to lock the slide bed until the deposition operation is complete; and
   an auxiliary systems module (e.g., see § 4.1), positioned at a rear of the apparatus, comprising:
      a chassis (e.g., see § 4.1.1) including a removable storage container configured to hold a plurality of reagent bottles, a buffer solution bottle, and an ethanol-based fixative bottle, and
      an electronics subsystem (e.g., see § 4.1.6) configured to execute, based on the input from the user, a pre-programmed protocol for the deposition and staining operations.

2. The apparatus of solution 1, wherein the chassis further comprises:
   a tube holder configured to hold at least one connectors of a plurality of connectors, wherein each of the plurality of connectors is coupled to a corresponding bottle in the removable storage container, and wherein the at least one connector is detached from the corresponding bottle.

3. The apparatus of solution 1, further comprising:
   a drip tray (e.g., see § 4.1.5), wherein the chassis is configured such that liquids from an overflow port of the slide processing module and the removable storage container are directed to the drip tray.

4. The apparatus of solution 1, wherein the slide processing module further comprises a heating element.

5. The apparatus of solution 1, wherein the air nozzle dispenses a gaseous substance at a first pressure of between about 1 psi and about 30 psi.

6. The apparatus of solution 5, wherein the slide processing module further comprises an insert on an outer side of the air nozzle, the insert comprising a plurality of round holes through which air is forced with a second pressure that is greater than the first pressure.

7. An apparatus for dispensing a fluidic sample (e.g., see § 1), comprising:
   an inlet port (e.g., see § 1.1) configured to receive a sample material;
   a moat (e.g., see § 1.3) surrounding the inlet port configured to receive any overflow sample material; and
   a first sample nozzle and a second sample nozzle (e.g., see § 1.2) fluidically coupled to the inlet port to expel the sample material, wherein a tubular junction fluidically couples the inlet port to a first tubular fluid path that terminates in the first sample nozzle and to a second tubular fluid path that terminates in the second sample nozzle, wherein a cross-sectional area of the tubular junction is less than an average cross-sectional area of the first tubular fluid path and the second tubular fluid path, and wherein the cross-sectional area of the tubular junction is selected to draw the sample material from the inlet port into the tubular junction via capillary action.

8. The apparatus of solution 7, wherein the moat is further configured to enable the sample material to be mixed with a buffer solution prior to deposition in the inlet port.

9. The apparatus of solution 2, wherein the buffer solution is a phosphate-buffered saline (PBS) solution. In some embodiments, the PBS solution includes proteins (e.g., albumin or heparin). In other embodiments, the PBS solution is Dulbecco's PBS solution. In yet other embodiments, the Dulbecco's PBS solution includes other proteins (e.g., albumin, heparin, etc.).

10. The apparatus of solution 7, wherein the first sample nozzle is disposed between a first gas nozzle and a first target, and wherein the first sample nozzle expels the sample material towards the first target upon the first gas nozzle being activated and expelling gas towards the first sample nozzle.

11. The apparatus of solution 7, wherein a cross-sectional area of the first tubular fluid path is uniform across its length.

12. The apparatus of solution 7, wherein a cross-sectional area of the first tubular fluid path increases from the tubular junction to a mid-point of the first tubular path and decreases from the mid-point to the first sample nozzle.

13. The apparatus of solution 7, further comprising:
a grip portion (e.g., see § 1.5) adjacent to the inlet port at an end opposite from the first sample nozzle and the second sample nozzle.

14. The apparatus of solution 13, wherein the grip portion comprises an indentation.

15. The apparatus of solution 13, further comprising:
a snap feature (e.g., see § 1.6) adjacent to the grip portion that enables the grip portion to be removed from the apparatus subsequent to a completion of a deposition operation.

16. The apparatus of solution 7, wherein a depth and a shape of the inlet port is selected to increase a draw of the sample material into the tubular junction.

17. An apparatus for loading a fluidic sample (e.g., see § 2), comprising:
a specimen input port (SIP) stand configured to hold a SIP consumable;
a jar, positioned adjacent to the SIP stand, configured to capture overflow fluidic sample material when loading the fluidic sample into the SIP consumable; and
an arm rest, positioned in proximity to the SIP stand, configured to facilitate the loading of the fluidic sample.

18. The apparatus of solution 17, wherein the arm rest comprises a magnet that holds the SIP stand in place in a storage configuration.

19. An apparatus for improving deposition of a sample material on a target in a sample analysis system (e.g., see § 3), the hood comprising:
a body comprising a top panel, a front panel, a left panel, a right panel and a back panel, wherein the top panel comprises a first opening configured to receive the sample material;
a lower panel, positioned adjacent to the back panel, that is parallel to the top panel and perpendicular to the back panel, wherein the lower panel comprises a second opening to receive a stain or dye subsequent to the deposition of the sample material on the target; and
a bottom rim that supports the body and the lower panel, wherein the bottom rim is configured to adhere to the target prior to the deposition,
wherein a distance between the bottom rim and the top panel is configured to accommodate targets with varying thicknesses.

20. The apparatus of solution 19, wherein the first opening is raised above the top panel, and wherein the top panel extends beyond the front panel.

21. The apparatus of solution 19, wherein the back panel comprises a notch configured to securely affix the hood to a sample analysis system.

22. The apparatus of solution 19, wherein the bottom rim comprises a clamp configured to improve a seal between the bottom rim and the target.

23. The apparatus of solution 22, wherein a distance between the bottom rim and the clamp is configured to improve an efficacy of a drainage of the stain or the dye.

In this document, the term "cellular sample" refers to any biological sample containing cells. Cellular samples can be a tissue sample or samples (e.g., any collection of cells) removed from a subject. The tissue sample can be a collection of interconnected cells that perform a similar function within an organism. A cellular sample can also be any solid or fluid sample obtained from, excreted by, or secreted by any living organism, including, without limitation, single-celled organisms, such as bacteria, yeast, protozoans, and amebae, multicellular organisms (such as plants or animals, including samples from a healthy or apparently healthy human subject or a human patient affected by a condition or disease to be diagnosed or investigated, such as cancer). In some embodiments, a cellular sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy (e.g., fine-needle aspiration (FNA)), a core needle biopsy, a stereotactic biopsy, an open biopsy, or a surgical biopsy can be used to obtain the sample.

The detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An apparatus for depositing and staining a cellular sample, comprising:
a slide processing module, positioned at an upper front position of the apparatus, comprising:
a specimen input port (SIP) dock configured to receive a SIP consumable comprising the cellular sample, and position the SIP consumable such that a first sample nozzle or a second sample nozzle of the SIP consumable and an air nozzle of the slide processing module are aligned prior to a deposition operation, and a user interface configured receive an input from a user that configures the deposition operation and a staining operation;

a clamping module, positioned at a lower front of the apparatus, comprising:

a handle configured to be pushed downward to raise a slide bed along a linear rail such that at least one slide on the slide bed is covered by a hood consumable that securely seals against the slide bed, and a solenoid latch configured to lock the slide bed until the deposition operation is complete; and an auxiliary systems module, positioned at a rear of the apparatus, comprising:

a chassis including a removable storage container configured to hold a plurality of reagent bottles, a buffer solution bottle, and an ethanol-based fixative bottle, and an electronics subsystem configured to execute, based on the input from the user, a pre-programmed protocol for the deposition operation and the staining operation.

2. The apparatus of claim 1, wherein the chassis further comprises:

a tube holder configured to hold at least one connector of a plurality of connectors, wherein each of the plurality of connectors is coupled to a corresponding bottle in the removable storage container, and wherein the at least one connector is detached from the corresponding bottle.

3. The apparatus of claim 1, further comprising:

a drip tray, wherein the chassis is configured such that liquids from an overflow port of the slide processing module and the removable storage container are directed to the drip tray.

4. The apparatus of claim 1, wherein the slide processing module further comprises a heating element.

5. The apparatus of claim 1, wherein the air nozzle dispenses a gaseous substance at a first pressure of between about 1 psi and about 30 psi.

6. The apparatus of claim 5, wherein the slide processing module further comprises an insert on an outer side of the air nozzle, the insert comprising a plurality of round holes through which air is forced with a second pressure that is greater than the first pressure.

7. The apparatus of claim 1, wherein the SIP consumable comprises:

an inlet port configured to receive the cellular sample;

a moat surrounding the inlet port configured to receive any overflow cellular sample; and the first sample nozzle and the second sample nozzle fluidically coupled to the inlet port to expel the cellular sample, wherein a tubular junction fluidically couples the inlet port to a first tubular fluid path that terminates in the first sample nozzle and to a second tubular fluid path that terminates in the second sample nozzle, wherein a cross-sectional area of the tubular junction is less than an average cross-sectional area of the first tubular fluid path and the second tubular fluid path, and wherein the cross-sectional area of the tubular junction is selected to draw the cellular sample from the inlet port into the tubular junction via capillary action.

8. The apparatus of claim 7, wherein the moat is further configured to enable the cellular sample to be mixed with a buffer solution prior to deposition in the inlet port.

9. The apparatus of claim 8, wherein the buffer solution comprises a phosphate-buffered saline (PBS) solution.

10. The apparatus of claim 8, wherein the buffer solution comprises a Dulbecco's phosphate-buffered saline (DPBS) solution.

11. The apparatus of claim 10, wherein the buffer solution further comprises at least one protein.

12. The apparatus of claim 11, wherein the at least one protein is albumin or heparin.

13. The apparatus of claim 7, wherein the first sample nozzle is disposed between the air nozzle and a first target, and wherein the first sample nozzle expels the cellular sample towards the first target upon the air nozzle being activated and expelling gas towards the first sample nozzle.

14. The apparatus of claim 7, wherein a cross-sectional area of the first tubular fluid path is uniform across its length.

15. The apparatus of claim 7, wherein a cross-sectional area of the first tubular fluid path increases from the tubular junction to a mid-point of the first tubular fluid path and decreases from the mid-point to the first sample nozzle.

16. The apparatus of claim 7, further comprising:

a grip portion adjacent to the inlet port at an end opposite from the first sample nozzle and the second sample nozzle.

17. The apparatus of claim 16, wherein the grip portion comprises an indentation.

18. The apparatus of claim 16, further comprising:

a snap feature adjacent to the grip portion that enables the grip portion to be removed from the apparatus subsequent to a completion of the deposition operation.

19. The apparatus of claim 7, wherein a depth and a shape of the inlet port is selected to increase a draw of the cellular sample into the tubular junction.

* * * * *